United States Patent
Iyoob et al.

(10) Patent No.: US 9,818,127 B2
(45) Date of Patent: Nov. 14, 2017

(54) IMPLEMENTING COMPARISON OF CLOUD SERVICE PROVIDER PACKAGE OFFERINGS

(71) Applicant: Gravitant, Inc., Austin, TX (US)

(72) Inventors: Ilyas Iyoob, Austin, TX (US); Manish Mahesh Modh, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 14/269,174

(22) Filed: May 4, 2014

(65) Prior Publication Data
US 2014/0278808 A1 Sep. 18, 2014

Related U.S. Application Data

(63) Continuation-in-part of application No. 14/175,679, filed on Feb. 7, 2014.

(60) Provisional application No. 61/789,865, filed on Mar. 15, 2013, provisional application No. 61/790,536, filed on Mar. 15, 2013, provisional application No. 61/792,998, filed on Mar. 15, 2013, provisional application No. 61/798,567, filed on Mar. 15, 2013.

(51) Int. Cl.
*G06Q 30/02* (2012.01)
*G06Q 30/06* (2012.01)

(52) U.S. Cl.
CPC .............................. *G06Q 30/0206* (2013.01)

(58) Field of Classification Search
None
See application file for complete search history.

(56) References Cited

U.S. PATENT DOCUMENTS

| | | | | |
|---|---|---|---|---|
| 2010/0325199 | A1* | 12/2010 | Park | G06F 17/30067 709/203 |
| 2010/0332262 | A1* | 12/2010 | Horvitz | G06F 9/5027 705/4 |
| 2010/0333116 | A1* | 12/2010 | Prahlad | G06F 17/3002 719/328 |
| 2011/0145094 | A1* | 6/2011 | Dawson | G06F 9/5027 705/26.63 |
| 2011/0154353 | A1* | 6/2011 | Theroux | G06F 9/5038 718/104 |
| 2011/0213691 | A1* | 9/2011 | Ferris | G06F 9/44505 705/37 |
| 2011/0295999 | A1* | 12/2011 | Ferris | G06F 9/5072 709/224 |

(Continued)

*Primary Examiner* — Philip Chea
*Assistant Examiner* — Hassan Khan
(74) *Attorney, Agent, or Firm* — David O. Simmons; IVC Patent Agency

(57) ABSTRACT

A computer-implemented method of implementing comparison of cloud service provider package offerings comprises a plurality of operations. An operation of creating a cloud services architecture specification defining a cloud infrastructure that supports deployment of an application thereto is performed. An operation of determining a cloud services offering price for each one of the plurality of cloud service offerings to characterize implementation of the cloud infrastructure using cloud services thereof on a basis of pricing of such cloud services is performed. Determining the cloud services offering price for a particular one of the cloud service offerings includes mapping the cloud services architecture specification to cloud service pricing information for the particular one of the cloud service offerings.

11 Claims, 56 Drawing Sheets

(56) References Cited

U.S. PATENT DOCUMENTS

| | | | | |
|---|---|---|---|---|
| 2012/0054731 A1* | 3/2012 | Aravamudan | G06F 8/63 | 717/170 |
| 2012/0060142 A1* | 3/2012 | Fliess | G06F 8/70 | 717/102 |
| 2012/0066018 A1* | 3/2012 | Piersol | G06Q 10/10 | 705/7.14 |
| 2012/0124211 A1* | 5/2012 | Kampas | G06F 9/50 | 709/226 |
| 2012/0131591 A1* | 5/2012 | Moorthi | G06Q 10/06 | 718/104 |
| 2012/0226808 A1* | 9/2012 | Morgan | G06F 9/5072 | 709/226 |
| 2013/0060945 A1* | 3/2013 | Allam | G06F 9/5072 | 709/226 |
| 2013/0066940 A1* | 3/2013 | Shao | H04L 67/1025 | 709/201 |
| 2013/0067090 A1* | 3/2013 | Batrouni | H04L 67/1097 | 709/226 |
| 2013/0185413 A1* | 7/2013 | Beaty | G06F 9/5072 | 709/224 |
| 2014/0068075 A1* | 3/2014 | Bonilla | H04L 41/0823 | 709/226 |
| 2014/0136571 A1* | 5/2014 | Bonvin | G06F 17/30318 | 707/792 |
| 2014/0229607 A1* | 8/2014 | Jung | H04L 43/0876 | 709/224 |

* cited by examiner

FIG. 8B

| | amazon webservices  462  [Select] | GOGRID  Pre-Paid Plans  [Select] | SAVVIS  Balanced  [Select] |
|---|---|---|---|
| Description | On demand commodity cloud provider. Enterprise support available at additional cost | On demand commodity cloud offering based on prepaid plans for certain included 1GB RAM hours and monthly GB data transfer out with an average rate for additional hours and GBs used. Prices based on selecting Business Plan for Small Package, Corporate Plan for Medium Package, and Global Plan for Large Package. | Higher-level security & SLA; optimized for eCommerce & Web Hosting |
| Virtual Machine • RAM(GB) • CPUs(vCPU) • Local Storage | • 0.6, 1.7, 7, 7.5, 15, 17, 1, 34.2, 68.4 • 1, 2, 4, 8 (fixed based on size above) • Local instance storage is transient. EBS persistent storage can be attached | • 0.5, 1, 2, 4, 8, 16, 24 (fixed based on memory options below) • 0.5, 1, 2, 4, 8, 16, 24 • 25, 50, 100, 200, 400, 800, 800 GB (fixed based on memory option above) | • 2, 4, 8, 16 • 1, 2, 4, 8 • 50GB – 1.625TB |
| Network • Bandwidth • VLANs • Min. Guar. Throughput • Pricing Model • Server Load Balancer • Private Network | • 250 Mbps within EC2 network • Any number of public/private VLANs • None • Charged per GB data transfer per month • Additional Charge • Supported | • 400 Mbps between servers • 1x Public and 1x Private VLAN provided • Throughput not guaranteed, but network performance (Jitter/latency) guaranteed • Charged per GB data transfer per month with prepaid plans available • any number of pools by port • Not Supported (All VMs must have public and private address) | • 100 Mbps Enterprise Grade QoS • 1x Public and 1x Private • None • Charged by 95th Percentile for 5 minute Mbps Intervals Across Entire Month And Not Total Data Transferred • 2 Pools • Supported (3 Tiers)(10.x.x.x – can request Custom) |

Create Provider

⊙ Help

▶ Provider Information

Provider Name *

Description
255 charachters allowed

Contact Name *

Contact Email *

Contact Phone *

710

708

Cancel   Save & Exit

Next ⇧

FIG.27

Create Provider

712

? Help

▶ Provider Information

Provider Location *

⊕ Add Location

Provider Type *

Provider Type:
IaaS, PaaS,
SaaS

714

Cancel    Save & Exit    Next ↑

FIG. 28

Create Plan

738

▶ Plan Information                                              ⓘ Help

Plan Provider      * [Select an option ▶]

Provider Location  * ☐ US East
                     ☐ US West
                     ☐ Asia Pacific Plan Name          * [      ]
Description          [            ]
                     255 characters allowed

[Cancel]  [Save & Exit]                              [Next ↑]

Create Service

▸ Service Information                                  ⓘ Help

Service Provider  * [Select an option ▾]

Provider: Pre-populate with
    provider info if user comes
    from the previous pop up
    flow Service Name      [          ]

Description       [          ]
                  255 characters allowed

Service Category  * [Select options ▾]
                    ☒ Network
                    ☐ Storage
                    ☒ Monitoring
                    ☐ Infrastructure
                    *Multi-select categories for a service*

[Cancel]  [Save & Exit]                         [Next]

FIG. 35

Create Service

772

⑦ Help

● Service Properties

Service Pricing  * [Select an option ▼]
☒ MRC
☐ NRC
☐ No Charge

Upcharge (%)

Discount (%)

Additional Information

*Information will be displayed for end user*

774

[Previous]  [Cancel]  [Save & Exit]

Custom Sourcing - App1

Filters

Deployment
- ☐ Physical
- ☐ Virtualized
- ☒ Private IaaS — 1030
- ☒ Public IaaS - Enterprise
- ☐ Public IaaS Commodity — 1032

Pricing
- ☒ Reserved — 1034
- ☒ On-Demand
- ☐ Spot

Features
- ☐ Compute Bursting
- ☐ DaaS
- ☒ Variable Storage
- ☒ Load Balancing
- ☒ VPN
- ☐ Backup Snapshots Location
- ☒ NA
- ☐ LATAM
- ☐ EMEA

| Provider Offering | Price | QoS | Rating | Match | |
|---|---|---|---|---|---|
| Provider Offering #1 | $10,240 | 4.7 out of 5.0 | 4.6 out of 5.0 | 106.4% | Select |
| Provider Offering #2 | $6,500 | 2.6 out of 5.0 | 3.8 out of 5.0 | 98.4% | Select |
| Provider Offering #3 | $12,250 | 4.6 out of 5.0 | 3.2 out of 5.0 | 95.7% | |

Tabs: Application Details | VDCs | Solution Architecture | Sourcing | BOM/Order | Policy Management J2EE Portal ▼

Status: In Planning

Back

IMPLEMENTING COMPARISON OF CLOUD SERVICE PROVIDER PACKAGE OFFERINGS

CROSS REFERENCE TO RELATED APPLICATIONS

This continuation-in-part non-provisional United States patent application claims priority from the co-pending U.S. non-provisional patent application having Ser. No. 14/175,679 filed Feb. 7, 2014 entitled "IMPLEMENTING COMPARISON OF CLOUD SERVICE PROVIDER PACKAGE CONFIGURATIONS", having a common applicant herewith, and being incorporated herein in its entirety by reference; which claims priority from U.S. provisional patent application having Ser. No. 61/789,865 filed Mar. 15, 2013 entitled "SYSTEMS, METHODS AND COMPUTER READABLE MEDIUMS FOR IMPLEMENTING CLOUD SERVICE BROKERAGE PLATFORM FUNCTIONALITIES", having a common applicant herewith, and being incorporated herein in its entirety by reference; and from U.S. provisional patent application having Ser. No. 61/790,536 filed Mar. 15, 2013 entitled "CLOUD SERVICE BROKERAGE (CSB) PLATFORM ARCHITECTURE/PORTAL USE CASE IMPLEMENTATIONS", having a common applicant herewith, and being incorporated herein in its entirety by reference; and from U.S. provisional patent application having Ser. No. 61/792,998 filed Mar. 15, 2013 entitled "CLOUD SERVICE BROKERAGE (CSB) PLATFORM PORTAL AND CSB PLATFORM ARCHITECTURE FOR PROVIDING SAME", having a common applicant herewith, and being incorporated herein in its entirety by reference; and from U.S. provisional patent application having Ser. No. 61/798,567 filed Mar. 15, 2013 entitled "SYSTEM, METHODOLOGY, AND COMPUTER READABLE MEDIUM FOR PROVIDING CLOUD SERVICE BROKERAGE (CSB) PLATFORM FUNCTIONALITIES", having a common applicant herewith, and being incorporated herein in its entirety by reference.

FIELD OF THE DISCLOSURE

The disclosures made herein relate generally to cloud computing architectures and management methodologies and, more particularly, to implementing comparison of cloud service provider package offerings.

BACKGROUND

Cloud computing refers to the practice of using a network of remote servers hosted on a public network (e.g., the Internet) to deliver information computing services (i.e., cloud services) as opposed to doing so on a local server. The network architecture (e.g., virtualized information processing environment comprising hardware and software) through which these cloud services are provided to service consumers (i.e., a cloud service consumers) is referred to as "the cloud", which can be a public cloud (e.g., cloud services provided publicly to cloud service consumers) or a private cloud (e.g., a private network or data center that supplies cloud services to only a specified group of cloud service consumers within an enterprise), or a community cloud (e.g., a set of cloud services provided publicly to a limited set of cloud service consumers, e.g., to agencies with a specific State/Region or set of States/Regions), dedicated/hosted private cloud, or other emerging cloud service delivery models. The underlying intent of cloud computing is to provide easy, scalable access to computing resources and information technology (IT) services to cloud service consumers.

Cloud services can be broadly divided into four categories: Infrastructure-as-a-Service (IaaS), Platform-as-a-Service (PaaS), Software-as-a-Service (SaaS), and Managed Services. Infrastructure-as-a-Service refers to a virtualized computing infrastructure through which cloud services are provided (e.g., virtual server space, network connections, bandwidth, IP addresses, load balancers, etc). Platform-as-a-Service in the cloud refers to a set of software and product development tools hosted on the cloud for enabling developers (i.e., a type of cloud service consumer) to build applications and services using the cloud. Software-as-a-Service refers to applications that are hosted on and available on-demand by cloud service consumers via the cloud. Managed Services refers to services such as backup administration, remote system administration, application management, security services, etc. that are enabled by managed service providers for any Cloud services.

In general, a cloud service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics, which applies specifically to public clouds as opposed to private or hybrid clouds, is that the service is fully managed by a cloud services provider (e.g., the services consumer only needs a suitably equipped client device and network connection). This third functionality is particularly relevant to public clouds. However, private clouds can be managed by an internal IT department or through ITO (IT Outsourcing) contracts. In these examples, I&O (Infrastructure & Operations) administrators act as the cloud provider and, accordingly, this third functionality would be of similar relevance.

The cloud is rapidly being adopted by business and IT users as a way to make their organizations more effective and to save costs. Along with this opportunity comes a new set of pain points and significant risks to enterprises that must be addressed. For example, business users are rapidly investing in their own cloud capabilities (e.g., IaaS, PaaS, and SaaS) to meet business needs while application developers want to move rapidly without the involvement of IT to provision tools and environments. These actions are creating a significant threat to IT management whom are worried about considerations such as, for example, managing costs, chargeback, capacity and resources from the result of unrestrained/unplanned cloud expansion.

FIG. 1 shows an example of a traditional cloud management model 100 leading to business unit cloud service users 105 and IT organization cloud service users 108 (i.e., cloud service users) of a cloud service consumer 110 (e.g., a business, an institution, an individual or the like) directly implementing cloud services via cloud service providers 115 (e.g., IaaS, PaaS, SaaS, ERP, and MS available on one or more outside networks) without oversight and/or involvement of a centralized resource (e.g., IT management). ERP refers to enterprise resource planning and MS refers to Managed Services such as security, backup, monitoring and governance services offered by cloud service providers or a CSB platform provider (i.e., the entity that manages and administers the CSB platform). Examples of the cloud service categories include, but are not limited to, enterprises resource planning services, Infrastructure as-a-Service (IaaS), Platform-as-a-Service (PaaS), Software-as-a-Service (SaaS), and managed services.

There are numerous challenges and limitations in regard to implementing and managing cloud services that arise from the traditional cloud management model 100 discussed above in reference to FIG. 1. Examples of these challenges and limitations include, but are not limited to, different portions (e.g., user, entities, departments, etc) of a given cloud service consumer individually buying cloud services; different portions of a given cloud service consumer purchasing cloud services at different price points from the same cloud services provider; actions of different portions of a given cloud service consumer creating gaps in current business entity processes; disparate billing, payment, contract and settlement process for cloud services of a given cloud service consumer being created; IT interests of a given cloud service consumer being required to undertake actions such that it mimic a cloud service provider; existence of inconsistent service management and service-level-agreement (SLA) compliance across cloud service providers; and loss of effectiveness in implementing and managing cloud services due to broken processes across business, IT demand and supply organizations.

Accordingly, underlying problems that exists in cloud computing is that the need for intermediaries to aggregate, integrate or customize cloud services and that this need grows significantly as the number of cloud services and the rate of consumer adoption grows. Without such intermediaries being able to effectively and efficiently manage cloud services, cloud service consumers must manage numerous transactions (e.g., payments, governance, data movement, customization and enrichment) associated with their cloud service providers and cloud services. This can rapidly become a task that is difficult, time-consuming and expensive, especially when they are consuming numerous cloud services from independent providers. Furthermore, traditional approaches for managing cloud services leads to the adverse situation of vendor "lock-in" in which cloud service consumers are undesirably tied to a particular vendor or set of vendors for all or a portion of their cloud services. Therefore, a platform that enables cloud service consumers to manage these numerous transactions associated with their cloud service providers and cloud services, which can include implementing comparison of cloud service provider package offerings, would be beneficial, desirable and useful.

SUMMARY OF THE DISCLOSURE

Embodiments of the present invention relate to methodologies and systems for enhancing cloud services through use of a cloud services brokerage (CSB) platform. The CSB platform enables a centralized resource within a cloud service consumer (e.g., personnel within an IT department of a business) to implement and manage all aspects of transactions associated with their cloud service providers and cloud services (e.g., payments, governance, data movement, customization, enrichment, etc) in an effective and efficient manner. In doing so, the CSB platform provides the centralized resource within the cloud service consumer to assume exclusive command and control for managing its cloud services. In the context of a CSB platform, a CSB is a third party company, or Enterprise IT Cloud Administration Organization, that adds value to cloud services on behalf of cloud service consumers. The goal of a CSB is to make the service more specific to a company, or to integrate or aggregate services, to enhance their security, to establish and manage contract based pricing, or to do anything that adds a significant layer of value (i.e. capabilities) to the original cloud services being offered.

A CSB platform configured in accordance with an embodiment of the present invention offer numerous benefits over traditional cloud management models such as the traditional cloud management model 100 discussed above in reference to FIG. 1. One benefit that the CSB platform provides is a unique, new approach to providing operations modeling and planning intelligence for enabling cloud service consumers to efficiently and effectively operate in current and future cloud computing environments such as to manage business demand and IT supply processes and relationships. For example, the CSB platform serves as a governance center driven by business, supported by enterprise IT and cloud providers. Another benefit that the CSB platform provides is that it serves as aggregation point for cloud resources, cost and SLA management to design, deploy, manage and govern cloud service solutions. Still another benefit that the CSB platform provides is that it provides a common financial model for IaaS, PaaS, and/or SaaS functionalities across various cloud configurations such as, for examples, public clouds, private clouds, and/or hybrid clouds. In a private cloud, the cloud infrastructure is self-owned such as being operated solely by an organization. However, it can be managed by the organization itself or a third-party provider and can exist on or off the organization's premise. In a public cloud, the cloud infrastructure is made available to the general public or a large industry group and is vendor-owned. A hybrid cloud is a combination of both private and public clouds, are organized so that a portion of the infrastructure is deployed in a private cloud and the rest is exposed on the public cloud.

Still another benefit that the CSB platform provides is providing choice and cost comparisons for determining whether to take a service to the public cloud or keep it internal based on risk/value profile. Still another benefit is that the CSB platform enables a rapidly changing IT service supply chain of cloud services through on-boarding of new cloud services and off-boarding retired cloud services in such a way as to minimize the disruption to end customers, while enabling them to leverage the benefits of new and better value cloud services.

In view of the disclosure presented herein, a skilled person will appreciate that a CSB platform configured in accordance with an embodiment of the present invention is a portal arrangement that enables easy-to-use broker capabilities for cloud services, supporting multiple customers and integrating several different providers, allowing a cloud services consumer (i.e., including its cloud services users) to design, order, provision and control cloud services from a single portal. A cloud services consumer can use a CSB platform configured in accordance with an embodiment of the present invention to provision virtual data centers (VDCs), then find and order services through a single unified web 2.0 interface; to directly access and manage provisioned resources and deploy applications; to track changes through a workflow for technical, legal and financial approvals; govern finances and capacity planning, both for current resources and future growth; and to view multiple command and control tracking dashboards and download them as PDF or Excel files.

With regard to designing cloud solutions, a CSB platform configured in accordance with an embodiment of the present invention allows a cloud service consumer to compare and highlight key differences and features of multiple provider offerings, such as security, service level agreements and cost, to determine the best-fit for their needs; to design the deployment architecture of cloud resources to run their application(s) using a "single pane of glass" view; to use a resource solution center of the CSB platform as a one-stop shop for all of its virtual resource services needs; and to add infrastructure services such as shared storage and backup services; network services such as VPN, and managed services such as back-up administration and security management.

A CSB platform configured in accordance with an embodiment of the present invention provides a cloud service consumer with a simple, comprehensive means for ordering cloud services. To this end, such a CSB platform allows a cloud service consumer to view a comprehensive bill of materials for every application and virtual data center design, generated automatically across multiple providers chosen from an extensive catalog of services; to review the terms and conditions for every designed solution in a single simplified view; and to submit and place consolidated orders for your solution directly from a single interface. Monitor the technical, financial, and legal approvals using a workflow.

With regard to provisioning cloud solutions, a CSB platform configured in accordance with an embodiment of the present invention allows a cloud service consumer to provision multiple VDC change orders at once, with all provisioning tasks identified as a single set and automatically provisioned together; to automatically manage virtual resources and service provisioning using an intelligent asynchronous provisioning engine; and, once provisioned, to view the access and management details at any time.

With regard to controlling cloud solutions, a CSB platform configured in accordance with an embodiment of the present invention allows a cloud service consumer to manage bills across multiple cloud service providers with one automatically consolidated monthly bill; to monitor and control cost and capacity trends, aggregate and correlate every bill item cost to resources and capacity, and view dashboards of aggregate spend across applications and VDCs; and to view monitoring dashboards to compare utilization of resources versus cost, and see if you are over or under capacity or cost for any of your applications across environments and layers.

A CSB platform configured in accordance with an embodiment of the present invention provides a cloud service consumer with an intuitive user interface. To this end, such a CSB platform provides a cloud service consumer with a central web/Internet based portal enabled to implementing broker capabilities for cloud services (e.g., cloud infrastructure services). As a skilled person will appreciate from the disclosures presented herein, a CSB platform portal configured in accordance with embodiments of the present invention offers wizard-based tools for screening applications for cloud deployment, identifying target cloud infrastructures, estimating capacity required on the cloud, comparing provider prices side-by-side, creating a migration roadmap, and finally evaluating the ROI of cloud migration; single view for designing application architectures in the cloud, assigning portions of the architecture to different cloud providers, automatically provisioning the entire architecture simultaneously, and cost estimation; dashboards for consolidated billing, utilization monitoring, and security monitoring; and command and control screens for provisioning authorization, workflow orchestration, and provider compliance evaluation.

The CSB platform can support many cloud service consumers and connects many cloud service providers with a catalog and services-integration framework. Cloud service consumers can use the CSB platform to find, order, and manage services through a single unified Web 2.0 interface and enables ordering and provisioning of virtual resources. The CSB platform enables resource change management, and ongoing financial governance of charges from providers across many applications and virtual data centers.

In one embodiment of the present invention, a computer-implemented method of implementing comparison of cloud service provider package offerings comprises a plurality of operations. An operation of creating a cloud services architecture specification defining a cloud infrastructure that supports deployment of an application thereto is performed. An operation of determining a cloud services offering price for each one of the plurality of cloud service offerings to characterize implementation of the cloud infrastructure using cloud services thereof on a basis of pricing of such cloud services is performed. Determining the cloud services offering price for a particular one of the cloud service offerings includes mapping the cloud services architecture specification to cloud service pricing information for the particular one of the cloud service offerings.

In another embodiment of the present invention, a computer-implemented method comprises a plurality of operations. An operation of providing cloud service resource information defining a cloud infrastructure configured for supporting deployment of an application thereto is performed. An operation of determining, using at least a portion of the cloud service resource information and using cloud service pricing information for each one of a plurality of cloud service offerings, a cloud services offering price for each one of the plurality of cloud service offerings is performed for characterizing implementation of the cloud infrastructure using cloud services thereof on a basis of pricing of such cloud services. An operation for determining, using at least a portion of the cloud service resource information and using cloud service feature information for each one of the plurality of cloud service offerings, a cloud services feature comparison value for each one of the plurality of cloud service offerings characterizing implementation of the cloud infrastructure using cloud services thereof on a basis of features provided by such cloud services is performed.

In another embodiment of the present invention, a computer-implemented method comprises a plurality of operations. An operation of determining, for each one of a plurality of cloud service offerings, implementation characterizing information of a cloud infrastructure using cloud services thereof is performed. The cloud infrastructure supports deployment of a designated application thereby. The implementation characterizing information is determined using a first cloud services architecture specification. An operation of displaying, for each one of a plurality of cloud service offerings, a comparison of the implementation characterizing information thereof is performed. In response to receiving a request for determining implementation characterizing information using cloud services of each one of the cloud service offerings with respect to a second cloud services architecture specification, an operation of displaying a plurality of infrastructure characterizing parameters for each one of the cloud service offerings is performed. Each one of the infrastructure characterizing parameters provides a respective assessment of a respective one of the cloud service offerings.

These and other objects, embodiments, advantages and/or distinctions of the present invention will become readily apparent upon further review of the following specification, associated drawings and appended claims.

BRIEF DESCRIPTION OF THE DRAWINGS

FIG. 8B is an illustrative view of showing configuration of a custom package that is included as an available package offering in the cloud services sourcing screen of FIG. 8A.

FIG. 9 is an illustrative view of a cloud services provider comparison screen of a CSB platform (e.g., a portal thereof) configured in accordance with an embodiment of the present invention.

FIG. 18 is an illustrative view of an IT architecture page in a my Applications section of an Applications tab of a CSB platform (e.g., a portal thereof) configured in accordance with an embodiment of the present invention, wherein the VDC information depicted in an architecture layout is filtered by VDC and environment.

FIG. 27 is an illustrative view showing a provider information pop-up screen of the catalog management section shown in FIG. 26.

FIG. 28 is an illustrative view showing a provider properties pop-up screen of the catalog management section shown in FIG. 26.

FIG. 31 is an illustrative view showing a provider plan information pop-up screen of the catalog management section in FIG. 26.

FIG. 35 is an illustrative view showing a service information pop-up screen of the catalog management section in FIG. 26.

FIG. 36 is an illustrative view showing a service properties pop-up screen of the catalog management section in FIG. 26.

FIGS. 43A-43E is a flow diagram showing a method of implementing comparison of cloud service offerings in accordance with an embodiment of the present invention.

DETAILED DESCRIPTION

CSB Platform Architecture

Figure 1:
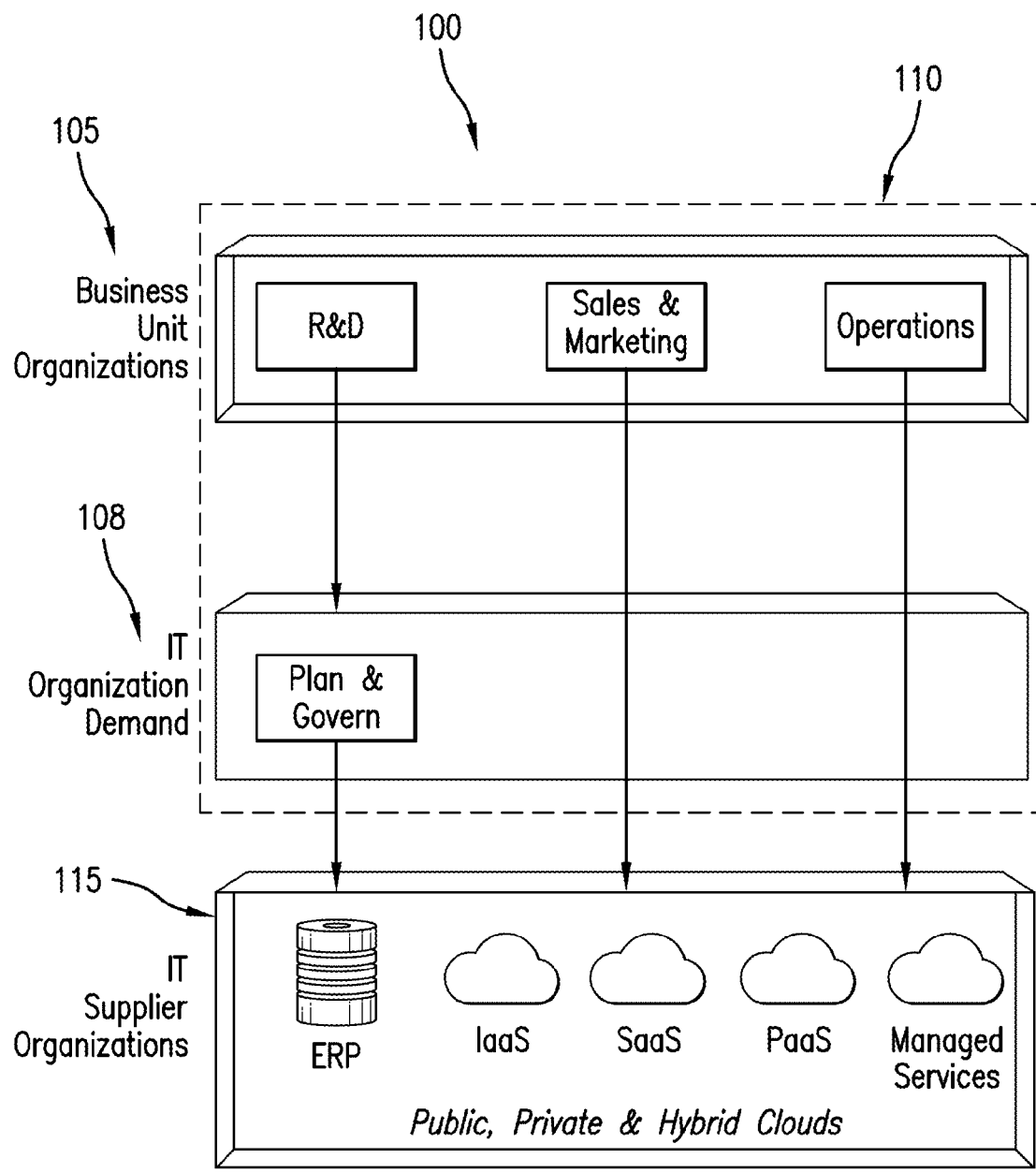
FIG. 1 is an illustrative view showing an example of a traditional cloud management model leading to cloud service users of a cloud service consumer directly implementing cloud services via cloud service providers.
Figure 2A:
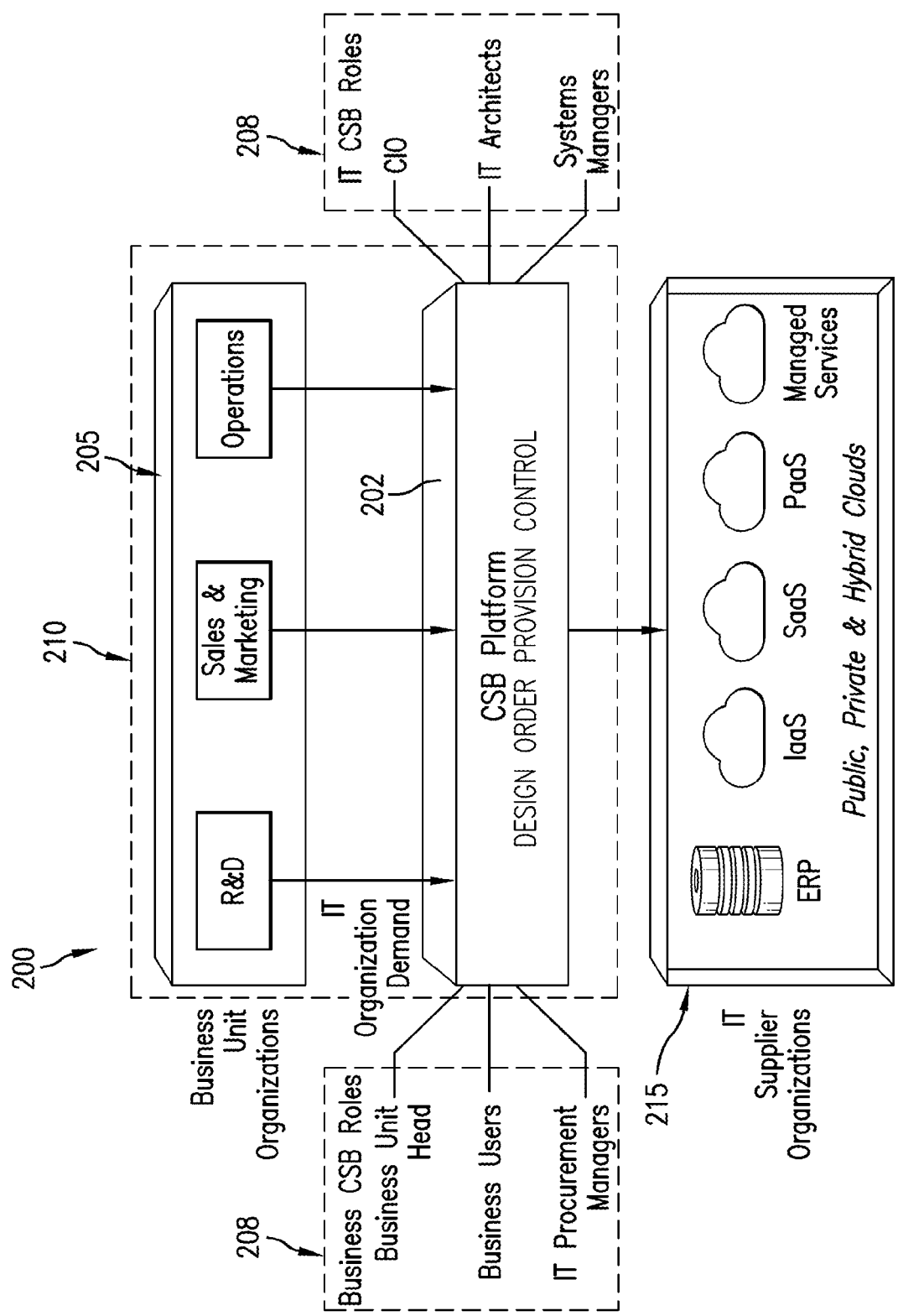
FIG. 2A is an illustrative view showing an example of a cloud management model configured in accordance with an embodiment of the present invention.
Figure 2B:
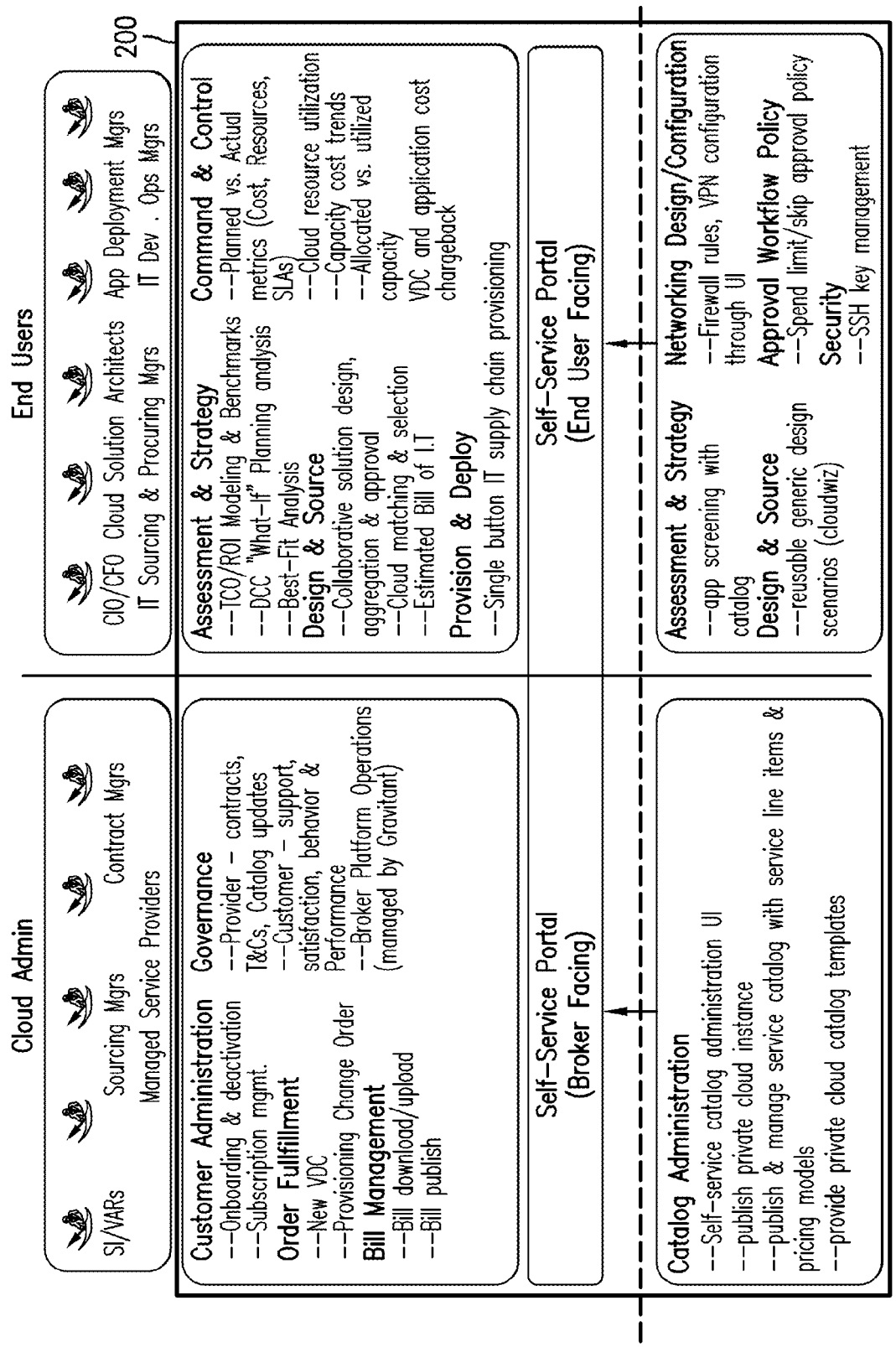
FIG. 2B is diagrammatic view showing a detailed implementation of the cloud management model of FIG. 2 as viewed from Cloud Administrator and End User perspectives.

Referring to FIGS. 2A and 2B, various aspects of a cloud management model 200 configured in accordance with an embodiment of the present invention are shown. Advantageously, the cloud management model 200 implements a CSB platform 202 through which business unit cloud service users 205 and CSB role cloud service users 208 (i.e., cloud service users) of a cloud service consumer 210 access cloud services via cloud service providers 215 (e.g., providing services via one or more outside networks with respect to the CSB platform 202). The CSB platform 202 enables cloud service users of the cloud service consumer 210 to enhance the manner in which it implements cloud consumption across public, private and hybrid clouds. For example, the CSB platform 202 enables cloud service users of the cloud service consumer 210 serving in an IT capacity (e.g., IT architects, system managers, information executives and the like) to limit the complexities and risks of implementing cloud services across multiple providers, allowing for increased agility, standardization of a cloud consumption model, formalization of accounting processes and implementation of compliance and governance.

The CSB platform 202 can be implemented in a variety of manners. In a first implementation, the CSB platform 202 is implemented in a manner where it enables an entity to be a trusted cloud service provider for its own customer base (i.e., its own cloud service consumers), to set up and manage secure virtual data centers with multiple cloud providers, and to add third party services such as security, monitoring and backup to build a more complete solution. In this first implementation, the CSB platform 202 serves as a single interface through which this users in customers with a single interface through which the cloud service consumers can design, order, provision, and manage not just cloud services but also traditional IT services have been provided to them in the past. In a second implementation, the CSB platform 202 is implemented in a manner where it enables an IT organization to maintain complete cost and SLA visibility and governance, while providing its users with a single interface through which they can design, order, provision, and control infrastructure and platform services from a myriad of public, private, hybrid and colocation providers.

The CSB platform 202 has a plurality of associated entities that directly or indirectly interact with it. Though the roles and responsibilities can vary for in certain implementations based on the needs of the specific brokerage, following is a summary of such entities. Broker refers to an entity that owns a cloud service brokerage. The Broker is responsible for contractual oversight of the brokerage, governance, and communication to agencies & consumers to facilitate and increase adoption. The Broker may take on additional roles that can be delegated to the Broker Operator. These additional roles are billing intermediary between broker operator and consumer agency and payment handling. Broker Operator refers to an entity that runs the business operations of the brokerage (e.g., billing management & invoicing, Provider agreements, SLAs and relationship management, pricing management, customer on-boarding including customer agreements, etc.) and technical services (e.g., federated help desk, new provider on-boarding, cloud architecture and design services, additional integrations and customizations, migration services, application management services, other managed services). Some of these roles may be a separate entity such as a System Integrator. For example, if the Broker chooses to manage the business operations and act as the Broker Operator, the Broker may choose to have a System Integrator or vendor perform the technical services. Brokerage Platform Operator refers to the entity that maintains and provides access to the CSB platform. Its responsibilities can include deployment, ongoing upgrades and release management, technical operations, level 3 support for the brokerage portal, etc. Cloud Service Provider refers to the entity that provides the requested cloud services, technical support for published APIs, monthly metering and billing, meet SLAs and provider terms, Level 3 support for provisioned resources, participate in critical problem triage and resolution processes, solution design review and approve (optional), etc. Cloud service consumer refers to an entity that is a register user on a portal of the platform. The Cloud Service Consumer manages users and access control through role assignments, sets spending limits and purchase orders, undertakes cloud architecture and solution design, accesses and uses provisioned resources, receives monthly bills, reviews bills and details through portal, pays bills, monitors performance using the performance dashboards/analytics for cost, capacity and utilization, etc.

Figure 3A:
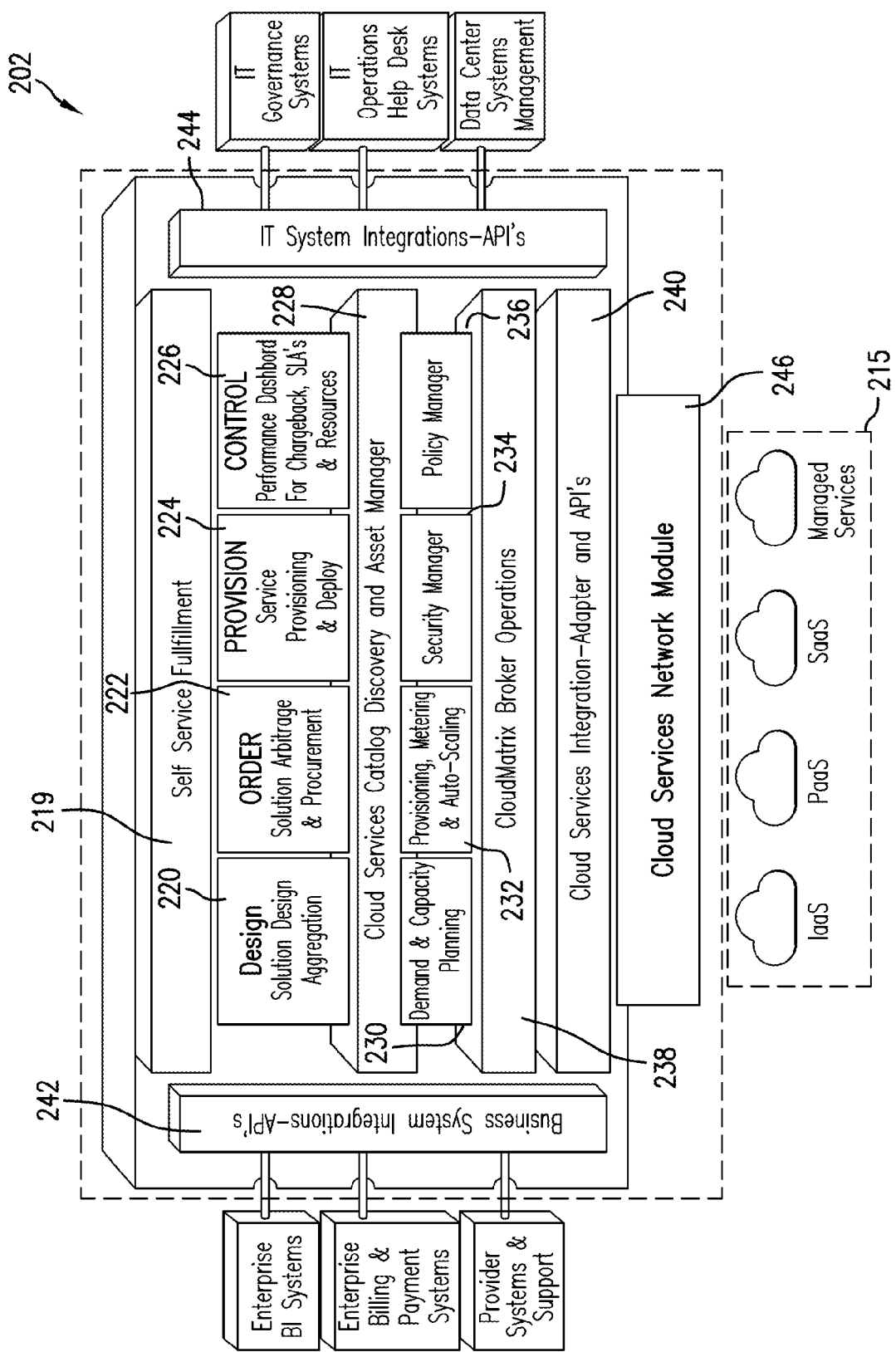
FIG. 3A is a functionality module view of a CSB platform configured in accordance with an embodiment of the present invention.

FIG. 3A shows a functionality module view of the CSB platform 202 (i.e., a CSB platform configured in accordance with an embodiment of the present invention). The CSB platform 202 serves as a cloud services brokerage and management platform that integrates multiple cloud provider services (e.g., internal or external) into a CSB platform portal through which cloud service consumers (e.g., business enterprises) can manage (e.g., optimize) the design, provisioning, ordering and control (i.e., consumption) of cloud services. One example of such a CSB platform portal is provided by Gravitant Inc. at the URL mygravitant.com. Cloud service consumers can deploy core services and features enabled by the CSB platform 202, which are described below in greater detail, through a single user interface of a cloud user accessible portal. These core services and features can be deployed independently or as an integrated suite of cloud services based on specific cloud service needs of a particular cloud service consumer. Advantageously, the CSB platform 202 is technology agnostic and will work and leverage current cloud platforms and business systems deployed of a cloud service consumer.

Advantageously, the CSB platform 202 offers numerous capabilities for allowing a cloud service consumer 210 to enable its cloud service users to implement (e.g., design, order, provision and control) cloud services across public, private and hybrid clouds. Examples of these capabilities include, but are not limited to enabling internal business and IT units to offer their cloud service users a single interface to design, order, provision and control virtual data centers (VDC) in public, private and hybrid infrastructure services; setting up a central environment for carrying out sourcing, procurement, fulfillment and billing processes and contracts with preferred public and private cloud providers; and tracking usage, chargeback, Quality of Service (QoS), SLA's and performance of internal and external cloud infrastructure service providers. Furthermore, the CSB platform 202 enables integration with current IT infrastructure and automation of investments made by a cloud service consumer. Still further, the CSB platform 202 includes a multi-cloud services catalog with services from available public cloud providers (e.g., Amazon, GoGrid, Terremark and Savvis). Accordingly, a cloud service consumer can use a private cloud catalog and service package template to quickly operationalize an enterprise CSB solution. Examples of template content, which are discussed below in greater detail, include service options relating to design and aggregation (i.e., cloud service designing); cloud service sourcing, arbitrage and procurement (i.e., cloud service ordering); service/user provisioning and deployment (i.e., cloud service provisioning); performance dashboards for chargeback, SLA's and resources (i.e., cloud service control); cloud services catalog and asset manager; cloud demand and capacity planning; provisioning, metering and auto-scaling; security management; policy management; broker operations management; cloud services integrations (e.g., adapters & APIs); business systems integrations (e.g., APIs); IT systems integrations (e.g., APIs); and cloud services networking.

In regard to the multi-cloud services catalog (i.e., the catalog), it is highly customizable. Self-service administrative capabilities (e.g., via the self-service fulfillment module 219) are available for the broker to perform actions such as, for example, setting up new cloud services, modifying existing cloud services, customizing the cloud service parameters, updating pricing, reclassifying services, and adding or removing providers. Broadly speaking, the catalog supports an abstraction of marketplace services and categorizations that then maps to provider specific catalog line items. In this regard, a cloud services catalog provides a service abstraction that can map to one or more provider services/line items. For example, a VM service on Savvis maps to vCPU, memory and local storage services with OS templates. For Terremark, Savvis, Amazon, Amazon Gov-Cloud, the aggregated VM services are pre-defined and published in the catalog. Additionally, attributes that are specific to cloud service consumers such as, for example, pricing rules, security and access constraints can be defined in the same catalog. This allows for a high degree of function and flexibility. For example, a consumer level service may be a packaged VM, which may translate into multiple provider catalog line items thereby significantly reducing complexity of the cloud for the consumer. This also simplifies maintenance as well as enables comparison of cloud services and plans from different providers. Accordingly, it will be appreciated that the CSB platform 202 can be configured with an integrated catalog and solution configurator that provides a unique capability to access services from providers that are required to enable a cloud service consumer solution. This integrated catalog and solution configurator provides transparency of provider capabilities and enables the customer to make the right choices from a technology, operational and management perspective.

The catalog has predefined metadata for service providers and services such as capacity limits, and allowed capacity configurations for CPU, memory, local storage, NAS storage etc. for different providers. These constraints are then applied at the time of solution design and Architecture. The total capacity being procured is also displayed to the user while the solution is being iteratively designed. If the predefined capacity limits are exceeded, warning and error messages can be displayed to the user as appropriate. With the ability for the cloud provider to have predefined capacity configurations such as specific vCPU sizes, specific RAM sizes, and storage blocks, it makes the catalog more end-users friendly and self-service. Through use of a catalog administration capability, an operator of the CSB platform 202 can update the metadata of the catalog to change the limits and predefined capacity configurations. For the cloud service providers already integrated into the CSB platform, these capacity configurations have already been defined as part of the content that is available as pre-configured selections.

Figure 3B:
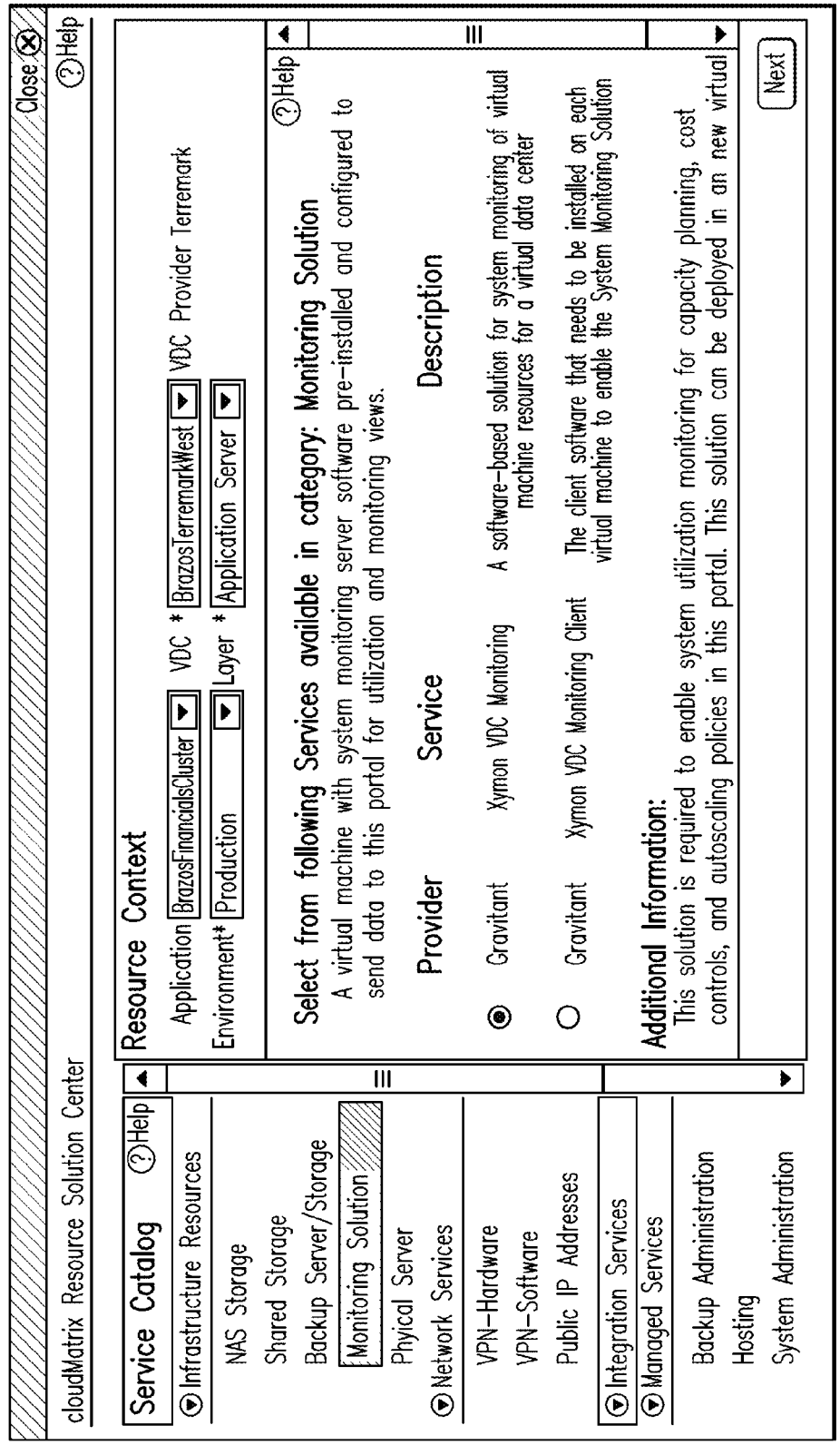
FIG. 3B is an illustrative view showing a resource solution center configured in accordance with an embodiment of the present invention.

FIG. 3B shows a resource solution center 221. The resource solution center 221 serves as a single point (e.g., one-stop) source for all of virtual resource service needs of a user of the CSB platform 202, in FIG. 3A. The resource solution center 221 correlates service catalog line items to an available cloud service selection (i.e., a resource context). Through the resource solution center 221, a user can identify and add infrastructure services such as, for example, shared storage and backup services; network services such as VPN; and managed services such as back-up administration and security management. Examples of infrastructure services include, but are not limited to shared storage (e.g., a cloud-based storage service for backup server software and shared backup storage) and a monitoring solution (e.g., a VM with system monitoring server software pre-installed and configured to send data to this portal for utilization and monitoring views). Examples of network services include, but are not limited to, VPN hardware (e.g., a hardware-based Virtual Private Network (VPN) solution that enables a Site to Site VPN managed by the VDC provider) and VPN software (e.g., software-based VPN solutions that allow for a lower cost secure VPN gateway and can enable Client to Site and Client to Site VPN). Examples of managed services include, but are not limited to, backup administration (e.g., services offered by IT operations service providers to configure backups, maintain backup schedules, monitor and verify backups, and restore backups as needed); system administration (e.g., services offered by IT operations service providers to setup, configure, and support cloud environments, including systems, virtual machines, storage, and networks); and security management (e.g., services offered by IT operations service providers to setup operational security policies, manage virtual private networks, and manage ongoing security, including audits and compliance).

Referring to FIG. 3A, a design module 220 of the CSB platform 202 enables (e.g., via a CSB platform access portal interface (i.e., part of the self-service fulfillment module 219) of the CSB platform 202) comprehensive cloud planning services (i.e., solution design and aggregation functionality). Cloud adoption scenarios can be simulated using prediction analytics for business applications and infrastructure resource needs. Demand, capacity, cost (TCO) and ROI baselines can be forecasted and established for each cloud solution and the internal and/or external cloud service platforms being used. Scenario dashboards can be saved and published and used to provide access to business organizations, IT resources, vendors and the like to align all parties on goals and implementation activities. Examples of information generated and tasks implemented using the design module 220 include, but are not limited to, visual architecture management; solution design and aggregation; application definition and management; and solution scenario design. Accordingly, a skilled person will appreciate that benefits of the design module 220 include, but are not limited to, accurately simulating and predicting cloud capacity and cost for a given application demand profile; clearly understanding cloud capacity needs and cost for each cloud provider before making investment decisions; running cloud consumption scenarios to understand cost, capacity and demand trade-offs/risks; accurately setting IT budgets for cloud computing projects; comparing cloud capacity, costs and SLAs across cloud provider offerings and platforms; clearly establishing and track ROI and TCO metrics for each cloud solution and project; and controlling and managing IT assets in the cloud and reduce cloud/virtual machines (VM) and subscription sprawl.

A virtual machine (VM) refers to a virtual computer that uses the resources of one or more real computers, but which is functionally indistinguishable from a physical computer running the same software from an end user's perspective. For example, in case in which there is a need to set up a new mail server, instead of buying a server (which may only actively process email 1% of the time), installing and configuring the mail server, configuring and maintaining networking for the server, and paying for the electricity and maintenance for the server, a cloud service consumer can pay a cloud service provider to set up a virtualized mail server. This server would run all the same software as the physical server, but would live in a VM that sits atop one or more physical servers which have (at a minimum) the same capabilities (CPU, memory, storage) as the local physical server necessary to run the same software. In turn, this same hardware used by the cloud service provider may support multiple other VMs, none of which use all the hardware system's resources. The cloud service users of the cloud service consumer would send and receive mail from this VM server exactly the same way they would if the server was physically located on premises of the cloud service consumer. In contrast, a virtual data centers (VDC) is similar to physical data centers. A VDC allows dynamic creation of virtual resources atop a physical infrastructure, including CPU, memory, storage, and network capacity. A VDC can be thought of as a container for a VM or as a server rack. Just as a server rack itself does not run any applications, a VDC does not itself run any applications; each is provisioned with servers (e.g., VMs) that run applications. VDC resources can be created on-demand and managed as a pool of virtual resources and controlled through an online user interface. Instead of ordering specific line items from a catalog, VDC is designed with capacity and/or virtual resources and then the system automatically generates an order for the provider to fulfill that VDC design. A VDC can be deployed on internal physical/virtual environments or in public clouds. A VDC can comprise of VMs, storage, one or more networks (subnets), VPNs, Firewalls, load balancers, and any other infrastructure as a service.

Still referring to FIG. 3A, the above-mentioned solution design and aggregation functionality implemented via the design module 220 often entails conducting an "apples-to-apples" comparison of cloud services from a variety of cloud service providers. However, quite often, each cloud service provider has a different style of presenting cloud services and resources to the end-consumer. At a high level, even their business models vary in the sense that certain providers employ reserved capacity vs. on-demand capacity methods of enabling a consumer to procure cloud resources. The CSB platform 202 is configured with a plurality of methods to perform such comparisons.

One method for performing such comparisons is through use of a cloud services planning wizard. An underlying component of the cloud services planning wizard is a metric parameter referred to as a Capacity Unit (CU), which is central to enabling precise cloud service comparative capabilities for measuring, comparing, metering and enforcing quality, performance and cost standards across cloud vendors for different cloud services. The CU is a generic unit of IT capacity that is a function of multiple factors such as, for example, processor speed, random access memory, storage, and bandwidth. In one specific implementation, 1 CU=the capacity to compute at a speed of 2.4 GHz with random access memory of 4 GB and local storage of 100 GB through 1 Mbps of bandwidth. It should be noted that the CU value scales differently with respect to each factor and its value intends to represent the effective realization of the individual capacity components.

By employing the cloud services wizard (which can include an application screener) to assess information derived from a knowledge base of information based on experience and best practices and to calculate CUs for various cloud service providers, the CSB platform user is guided towards an apples-to-apples comparison that results in the closest matched cloud services and cloud service providers. In at least one implementation, the cloud services wizard takes into account dimensions such as, for example, virtual machine dimensions (e.g., memory, CPU/vCPU, local storage, etc); network dimensions (bandwidth desired, virtual LAN, guaranteed throughput, pricing models, load balancers, public vs. private networks, etc); storage dimensions (e.g., defining different architectures, ability to snapshot storage, back up strategies for storage as well as offering shared storage, etc); security dimensions (e.g., firewalling technologies, intrusion detection/prevention technologies, etc); service level agreements (e.g., availability monitoring and service crediting); operating systems supported (e.g., employing templates with licenses, 32/64 bit operating systems, support for blank servers, virtual machines registered and compliant with certain operating systems, etc); provisioning times (e.g., for virtual machines, for provisioning the first virtual data center vs. subsequent virtual data centers, etc); support for virtual resources (e.g., varying from free, forum based support to full helpdesk support that is included for no additional fees); designation of location of virtual resources (e.g., geographic designation and specific locales based on CSP data center availability); and virtual resource pricing structure (e.g., varying by sizing of packages vs. individual resources that may vary by pricing model for reserved capacity vs. on-demand capacity).

Another method for performing such comparisons is through use of a service offerings comparator. By using a normalized scheme of small, medium and large cloud service packages (or other custom packages) of well-defined capacity including compute, storage and memory with normalized utilizations and allocation models, the CSB platform provides a quick pricing comparison for these multiple packages across cloud services and providers.

Still referring to FIG. 3A, the CSB platform 202 supports two models for creating and accessing accounts on the cloud service providers that it manages—Broker managed provider accounts and Customer managed provider accounts. The brokerage can be configured to support both models or either the Customer managed model or Broker managed model. In the broker managed provider accounts model, for example, a broker operations team creates accounts for each cloud provider and inputs the credentials to the portal based on customer (e.g., user) requests. Alternately, a broker can also have reseller relationships with the providers to have predefined accounts which can be set up in the system, and when a customer orders services, the broker simply assigns one of the predefined accounts to this customer. In the customer managed provider accounts model, for example, the customer may already have provider accounts or would prefer to directly create and manage the provider accounts. The customer sets up the account in CSB platform portal and provides the provisioning credentials, and billing credentials, if any. The brokerage portal can then perform all the functions such as catalog, solution design, order approval workflows, screening, provisioning, billing load by customer, cost allocation, dashboards, etc.

An order module 222 of the CSB platform 202 enables (e.g., via the CSB platform access portal) broker services enabling business and IT users the ability to engage with cloud service providers for building business and technology relationships (i.e., sourcing, arbitrage and procurement functionality). It offers a central point for a cloud service consumer to quickly aggregate cloud solutions, procure and pay for them by combining cloud services from different providers to meet business needs, cost constraints and innovation requirements. Examples of information generated and tasks implemented using the order module 222 include, but are not limited to, bill of materials estimates, advanced pricing rules, service offering comparators, provider account management, and procurement process flow. Accordingly, a skilled person will appreciate that benefits of the order module 222 include, but are not limited to, quickly setting up enterprise procurement portal(s) and streamlining cloud acquisition processes across business and IT organizations; meeting new business demand or scalability by having access to multiple cloud providers; ready access to cloud services from internal and external providers with integrated provisioning and procurement processes; being aligned with cloud market changes including product, pricing, packaging, and SLA changes from vendors; reducing cloud costs by comparing cloud service combinations for any given solution; performing real-time spend analysis across providers; optimizing as provisioning and de-provisioning systems are integrated with billing and order management; and reducing time and cost in billing, metering and payment management though a centralized bill and payment capability.

A provision module 224 of the CSB platform 202 enables (e.g., via the CSB platform access portal) cloud management services for users through a single view of cloud services resources from internal or external providers (i.e., service/user provisioning and deployment functionality). A cloud service consumer (e.g., an enterprise IT department) can use the provision module 224 to design application architectures and setup virtual data centers across multiple internal and external providers and manage it from one central location. Furthermore, cloud service consumers can create environments (e.g., Dev, Test, Production and DR) for a business application from different providers and manage them. Examples of information generated and tasks implemented using the provision module 224 include, but are not limited to, automated provisioning and deployment of IaaS and PaaS resource groups/clusters; workflow-based provisioning; auto-scaling service for one or more cloud service providers; and deployment workflow automation. Accordingly, a skilled person will appreciate that benefits of the provision module 222 include, but are not limited to, no vendor or technology lock in, rapid setup of virtual data centers and real time provisioning of IaaS, PaaS, SaaS, Managed Services and other cloud resources across multiple cloud providers, reduced cloud infrastructure costs by continuously optimizing utilization, enhanced resource availability for business applications to meet scalability and performance, enhanced cloud resource allocation to business application and business units, enabling customized cloud data center solutions by adding third party support services, and leveraging current investments in monitoring and management tools sets.

A control module 226 of the CSB platform 202 enables (e.g., via the CSB platform access portal) command and control services that are critical to successful adoption and acceptance of the cloud services model (i.e., dashboard functionality for chargeback, SLAs and resources). A cloud service consumer can gain visibility into current performance, cost and utilization of cloud services and compare against planning benchmarks/milestones to automatically initiate corrective action to continuously optimize cost, resources and SLAs to meet business demand and changes. Furthermore, a cloud service consumer can automatically track, define, establish, and report chargeback against business applications, business units, IT budget codes and/or shared resource categories. The control module 226 includes a plurality of pre-configured dashboard views for chargeback, SLA's and resources. Examples of the pre-configured dashboard views include, but are not limited to, cloud analysis by virtual data center (VDC), application, customer, and business units/departments; capacity cost trends (e.g., compute, memory, network, managed services analysis of capacity vs. cost and trends over time); cost analysis (e.g., by resource type, environment and layer); capacity summary (e.g., allocated capacity, integrate with utilized capacity); cloud utilization & detailed utilization (e.g., monthly/daily utilization for avg/max of CPU/memory utilization and trends over time; aggregation of utilization data for cloud analysis by VDC, application, environment, layer, and resource groups; drill down to system monitoring tool; adapter based integration with any system monitoring tools; deployment template and provisioning for Xymon monitoring server/clients, and ability to deploy & provision other application and system monitoring technologies; and VDC and application cost chargeback); custom dashboards/reporting and activity logs for audit and tracking; and alerts (e.g., capacity changes, utilization thresholds, cost thresholds, and user access changes). Accordingly, a skilled person will appreciate that benefits of the control module 226 include, but are not limited to, business and IT Management having visibility and control over the cloud ecosystems, costs, resources and SLAs; eliminating unrestricted/unintended spending with alerts, procurement and provisioning workflows; making more accurate investment decisions that continuously reduce cost and optimizes resource utilization; implementing proactive action on resource, SLA and cost alignment before there is an impact to business; auditing and reporting on all IT financial transactions, owned assets in the cloud by business app, business unit and shared IT resources; real time alignment of business, IT staff, resources, cost and performance; effective cost accounting and cost assignment to specific business units and apps; rapid enablement of IT initiatives for reducing the time between strategic planning and operational execution; continuous baselining of business and IT metrics; and establishing performance benchmarks.

A cloud services catalog and asset manager module 228 of the CSB platform 202 enables (e.g., via the CSB platform access portal) command and control services that are critical to successful adoption and acceptance of the cloud services model (i.e., cloud services catalog and asset manager functionality). Examples of information generated and tasks implemented using the cloud services catalog and asset manager module 228 include, but are not limited to, multi-provider catalog for IaaS, PaaS, SaaS, Managed Services, and Custom Services; extendable and customizable catalog with dynamic attributes and user interface; pricing support for different cloud provider pricing models (e.g., reserved capacity pricing, allocated capacity pricing and pay-as-you-go); manage provisioned assets (e.g., IaaS, PaaS, SaaS, managed and custom services, asset relationships, asset status and life cycle management, etc); automated asset discovery & sync (e.g., discover and make changes to assets in the cloud, sync with assets registered in catalog/asset manager, match process enabling the IT Administrator to resolve any discrepancies, match and compare prices in catalog for discovered assets, etc); and pre-configured content that is pre-populated with several provider offerings for rapid deployment.

A demand and capacity planning module 230 of the CSB platform 202 enables (e.g., via the CSB platform access portal) solution capacity modeling (i.e., cloud demand and capacity planning functionality). Examples of information generated and tasks implemented using the demand and capacity planning module 230 include, but are not limited to, planned vs. allocated vs. utilized capacity; standardized capacity units across cloud providers, cloud models and infrastructure; advanced and dynamic capacity planning (e.g., application capacity model and VDC capacity model; support for shared resources across VDCs, applications, environments and layers; capacity benchmarks using projected utilization profiles; capacity re-baseline using actual utilization data; modeling analysis of forecasted vs. available utilization thresholds for forecasting capacity growth needs, etc); demand planning with business driver-based demand modeling, drivers for normal demand growth or event-based; and integrated demand and capacity planning to update resource capacity and generate schedule or metric-based policies to change resource capacity based on capacity plan.

In regard to demand and capacity planning, the CSB platform (e.g., via the demand and capacity planning module 230) allows a cloud broker (e.g., platform operator) or the end customer (e.g., cloud service customer) to input demand profiles which then get applied to the solution design, and generate a capacity vs. demand curve (e.g., across an IaaS architecture). This enables cloud service consumers to incrementally acquire capacity as the demand grows instead of acquiring a lot of capacity that remains unutilized till the demand catches up. The CSB platform 202 also enables customization of the capacity planning to be tailored to specific customer architectural needs, and complex demand patterns.

A provisioning, metering and auto-scaling module 232 of the CSB platform 202 enables (e.g., via the CSB platform access portal) automated workflow based provisioning, integrated support for secure shell (SSH) based VMs, and deployment automation (i.e., provisioning, metering and auto-scaling functionality). Examples of automated workflow based provisioning include, but are not limited to, asynchronous message-based provisioning across multiple clouds simultaneously; handle and retry provisioning failures workflow to aggregate and manage underlying cloud provisioning task dependencies; hybrid workflow to support combination of automated and manual provisioning tasks; extensible workflow definitions that support custom integrations for Enterprise systems.

A security manager module 234 of the CSB platform 202 enables (e.g., via the CSB platform access portal) various security management functionalities related to cloud services. Examples of such security management functionalities include, but are not limited to, user security management with subscription and role-based access control that allows for multiple models of user security including user group support and password policy, single sign on and advanced security (e.g., support for integration with federated identity and access management systems, enterprise user directory integration, etc); user administration delegation to business units/departments; centralized and delegated user security administration; VPN services and firewall configuration support; VM encryption support across cloud providers; SSH key management for provider accounts, VDCs, and individual VMs; and support for Federal, Enterprise and other custom, high security deployments.

A policy manager module 236 of the CSB platform 202 enables (e.g., via the CSB platform access portal) implementation of various policies related to cloud services. Examples of such policies include, but are not limited to, pricing policies (discounts, upcharges, customer specific, partner specific, custom, etc); cost alerts based on thresholds; resource auto-scale policies (e.g., via support for a policy provider auto-scaling function); cost allocation policies by allocated and utilized capacity; architecture policies to enforce architectural constraints in solution design; and workflow/notification policies (e.g., email groups, portal tasks, order approvals, etc).

A broker operations module 238 of the CSB platform 202 enables (e.g., via the CSB platform access portal) implementation of broker operations related to cloud services. Examples of such broker operations include, but are not limited to, customer activations (i.e., on-boarding) and deactivation; customer subscription management (e.g., subscription packages and payment authorization); customer billing & payments with monthly bill export & import, bill lifecycle and publish, and credit card & purchase order support; brokerage command & control with visibility into cost, capacity & ordering behavior across providers & customers; customer support with integration and support ticketing systems; catalog implementation of services & providers, pricing rules, sourcing content, import SLAs and terms & conditions; channel/portal management with click-through agreements, white labeling/co-branding and affiliate management; and provider self-service with catalog & list price updates and visibility into customer behavior.

A cloud services integration module 240 of the CSB platform 202 enables (e.g., via the CSB platform access portal) implementation of cloud services integration functionalities (i.e., via adapters and application programming interfaces (API's)). Examples of such cloud services integration functionalities include, but are not limited to, pre-built jCloud API based adapters; built jCloud and REST API based adapters; support for custom adapters; adapters map to a common model for provisioning changes and asset discovery; metadata-driven configuration options enable dynamic UI for provider capabilities (e.g., memory, cpu, storage, OS templates); and map provisioning tasks to be automated or workflow-based.

A business systems integrations module 242 of the CSB platform 202 enables (e.g., via the CSB platform access portal) implementation of business systems integration functionalities (i.e., via API's). Examples of such business systems integration functionalities include, but are not limited to, APIs for business intelligence systems (e.g., resource capacity/cost/utilization for provisioned resources; catalog data, asset inventory data and orders; and the like); enterprise billing & payment systems that provide APIs for enterprise billing & payment systems to retrieve and update data for bills, orders and assets; and APIs for cloud service providers to manage catalog & list prices, terms and conditions for provider services and visibility into customer activity and behavior.

An IT systems integrations module 244 of the CSB platform 202 enables (e.g., via the CSB platform access portal) implementation of IT systems integration functionalities (i.e., via API's) related to internal IT governance, internal IT operations help desk systems, and internal data center systems management. Examples of such IT systems integration functionalities include, but are not limited to, providing APIs for enterprise governance systems to view order access and complete workflow tasks, review tickets/ support, terms and conditions with SLAs; monitoring and auditing data for cost, capacity and utilization of resources; providing APIs for Help Desk systems to view, edit, submit and run reports on support tickets; providing APIs for enterprise systems management integration; and monitoring data for cost, capacity, and utilization of resources.

A cloud services network module 246 of the CSB platform 202 enables (e.g., via the CSB platform access portal) implementation of cloud services networking functionalities. Examples of such cloud services networking functionalities include, but are not limited to, pre-defined CSB service taxonomy (e.g., hierarchical); pre-loaded catalog(s) (e.g., for cloud providers, private clouds, security services, network services, managed services; pre-built adapters for available cloud service providers; pre-defined provisioning workflows for all services pre-loaded in the catalog(s); sourcing comparator content for cloud service provider offerings; pre-defined subscription packages; user roles and dashboards; pre-defined email templates for user registration, provisioning status, order status & process steps, alert notifications, and task notifications; and pre-built integration for support.

Figure 4:
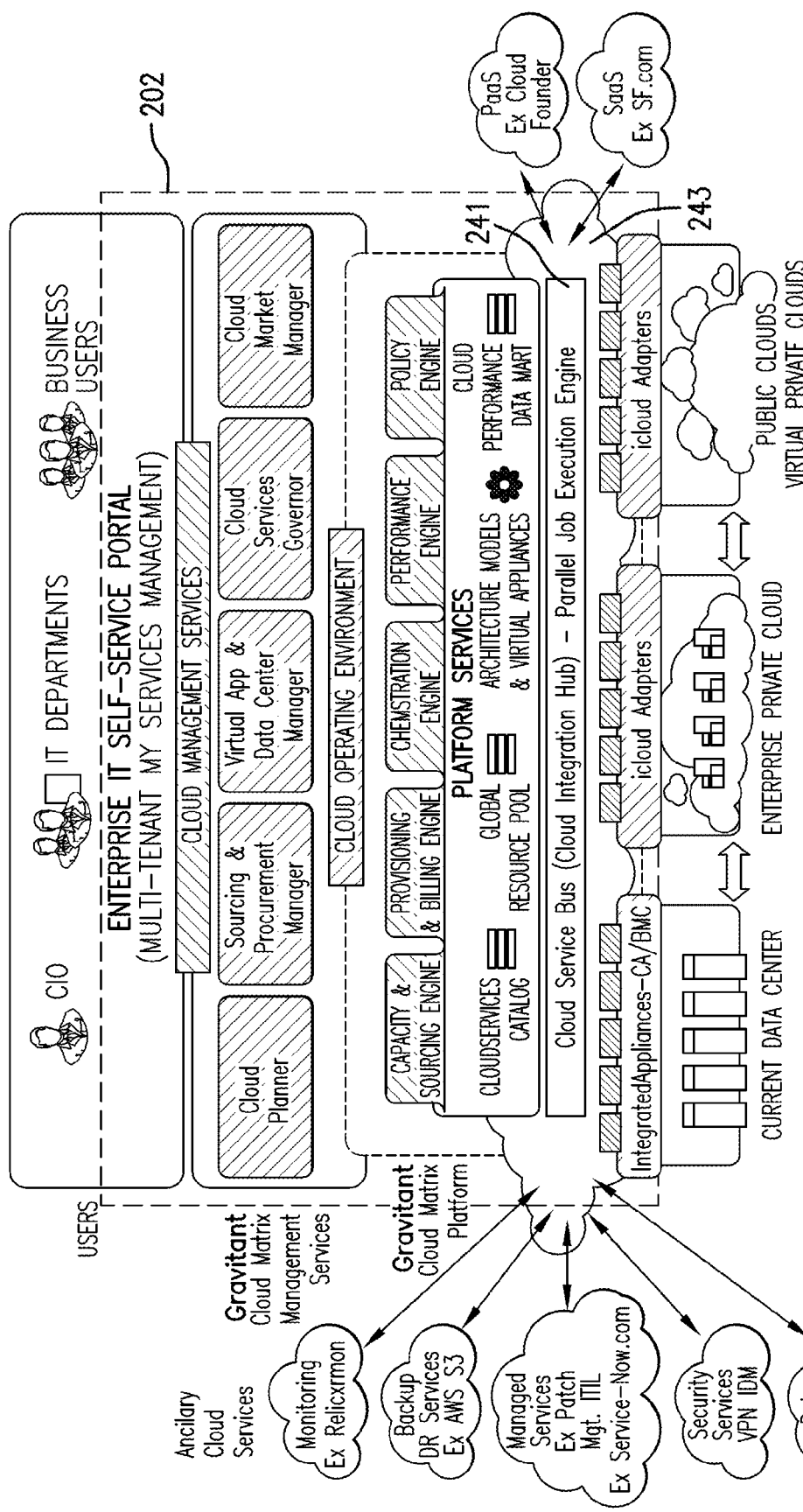
FIG. 4 is an illustrative view showing high-level functionality of the CSB platform of FIG. 3A.

Referring to FIG. 4, further details of the cloud services integration module 240 of the CSB platform 202 are presented. The cloud services integration module 240 shown in FIG. 3A comprises a unique and comprehensive service bus architecture for the provisioning capabilities. This service bus architecture is embodied by the cloud service bus 241, which is coupled to outside network 243. The cloud service bus 241 has an inbuilt data driven workflow/process engine that supports multiple workflow/process definitions for different services, service providers and/or service types. The cloud service bus 241 uses an adapter architecture pattern to integrate with service providers. The cloud service bus 241 is a message-based architecture that allows asynchronous and parallel execution of provisioning tasks across cloud services and cloud service providers. These provisioning adapters are separate 'classes/libraries' that implement specific provisioning APIs at the level of each operation mapped to the provider API. The adapter classes are implemented using the Interface design pattern. The cloud service bus 241 supports multiple adapter invocation approaches including standard web service protocols and REST API protocols, as well as custom approaches depending on the service provider capabilities.

The cloud service bus 241 can use standard open-source JClouds (jclouds) protocol that currently has provisioning integration enabled for about 30 cloud providers. The cloud service bus 241 workflows invoke jclouds protocol libraries using service provider metadata and credentials configured in the catalog discussed above (i.e., the service catalog).

The architecture of the cloud service bus 241 and the adapter pattern support several standards such as, for example, VMWare vCloud Director APIs, OpenStack APIs, AWS APIs, jclouds APIs, Eucalyptus APIs and CloudStack APIs. The cloud service bus 241 provides the unique ability to interoperate with emerging and changing standards with the cloud, and normalize across them from a consumer perspective. Many of these standards are focused on cloud provider's ease of management of multiple cloud technologies.

Users of the CSB platform 220 can design their virtual data centers through a visual user friendly console. Once the design is finalized, it goes through an authorization workflow, followed by an approvals process that is all fully automated through the CSB platform 220. Such an authorization workflow is critical to maintain complete control of the procurement process. Otherwise, resources may be ordered and provisioned randomly without proper protocol leading to rogue virtual machines and virtual machine sprawl. Next, all the virtual resources are simultaneously provisioned across multiple providers through the cloud services integration module 240, which has API connections to the different cloud service providers. Accordingly, cloud service consumers do not need to create accounts and communicate with multiple providers for their cloud requirements because this will be done for them automatically by the cloud services integration module 240. This level of automation also allows for easy movement of workloads between cloud service providers.

FIG. 3A shows a functional component architecture view of the CSB platform 202 of FIG. 4. Platform services of 202 shows the data repositories that power the various functional components of FIG. 3A. For example, Cloud Performance Datamart in 202 is updated and used along with Performance Engine and Cloud Services Governor in 202 by the Control Functional module in FIG. 3A; and the Cloud Services Catalog, Discovery and Asset Manager in FIG. 3A uses the Platform services of 202 Global Services Catalog, Global Resource Pool, and Architecture Models and Virtual Appliances, along with Virtual App and Data center Manager Functions shown in 202. The Cloud Services Network module in FIG. 3A represents the catalog content, templates and adapters built for the representative network of services shown in FIG. 4 outside 202 and connected to 202.

Figure 5:
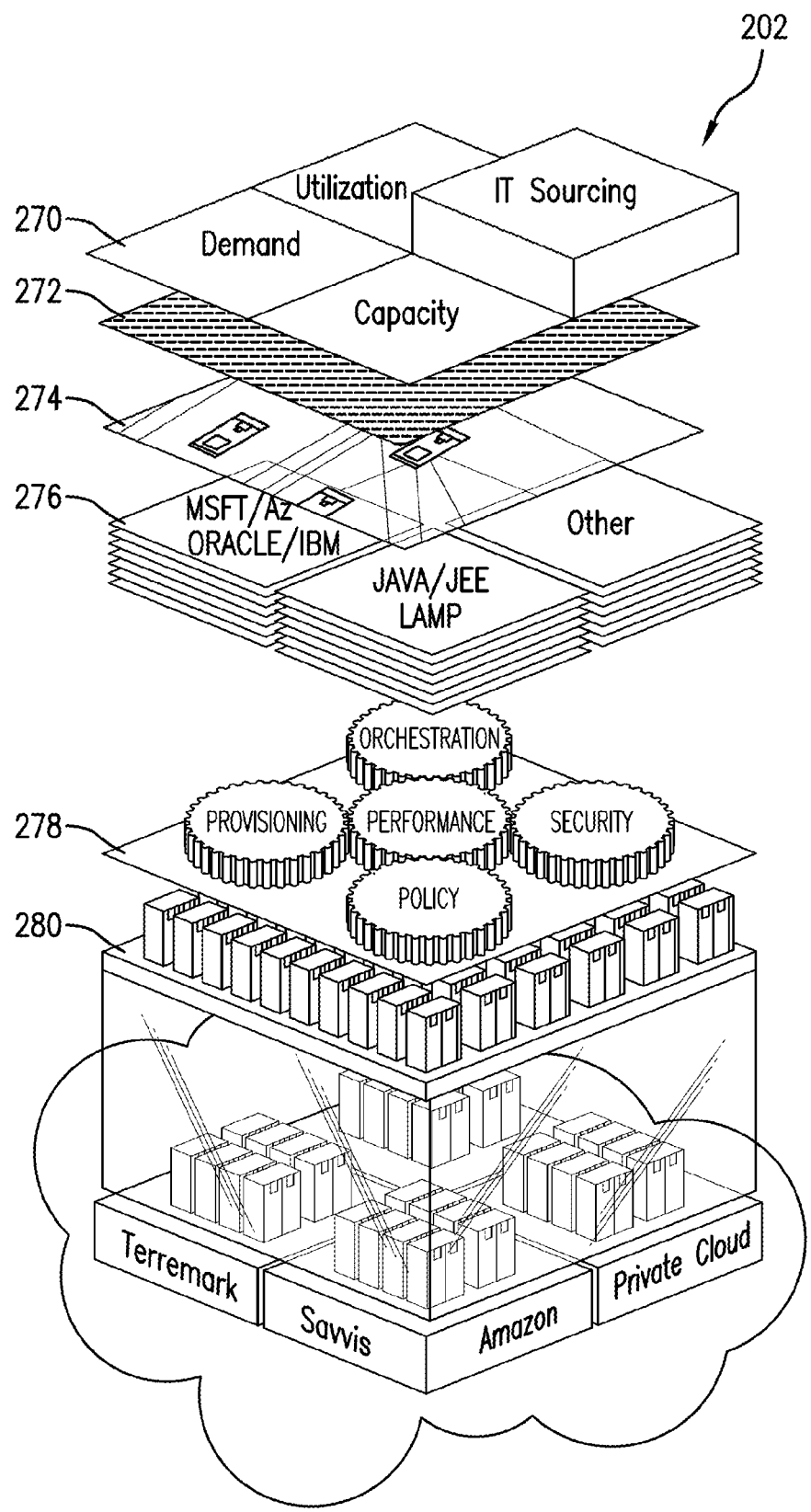
FIG. 5 is an architectural view showing various engines providing functionality the CSB platform of FIG. 3A.

FIG. 5 shows an architectural view of the CSB platform 202. The architecture of the CSB platform 202 enables cloud brokerage services to be delivered in a manner that provides advantageous and beneficial results. As is discussed below in reference to the various platform engines of the CSB platform 202, the architecture of the CSB platform 202 employs advanced simulation and optimization mathematical models for IT planning, sourcing, and governance.

A set of cloud decision and governance engines 270 of the CSB platform 202 is configured to simulate and optimize trade-offs between cloud service criteria such as, for example, business demand, resource capacity, utilization/ performance, and IT sourcing policies. The set of cloud decision and governance engines 270 enable the analysis of impacts to cloud service parameters such as, for example, cost, risk, QoS, SLAs, and application architecture for business services and applications. Based on these analyses, IT organizations and/or other entity(ies) of a cloud service consumer can make decisions on preferred cloud service providers to use, on the optimal cloud service capacity to deploy, and on the policies for automated scaling of capacity based on business demand. Thereafter, an IT organization and/or other entity(ies) of a cloud service consumer can govern the operations and compliance of these decisions through on-going tracking and analysis against a defined plan.

A cloud services catalog engine 272 of the CSB platform 202 is configured to manage a comprehensive model of public/private cloud services supply and business services demand of the cloud service consumer's. An administrative entity that manages back-end operability of the CSB platform 202 (i.e., the various platform engines thereof) works with many cloud service providers to model their individual cloud services and purchase-able line items with pricing and packaging structures. The cloud service consumer (e.g., its IT Organizations) can then define their business services and model demand for cloud services based on available services in a catalog of cloud services that are available from the cloud service providers (i.e., a CSB cloud services catalog). The cloud service consumer (e.g., its IT Organizations) can also define a custom catalog of preferred suppliers (e.g., a CSB cloud service provider catalog that can comprise the CSB cloud services catalog) to help manage their sourcing policies and setup a private marketplace.

A cloud performance data mart engine 274 of the CSB platform 202 is configured to automatically aggregate and correlate metrics for cloud service criteria such as, for example, demand, capacity, utilization, performance, cost, and risk for multiple application architecture and cloud resources across many environments and virtual data centers. The cloud performance data mart engine 274 enables near real-time visibility into resource performance along with audit data to manage governance of resource changes. Using a suitable performance data model, the system can scale to support thousands of resources with historical data and deliver instant reporting.

An application architecture manager engine 276 of the CSB platform 202 is configured to define application architecture blueprints using virtual appliances (e.g., templates) and associated resource capacity models to automate system construction, deployment, configuration and maintenance across physical, virtual and cloud environments. Also, the application architecture manager engine 276 enables orchestration and transaction-based automated provisioning of cloud resource changes.

A set of cloud architecture engines 278 of the CSB platform 202 provides a common set of architecture services to intelligently scale, monitor, and secure applications running across multiple cloud environments and internal data centers. The cloud architecture engines 278 provide the foundation, logic, and integrations to enable automated resource provisioning, performance management, orchestration and workflow, policy models, and security controls.

A global cloud resource pool and cloud service provider engine 280 of the CSB platform 202 is configured to create, manage and control VDC's by provisioning resources from multiple external cloud service providers, private clouds and internal data centers. All resources are inventoried globally across providers and manageable through a single unified interface. Cloud service providers are integrated into the CSB platform 202 through common interfaces (e.g., for connectors of VDC's and connectors of cloud managed services).

In view of the disclosures made herein, a skilled person will appreciate that a CSB platform configured in accordance with the present invention offers several distinguishing aspects with respect to traditional approaches for enabling a cloud services to be implemented by a cloud services consumer. One such distinguishing aspect relates to CSB functionality being configured for meeting end user cloud service consumption use cases integrated with governance use cases for IT and business managers. In this regard, such a CSB platform is configured to operate and scale across multiple agencies and internal/external cloud service providers communities in a centralized or federated deployment model. Another such distinguishing aspect relates to CSB platform being model driven and based on XML semantic ontologies. This avoids lock in for end customers while providing quick extensibility and integration with customers and cloud providers systems. Furthermore, the CSB platform includes integrated analytics and policy management for intelligent resource usage, SLA compliance, and cost optimization thereby allowing cloud service consumers to run predictive IT operations to optimize utilization cost and SLA across an IT supply chain. Yet another such distinguishing aspect relates to CSB platform being able to be deployed (i.e., onsite or offsite) in multiple configurations where an operator of the CSB platform can be an agency or a preferred service integration provider. Additionally, the processes implemented via the CSB platform inter-operate with service management and governance processes of other entities, which enables a staged extension of a non-broker-based operations model to a broker-based operations model.

Figure 6:
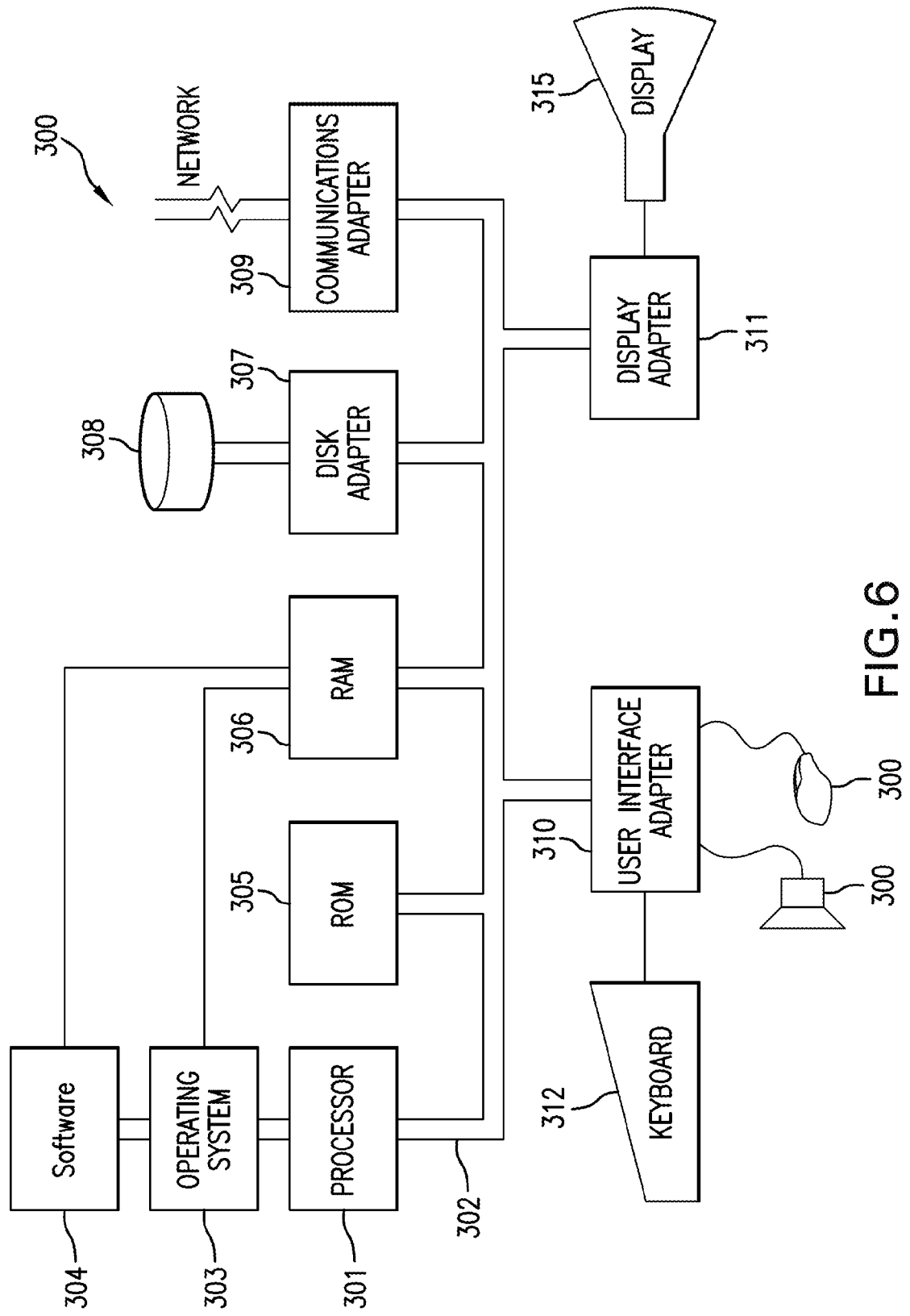
FIG. 6 is a block diagram showing a data processing system 300 representative of a hardware environment comprising a CSB platform configured in accordance with an embodiment of the present invention.

FIG. 6 shows a data processing system 300 representative of a hardware environment comprising a CSB platform configured in accordance with an embodiment of the present invention (e.g., the CSB platform 202). A server is one example of the data processing system 300. The data processing system 300 a processor 301 coupled to various other components by system bus 302. An operating system 303 runs on processor 301 and provides control and coordinates the functions of the various components of the data processing system 300. 2. Software 304 in accordance with the principles of the present invention runs in conjunction with operating system 303 and provides calls to operating system 303 where the calls implement the various functions or services to be performed by software 304 and, optionally, other applications. Software 304 includes a set of instructions (i.e., a program) for providing cloud service brokerage functionality configured in accordance with an embodiment of the present invention (e.g., as disclosed above in FIGS. 2-5).

Read-only memory ("ROM") 305 is coupled to system bus 302 and includes a basic input/output system ("BIOS") that controls certain basic functions of capacity planning system 104. Random access memory ("RAM") 306 and disk adapter 307 are also coupled to system bus 302. It should be noted that software components including operating system 303 and software 304 can be loaded into RAM 306, which may be the main memory of execution for the CSB platform 202. Disk adapter 307 may be an integrated drive electronics ("IDE") adapter that communicates with a disk unit 308, e.g., disk drive.

The data processing system 300 may further include a communications adapter 309 coupled to bus 302. Communications adapter 309 interconnects bus 302 with an outside network (e.g., outside network 243 shown in FIG. 4) enabling the CSB platform 202 to communicate with other devices.

I/O devices may also be connected to the CSB platform 202 via a user interface adapter 310 and a display adapter 311. Keyboard 312, mouse 313 and speaker 314 may all be interconnected to bus 302 through user interface adapter 310. Data may be inputted to the CSB platform 202 through any of these devices. A display monitor 315 may be connected to system bus 302 by display adapter 311. In this manner, a user is capable of inputting to the CSB platform 202 through keyboard 312 or mouse 313 and receiving output from the CSB platform 202 via display 315 or speaker 314.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are/can be described herein with reference to textual descriptions, flowchart illustrations and/or block diagrams of methods, apparatus (systems) and computer program products according to embodiments of the present invention. It will be understood that portions of the textual descriptions, flowchart illustrations and/or block diagrams, and combinations thereof can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the textual descriptions, flowchart illustrations and/or block diagrams, and combinations thereof. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the textual descriptions, flowchart illustrations and/or block diagrams, and combinations thereof. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the textual descriptions, flowchart illustrations and/or block diagrams, and combinations thereof.

CSB Platform User Interface

Figure 7:
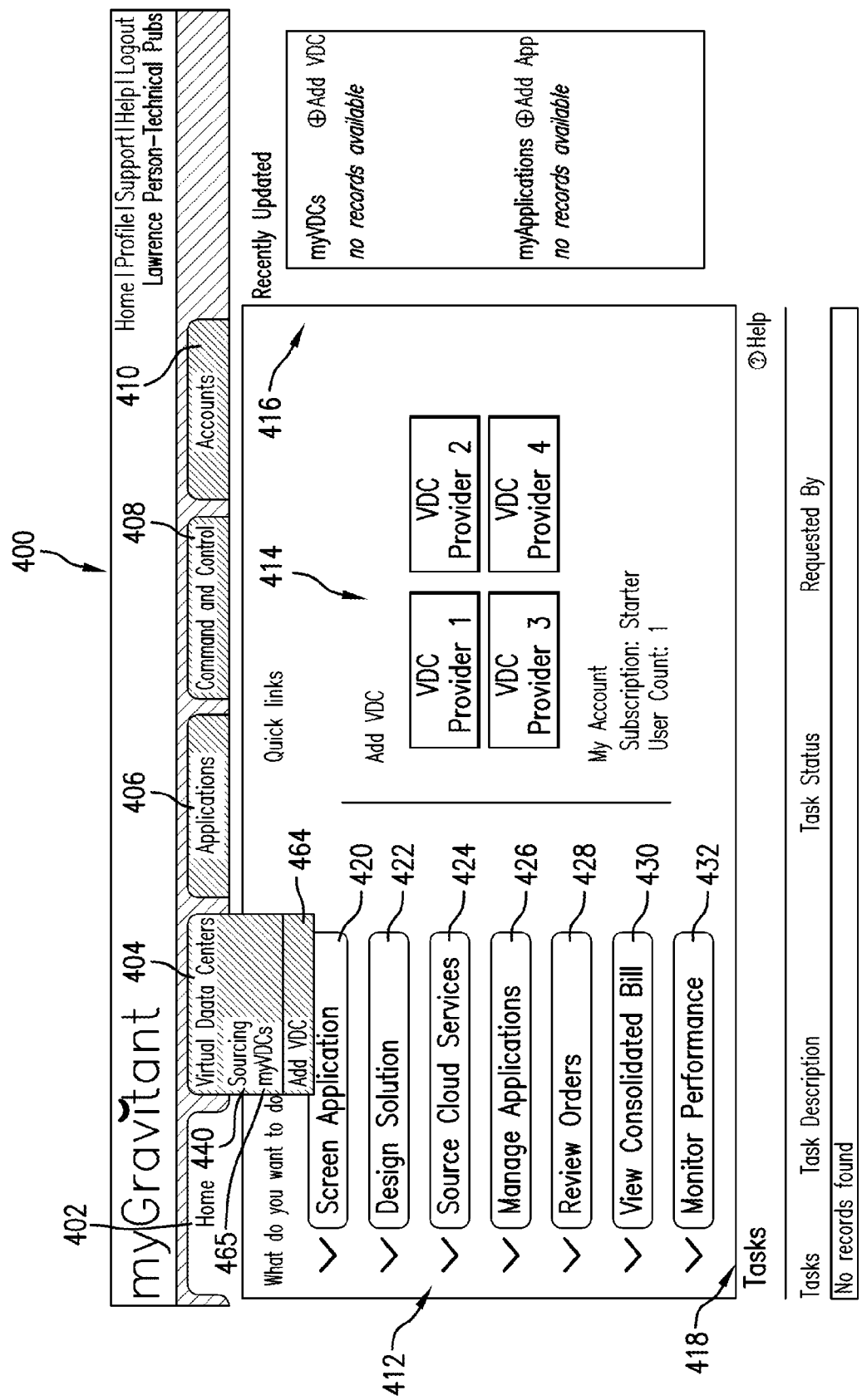
FIG. 7 is an illustrative view of a home page of a CSB platform portal configured in accordance with an embodiment of the present invention.

Turning now to specific aspects of cloud management interface functionalities, FIG. 7 shows a main user page 400 of a portal configured in accordance with an embodiment of the present invention (e.g., a portal of the CSB platform 202 discussed above). The main user page 400 includes a Home tab 402, a Virtual Data Center (VDC) tab 404, an Applications tab 406, a Command And Control tab 408, and an Accounts tab 410. The Home tab 402 enables navigation to specific functionalities (e.g., those of other navigation tabs) and to consumer task activities. The VDC tab 404 provides functionalities related to comparing different cloud service providers and to creating and managing VDCs and other virtual resources. The Applications tab 406 provides functionalities related to creating, sizing, editing and managing the consumer's cloud applications, which can be mapped to resources within a single VDC or across multiple VDCs. The Command And Control tab 408 provides functionalities related to viewing and managing the consumer's orders, view monthly consolidated bills and to monitoring its VDCs and applications. The Accounts tab 410 provides functionalities related to creating and editing users of the consumer's cloud services, assigning roles to its users and managing its users. In this regard and as will be discussed below in greater detail, each one of the tabs 402-410 provides a cloud services consumer access to respective information and functionalities.

Home Tab

The Home tab 402 includes a Tab Link section 412, a VDC Quick Link section 414, a Recently Updated Resource section 416, and a Tasks section 418. The Tab Link section 412 provides selectors for accessing respective functionalities, as discussed below. The Quick Links section 414 provide shortcuts to create VDCs with the selected providers. The Recently Updated Resource section 416 links provide shortcuts to the IT Architecture view of recently created/updated VDCs and applications. The Tasks section 418 is a task manager that lists all pending tasks and providing links to order details where action is needed.

Figure 19:
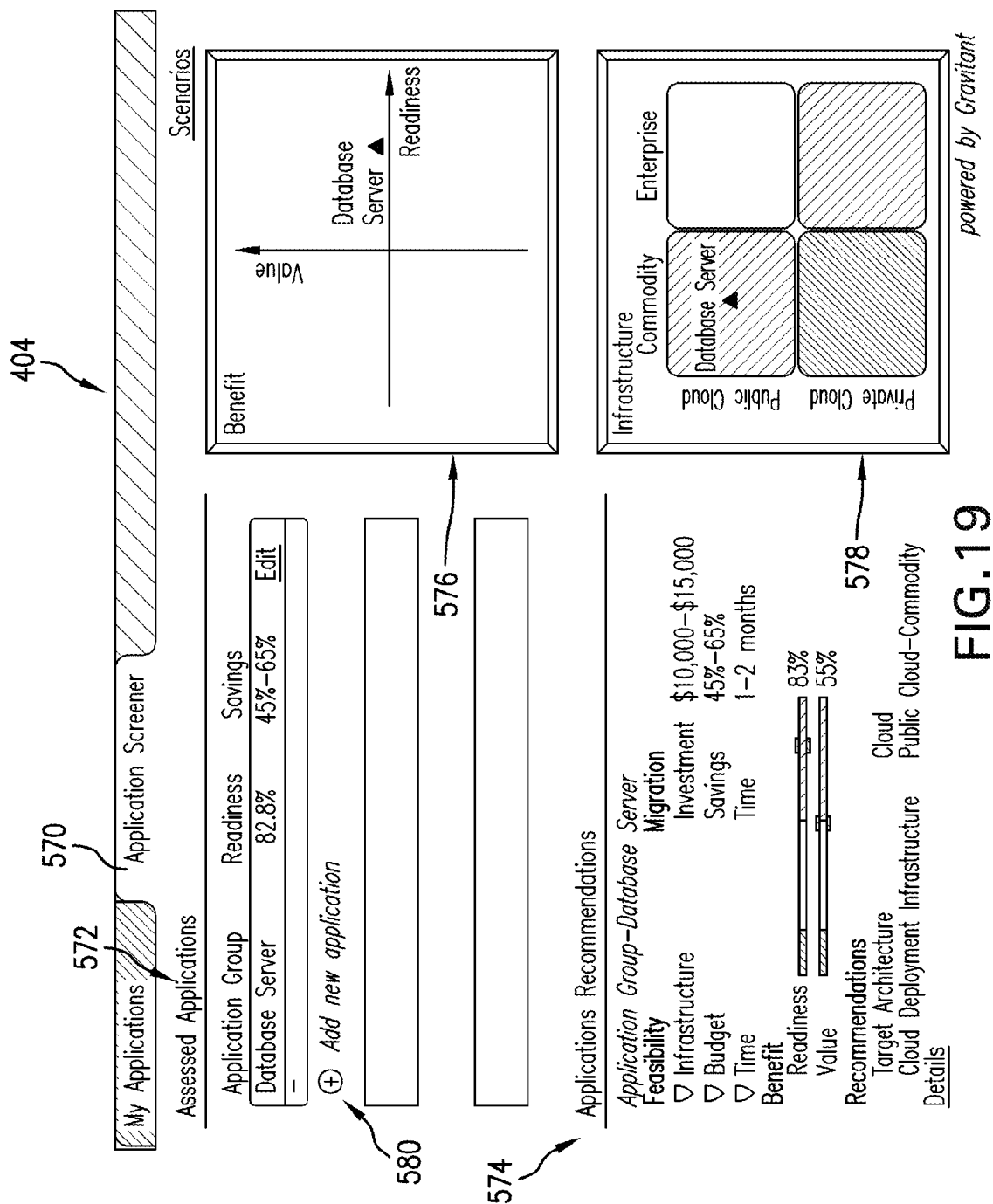
FIG. 19 is an illustrative view of an Applications screener of a CSB platform (e.g., a portal thereof) configured in accordance with an embodiment of the present invention.

A screen application selector 420 of the Tab Link section 412 links (i.e., navigates the interface to) to functionalities for screening application for determining migration considerations, as is discussed below in reference to FIG. 19. A design solution selector 422 of the Tab Link section 412 links to an application solution designer view of the Applications tab 406 for enabling a user (i.e., cloud service user) to plan cloud resource scenarios by creating one or more applications (i.e., use specific cloud resource configurations) and mapping the one or more applications to different virtual data centers to compare and choose a desired cloud service solution (i.e., cloud service provider offering(s)). A source cloud services selector 424 of the Tab Link section 412 links to provider offering of the VDC tab 404 for enabling a user to compare provider packages and features to determine which provider to select. The objective of such comparison and determination is map application requirements to a package and use that package to compare which cloud service provider the user want to select (i.e., not yet actually buying, provisioning or fulfilling these packages). A manage applications selector 426 of the Tab Link section 412 links to an application screen (e.g., My Applications screen) of the Applications tab 406 for enabling a user to create applications and map them to a VDC or make edits to existing applications. A review orders selector 428 of the Tab Link section 412 links to an order screen (e.g., My Orders screen) of the Command And Control tab 408 for enabling a user to simultaneously view multiple orders across VDCs, to monitor their status, and to see the history of orders associated with their existing VDCs. A consolidated bill selector 430 of the Tab Link section 412 links to a list of bills currently in pending for the cloud service consumer for enabling a user to navigate to detail information for a particular bill. A monitor performance selector 432 of the Tab Link section 412 links to a monitoring screen of the command and control tab 408 for providing access to dashboard that provide information relating to cost and performance of a user's VDCs and Applications.

VDC Tab

The VDC tab 404 (FIG. 7) provides functionalities related to comparing VDC packages, creating new VDCs, and monitoring relationship between applications and VDCs. As discussed below in greater detail, creating VDCs entails creating resources on-demand and managed as a pool of virtual resources and controlled through the portal (i.e., an online user interface). Instead of ordering specific line items from a catalog, a VDC is designed with capacity and/or virtual resources and then the CSB platform automatically generates an order for a selected cloud service provider to fulfill the ordered VDC design.

Figure 8A:
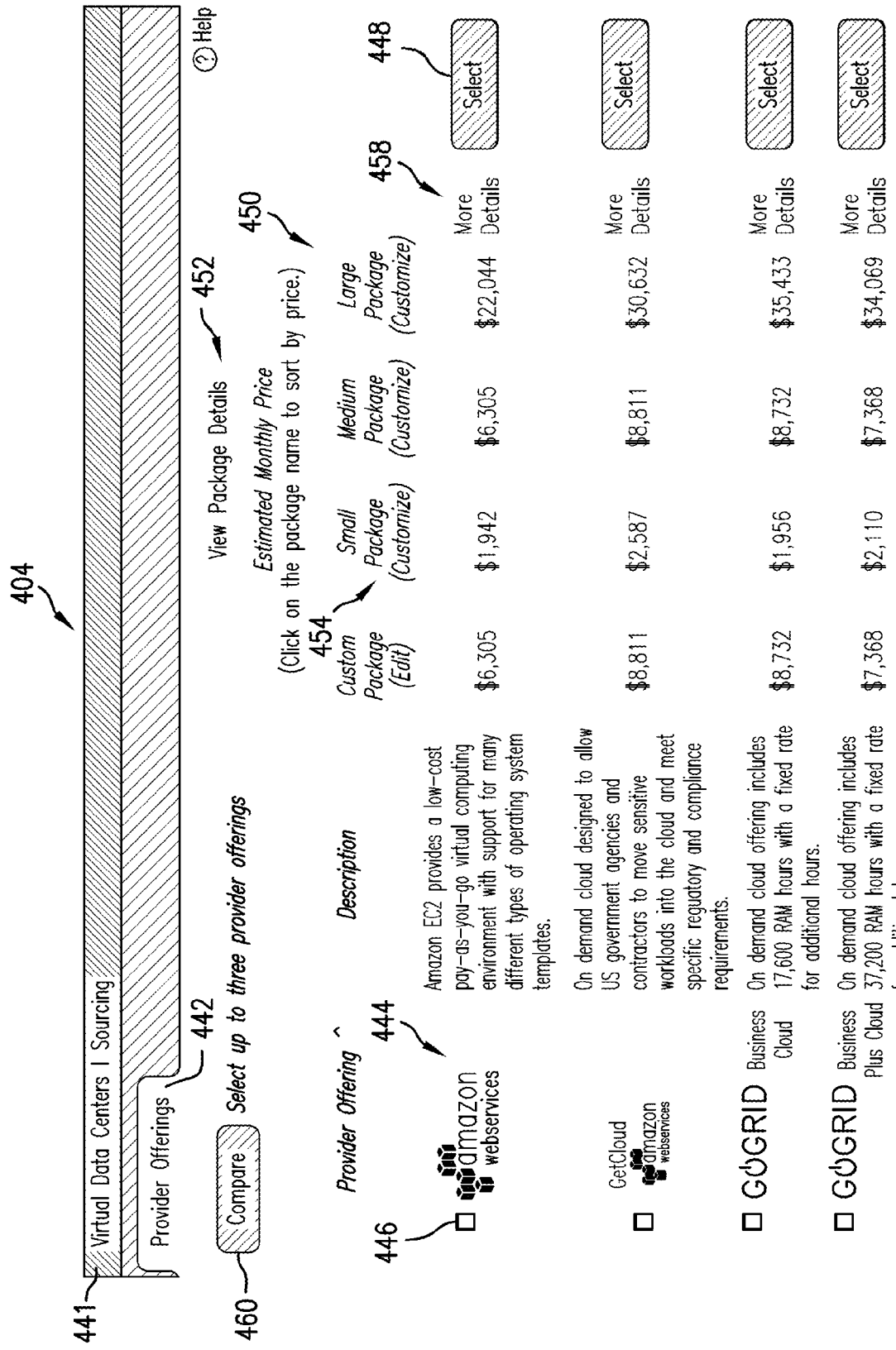
FIG. 8A is an illustrative view of a cloud services sourcing screen of a CSB platform (e.g., a portal thereof) configured in accordance with an embodiment of the present invention.

A sourcing selection 440 (FIG. 7) of the VDC tab 404 takes the user to a sourcing section 441 of the VDC tab 404 for allowing the user to compare cloud provider packages (i.e., VDC package offerings) at a Provider Offering screen 442 (FIG. 8A). At this stage, a user (i.e., a cloud services consumer) is not actually buying, provisioning or fulfilling these packages, but is attempting to identify or map its requirements to a package and use that package to compare which cloud service provider to select. Referring now to FIG. 8A, the user chooses available packages 444 to be compared by selecting (i.e., checking) a plurality of provider offering boxes 446 and then clicks a Select button 448 next to a selected provider offering 444 to bring up the VDC ordering popup with the configuration values already pre-populated. Clicking the Select button 448 simply pre-populates the configuration values in VDC Order screen(s) to enable the comparison and allows the user to specify a package configuration. Each package configuration 450 has an estimated price (e.g., monthly, quarterly or annually) shown. Examples of the package configurations include, but are not limited to, a custom package, a small package (e.g., a relatively small cloud), a medium package (i.e., a medium size cloud), and a large package (i.e., an enterprise level cloud). The used can click a View Sample Solution Package Details button 452 or any package column row header 454 to bring up package details. Each available package has a description 456 of the provider offering 444. For a more detailed description, a user can select a More Details button 458 to cause additional information (i.e., specific package configuration information) on the provider offering 444 to be displayed (i.e., outputted).

Figure 8B:
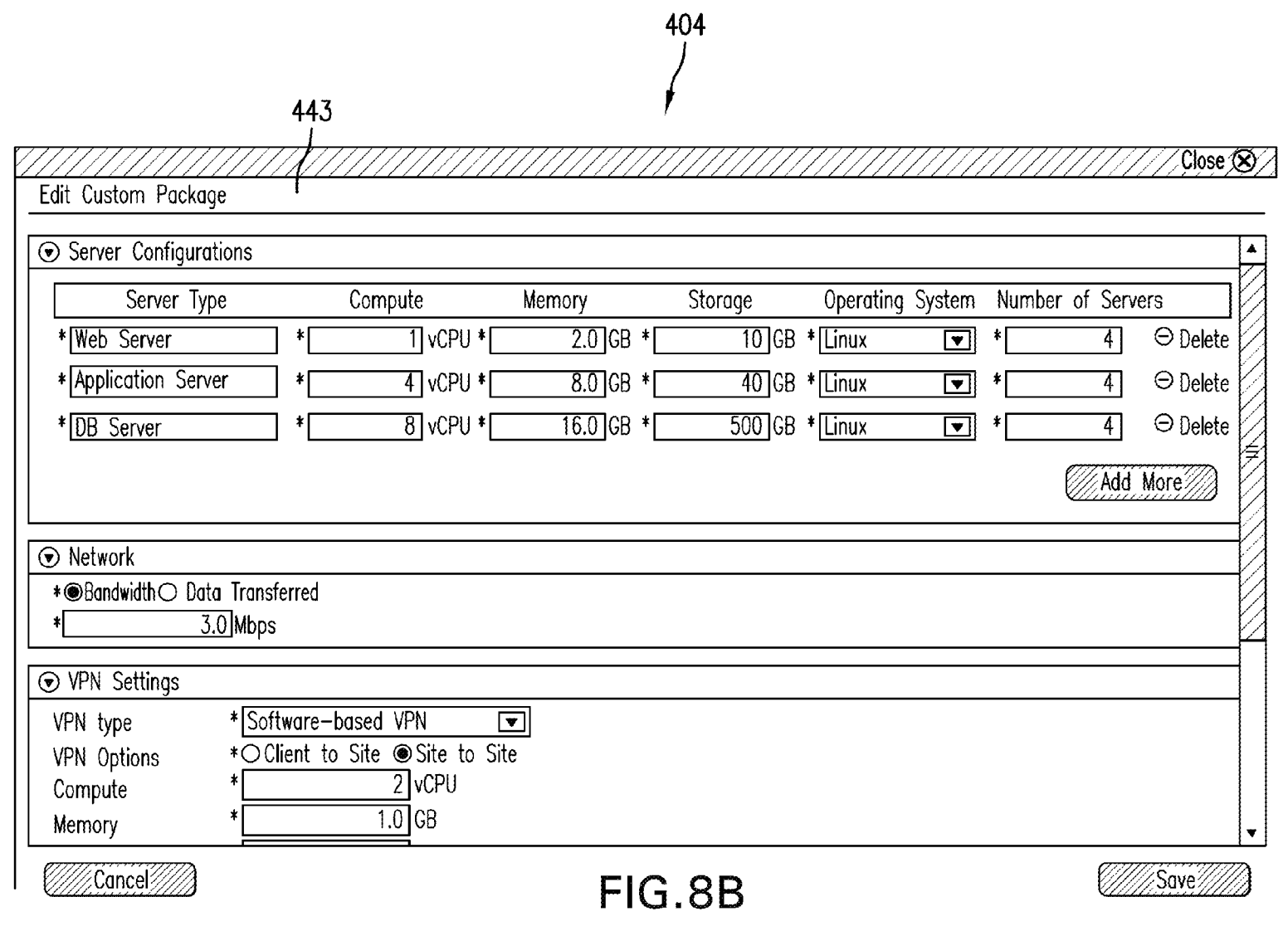

As shown in FIG. 8B, the user creates the custom package through use of a custom package editing screen 443. The custom package can be created by choosing to customize one of the pre-configured packages (e.g., small, medium or large package) on the Provider Offering screen 442 whereby the package customization process entails starting with all or certain package configuration parameter fields of the custom package editing screen 443 populated with configuration parameters based on a selected pre-configured packages and the user editing the configuration parameter of all or a portion of the package configuration parameter fields. Alternately, the custom package can be created by from the ground up whereby the package customization process entails starting with all or certain package configuration parameter fields of the custom package editing screen 443 empty and the user editing the configuration parameter all or a portion of the package configuration parameter fields.

To compare the selected ones of the provider offerings 444 (i.e., those with the provider offering boxes 446 checked), the user clicks the compare button 460 thereby causing a Provider Offerings Comparison screen 457 to be displayed (FIG. 9). Referring now to FIG. 9, the Provider Offerings Comparison screen 457 allows the user to compare a plurality of provider offerings (e.g., up to 3) in a side-by-side manner with key features highlighted for each provider offering. Choosing the select button 462 on the Provider Offerings Comparison screen 457 causes the user to be directed to a VDC Ordering Pop-up screen (not shown) with the configuration values already pre-populated based on your selection.

Comparisons between provider offerings can be sorted into broad categories of usage for Small, Medium, and Large VDCs. For example, if the user is running a public catalog website, it may need only two application servers, one database server, and one VPN server, whereas an enterprise-class application with thousands of concurrent users may have 20 web servers, 20 application servers, 12 database servers, and 8 VPN servers, with vastly increased memory, CPU, network, and storage requirements. It is acceptable for the users exact requirements to vary from a particular the sample package. The user can simply pick the package that is closest to its needs and alter that package as part of the design process that is similar to the Add New VDC process discussed below.

Examples of comparison parameters include, but are not limited to, Description (e.g., a brief description of the provider offerings); Virtual Machine (e.g., summary of the RAM (in GB), CPUs, and local storage (usually in GB) included in the provider offering, which can be adjusted later during an Add Resource Group process); Network (e.g., overview for the bandwidth, VLANs, minimum guaranteed throughput, pricing model for network traffic, server load balancer and private network provisions for the provider offerings); Storage (e.g., overview of the architecture, snapshots, backup policy, and shared storage for the provider storage offerings); Security (e.g., summary of firewall and intrusion detection/prevention for provider offerings); SLA (e.g., what uptime does the provider guarantee for their offering); Operating System (e.g., which operating systems the provider has available for its VMs, particular variety of OS, any restrictions on uploading your own image to a "blank" server); Provisioning Time (e.g., time for the provider to provision VDCs and VMs, which frequently can assume that configuring the first VDC created will take more time than subsequent VDCs); Support (e.g., provider support policies); Location (e.g., Geographical location of the provider's physical data center); and Pricing (e.g., Provider pricing for small, medium and large packages). The values of comparison parameters represent entries of a particular service e provider offering in a catalog (e.g., service provider offering portion thereof) configured in accordance with an embodiment of the present invention.

Figure 10:
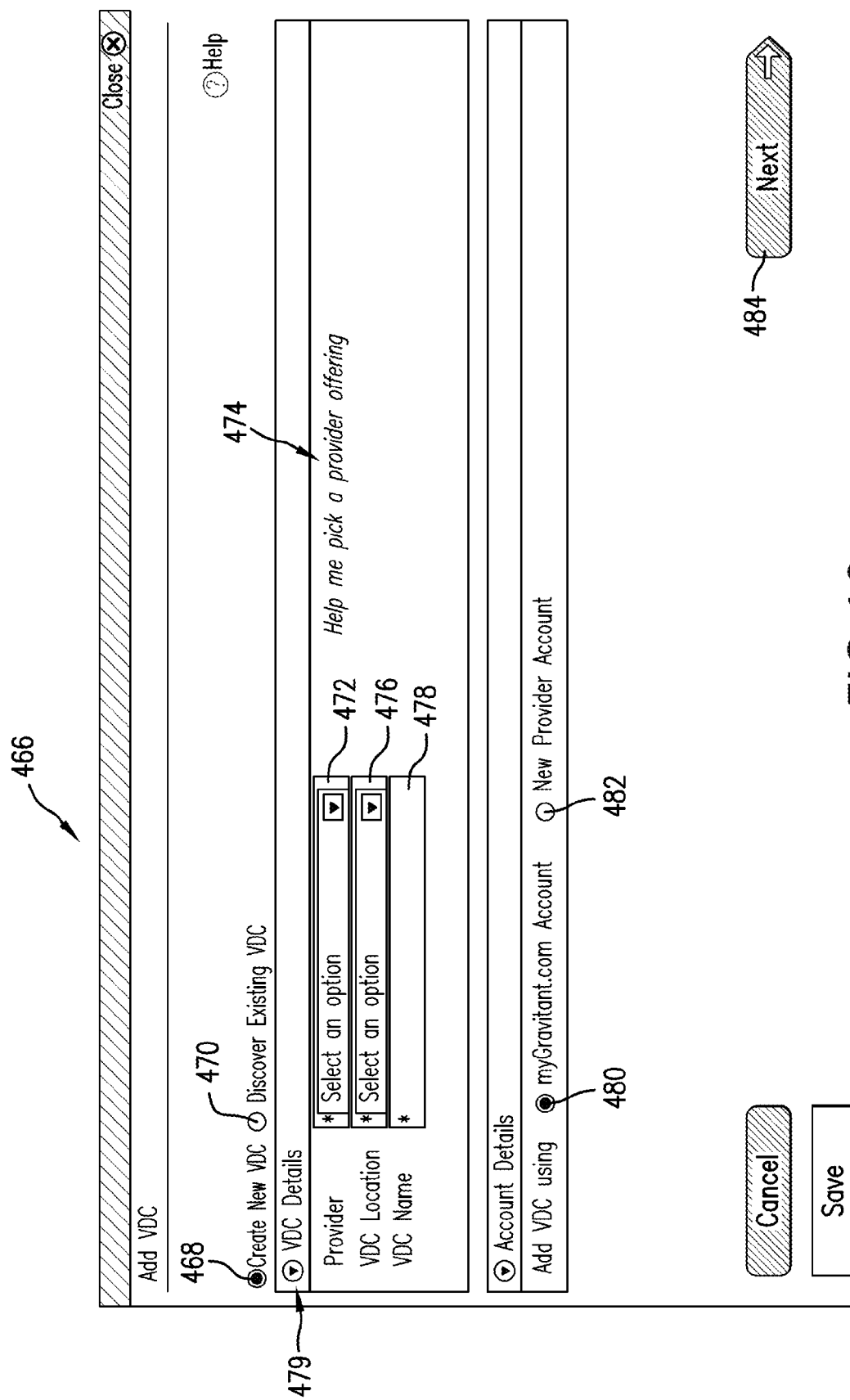
FIG. 10 is an illustrative view of a virtual data center (VDC) pop-up screen of a CSB platform (e.g., a portal thereof) configured in accordance with an embodiment of the present invention.

Instead of ordering line items from a catalog, a user (e.g., a cloud service consumer) can design a customized VDC with capacity and/or virtual resources. Thereafter, the user can cause the CSB platform (i.e., system configured in accordance with the present invention) to automatically generate an order for a selected cloud service provider to fulfill the VDC design order. To this end, the user can select an add VDC selection 464 (FIG. 7) of the VDC tab 404 for causing a Virtual Data Center Pop-up screen 466 (FIG. 10) to be displayed. Referring now to FIG. 10, the Virtual Data Center Pop-up screen 466 enables the user to create an entirely new VDC by selecting a create new VDC button 468 or discover an existing VDC that it has already created (e.g., outside the portal using provider tools) by selecting a discover existing VDC button 470. As discussed below in greater detail, pulling in an existing VDC can be implemented by the user being instructed to first discover the existing VDC, then replicate information of the existing in the portal, and then synchronize all its existing VMs to the portal using a sync process. Clicking the Save button 468 during any point after the user has named the VDC causes that names VDC to appear in the My Virtual Data Centers list in the Recently Updated Resource section 416 of the home navigation tab 402 (FIG. 7) with a status indicated as being "Created".

Figure 11:
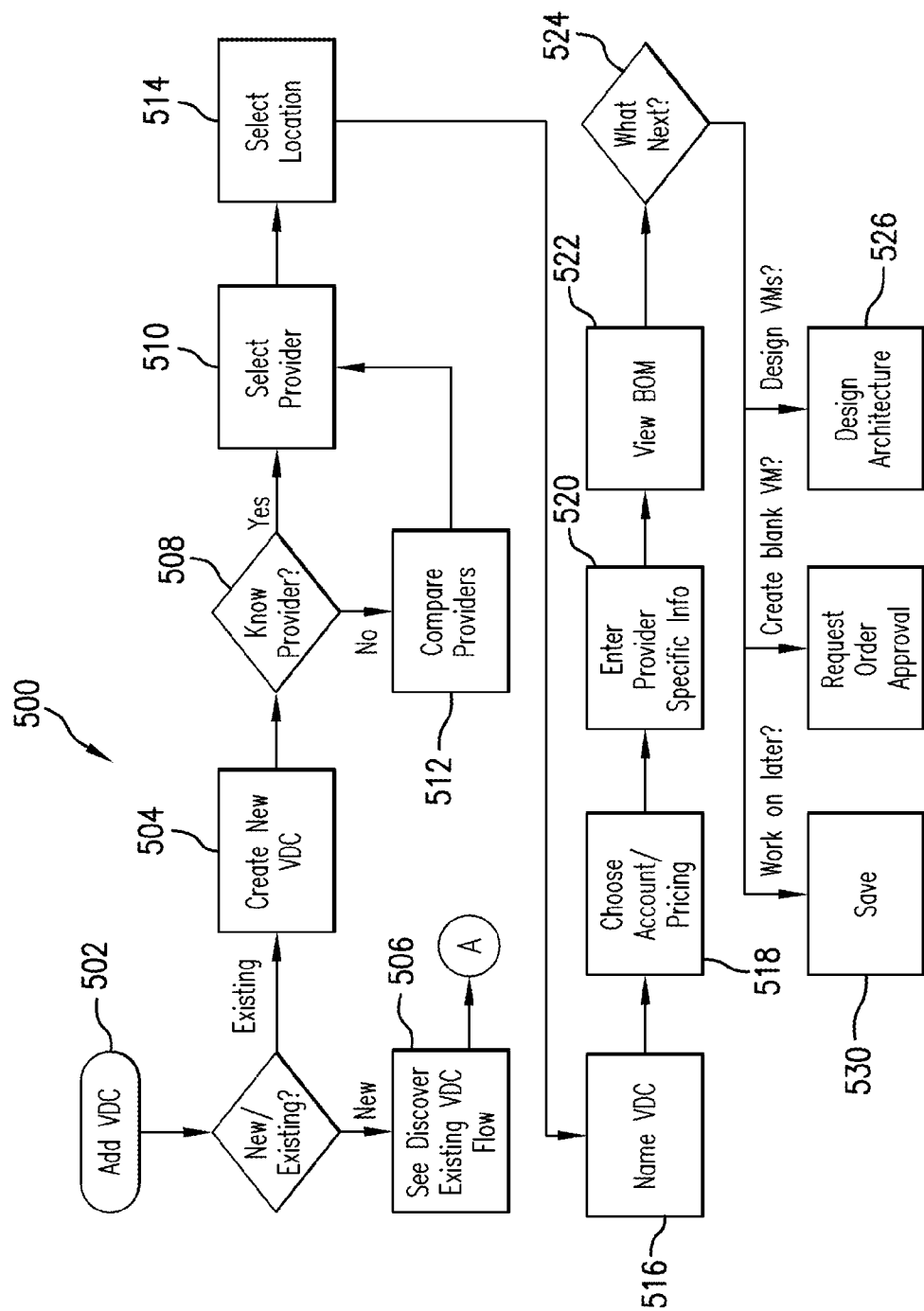
FIG. 11 is a flow diagram showing a method for setting up a VDC in accordance with an embodiment of the present invention.

Referring to FIGS. 10 and 11, a method 500 (FIG. 11) for setting up a VDC is shown. A step 502 is performed for selecting the Add VDC button 464 of the VDC tab 404 (FIG. 7) for causing the Virtual Data Center Portfolio Pop-up screen 466 (FIG. 10) to be displayed. The user has the choice of performing a step 504 for selecting the create new VDC button 468 for creating a new VDC or performing a step 506 for selecting the discover existing VDC button 470 for setting up a VDC based on an existing VDC that has been created outside of the CSB platform 202.

When setting up a new VDC, a step 508 is performed for querying the user if the cloud service provider for the VDC is known or not. If the cloud service provider for the VDC is known, a step 510 is performed for enabling the user to select the provider at the provider entry box 472 of the Virtual Data Center Portfolio Pop-up screen 466 (FIG. 10). If the cloud service provider for the VDC is unknown, the user can select Help Me Pick A Provider button 474 of the Virtual Data Center Portfolio Pop-up screen 466 in FIG. 10 thereby implementing a step 512 for enabling the user to determine a desired cloud service provide (e.g., via the comparison method discussed above in reference to FIGS. 8 and 9). Once the desired provider is determined, the step 512 is performed for enabling the user to select the provider at the provider name box 472 in conjunction with a step 514 being performed for enabling the user to select a VDC location at a VDC location box 476 of the Virtual Data Center Portfolio Pop-up screen 466 (FIG. 10) and a step 516 being performed for enabling the user to name the VDC at the VDC name box 478 of the Virtual Data Center Portfolio Pop-up screen 466 (FIG. 10). The provider name box 472, the VDC location box 476 and the VDC name box 478 are within a VDC details section 479 of the Virtual Data Center Portfolio Pop-up screen 466 (FIG. 10).

The user is then prompted to perform a step 518 for choosing whether to add the newly created VDC using an existing cloud consumer account by selecting an existing cloud consumer account button 480 of the Virtual Data Center Portfolio Pop-up screen 466 (FIG. 10) or a new provider account by selecting a new provider account button 482 of the Virtual Data Center Portfolio Pop-up screen 466 (FIG. 10). If adding the newly created VDC using a new provider account, the user also chooses pricing details. The account options provider name box 472, the VDC location box 476 and the VDC name box 478 are within a VDC details section 479 of the Virtual Data Center Portfolio Pop-up screen 466 (FIG. 10).

A step 520 is performed for enabling the user to enter provider-specific information. Examples of provider-specific information include, but is not limited to, information related to capacity being charged based on reserved capacity, supporting bursting at additional cost based on the bursting amount needed; information related to a number of resources that can be created and their actual utilization counts toward reserved capacity; information related to resources being charged based on hourly metering of the allocated capacity turned on; information related to each resource being allocated and turned on being charged independently; information related to capacity not being pre-ordered whereby managed physical servers are required for applications or middleware that cannot be installed on virtual resources; information related to VDCs not requiring reserved capacity; and information related to package plans based on RAM hours and data transfer with pay-as-you-go or monthly/annual pre-pay options.

The user is then prompted to select the Next button 484 of the Virtual Data Center Portfolio Pop-up screen 466 (FIG. 10) and a step 522 is performed for enabling the user to view Bill of Materials (BOM) information 486 for the new VDC. The BOM information 486 is displayed in a BOM details information section 488 of the Virtual Data Center Portfolio Pop-up screen 466 as shown in FIG. 10. For example, the BOM information can be a consolidated bill with any and all orders that the user has modeled. A step 524 is then performed for giving the user the option of performing a step 526 for initiating a design architecture process for designing VMs that the user would like to provision, performing a step 528 for requesting order approval to send the order through an approval process, or a step 530 for saving the order and optionally taking the user back to the Virtual Data Center screen 466 to model a VMs and/or additional services.

Figure 13:
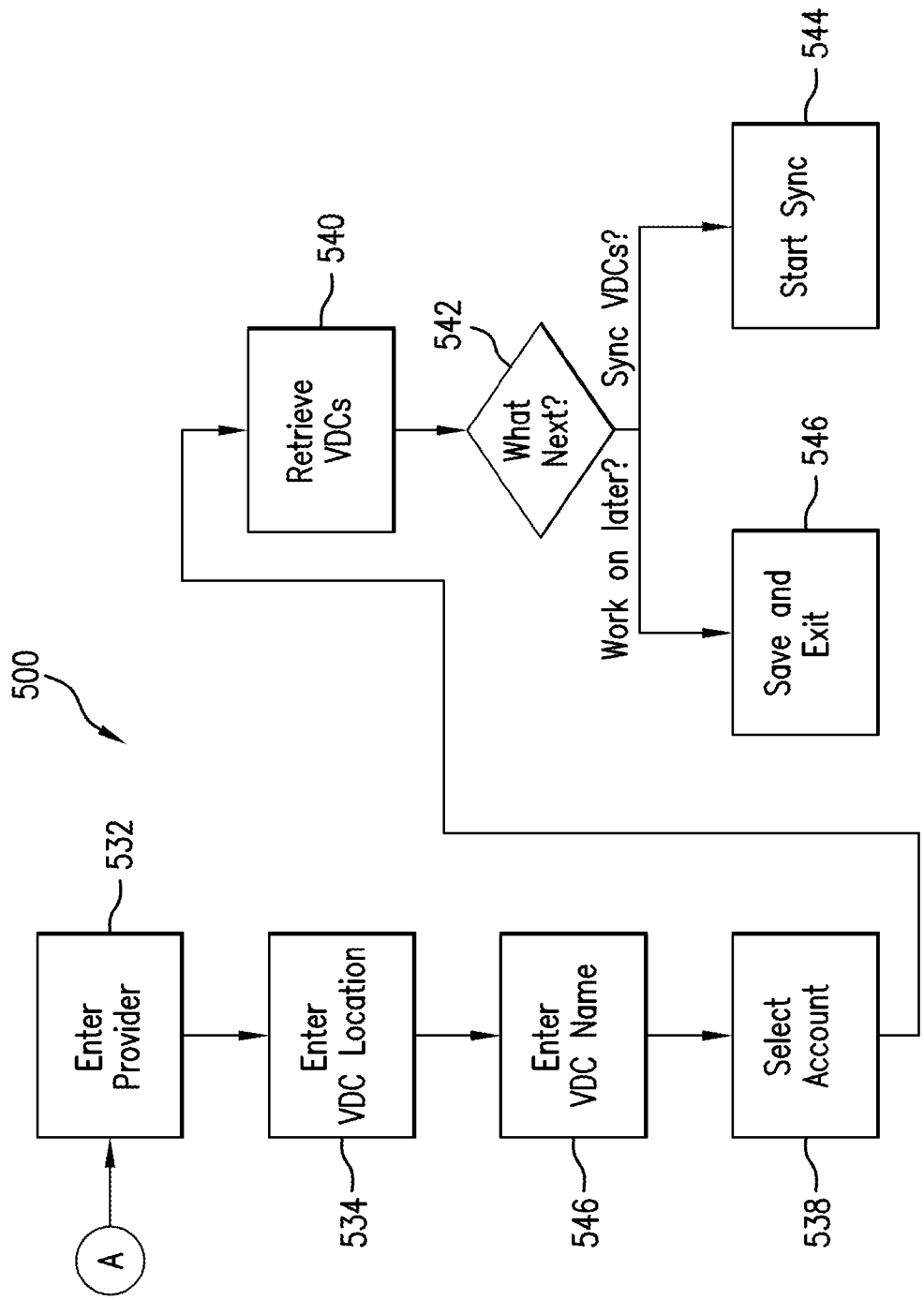
FIG. 13 is a flow diagram showing a method for discovering an existing VDC in accordance with an embodiment of the present invention.

Referring now to FIG. 13, when selecting the discover existing VDC button 470 for setting up a VDC based on an existing VDC that has been created outside of the CSB platform 202, the method 500 performs a step 532 for enabling the user to enter a provider at a provider entry box of a screen similar to the Virtual Data Center Portfolio Pop-up screen 466 (FIG. 10), performs a step 534 for enabling the user to enter a VDC location at a VDC location box of a screen similar to the Virtual Data Center Portfolio Pop-up screen 466 (FIG. 10), and performs a step 536 for enabling the user to enter a name of the VDC at a VDC name box of a screen similar to the Virtual Data Center Portfolio Pop-up screen 466 (FIG. 10). A step 538 is performed for enabling the user to enter provider account information (e.g., credentials) at a provider account entry box of a screen similar to the Virtual Data Center Portfolio Pop-up screen 466 (FIG. 10). A step 540 is then performed for verifying the provider account information and retrieving the VDC(s) in response to the provider account information being successfully verified. A step 543 is performed for enabling the user to enter sync and/or provisioning properties at a synch/provisioning properties box of a screen similar to the Virtual Data Center Portfolio Pop-up screen 466 (FIG. 10). For example, the user can choose whether or not to include public or VPC (Virtual Private Cloud) resources. A step 542 is then performed for giving the user the option of performing a step 544 for enabling the user to start a process for synchronizing selected VDCs to the portal or an operation 546 for saving the gathered information and taking the user back to the Virtual Data Center Portfolio Pop-up screen 466.

Referring back to FIG. 11, when the step 526 is performed for initiating the design architecture process, the method 50 takes the user to an IT Architecture page of the VDC tab 404 (discussed below in greater detail). The IT Architecture page provides a composite (e.g., single pane of glass) view to model and provision resources and services from different providers. Once the user is finished designing its IT architecture, the user can access the BOM details information section 488 of the Virtual Data Center Portfolio Pop-up screen 466 to view its entire order, including VDC, resources and services and the associated line items from the service catalog grouped by VDC and service providers.

Referring back to FIG. 11, when the step 528 is performed for requesting order approval to send the order through the order approval process, the BOM details information section 488 of the Virtual Data Center Portfolio Pop-up screen 466 appears and shows a consolidated bill detailing all items that have been created. The detail line items will also be priced and a total monthly recurring cost calculated. For every line item, the charge can be a fixed monthly recurring charge (MRC), an estimated usage charge, or a non-recurring charge (NRC or one-time charge). Usage-based charges are based on actual resources utilization. Unit and Unit Price indicate the utilization units and price used to measure how line items are charged. Quantity represents the actual utilization values by which the unit price is multiplied. When line items have a unit-based charge, the default estimated usage charge can assume the resource is fully utilized for the entire calendar month.

The order approval process requires that the VDC order goes through Technical, Legal, and Financial approval before the order can officially be placed. In this regard, a Technical Approver, Legal Approver, and Financial Approver must approve the order for enabling the order to be placed. Orders can include a VDC, virtual machines, applications and services, which can all be modeled using a CSB platform configured in accordance with an embodiment of the present invention (e.g., the CSB platform 202). Workflow of the order approval can be customized by assigning multiple customer roles to a single user. For example, if the user's role includes Technical Approver and Financial Approver roles, the appropriate Technical and Financial checkboxes in an order approval pop-up screen would be enabled, which can then be selected in a single step for approving the order. A comment box allows can be provided for enabling a user to communicate with other users (e.g., approvers) and leave comments shown in an Order History view for an order. The Order History view shows all of the approvals that have been recorded. Once current status changes to "Approved" (i.e., after all approvals have been obtained), the user can place the order for processing.

After the order approval process is successfully completed, the VDC order can be placed by selecting a Place Order button on an appropriate screen. In response, the order status changes to Submitted and the VDC order is sent to forwarded from the CSB platform 202 the appropriate cloud service provider. A CSB platform administrator communicates with cloud service provider to ensure proper order fulfillment and updates status progress. After submitting the new order (either the first initial order or any change order), status changes to Order in Progress. Once the order has been fulfilled, the VDC order status changes to Active.

Figure 12:
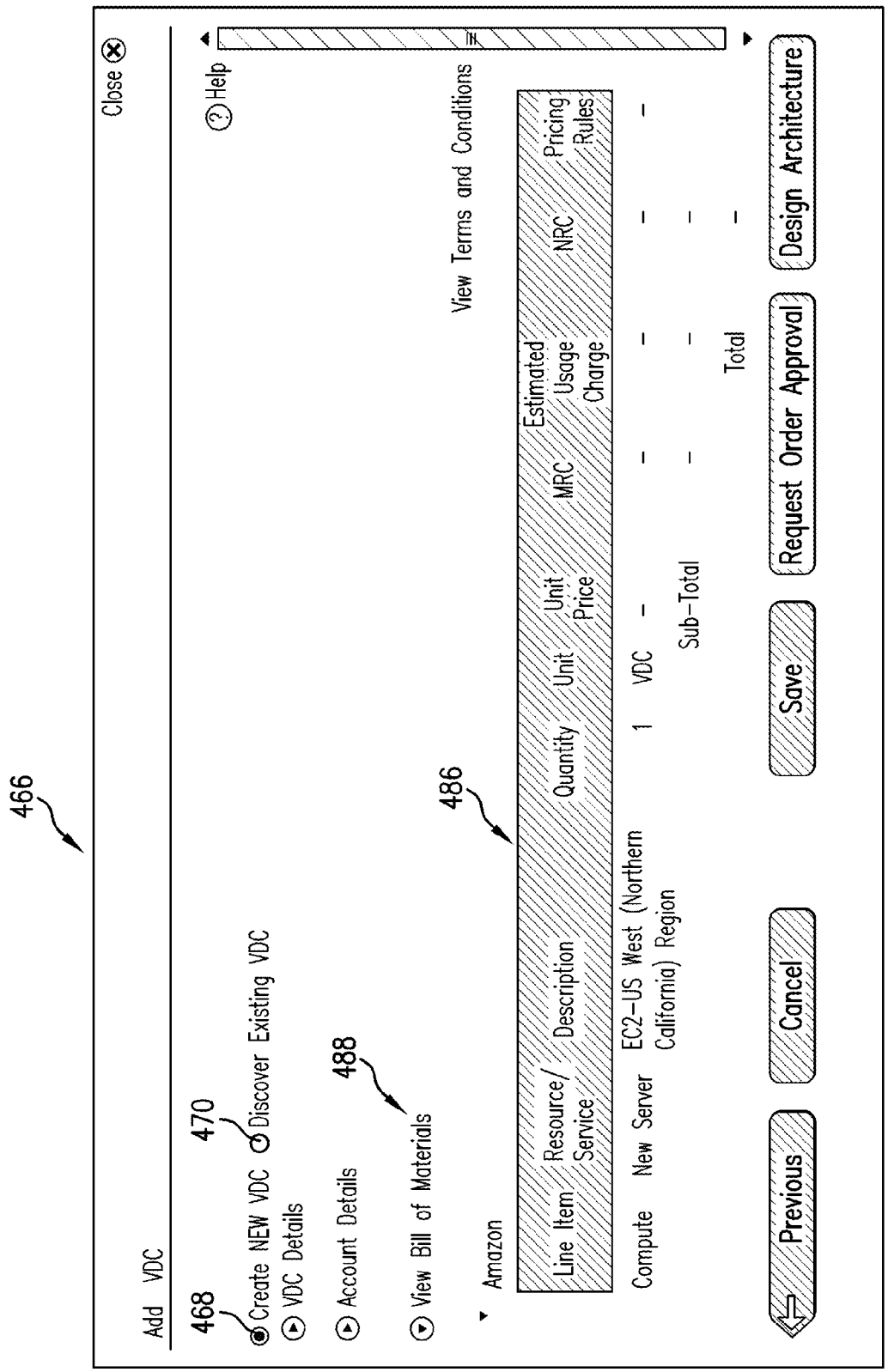
FIG. 12 is an illustrative view of a BOM details information section of the virtual data center (VDC) pop-up screen shown in FIG. 10.
Figure 14:
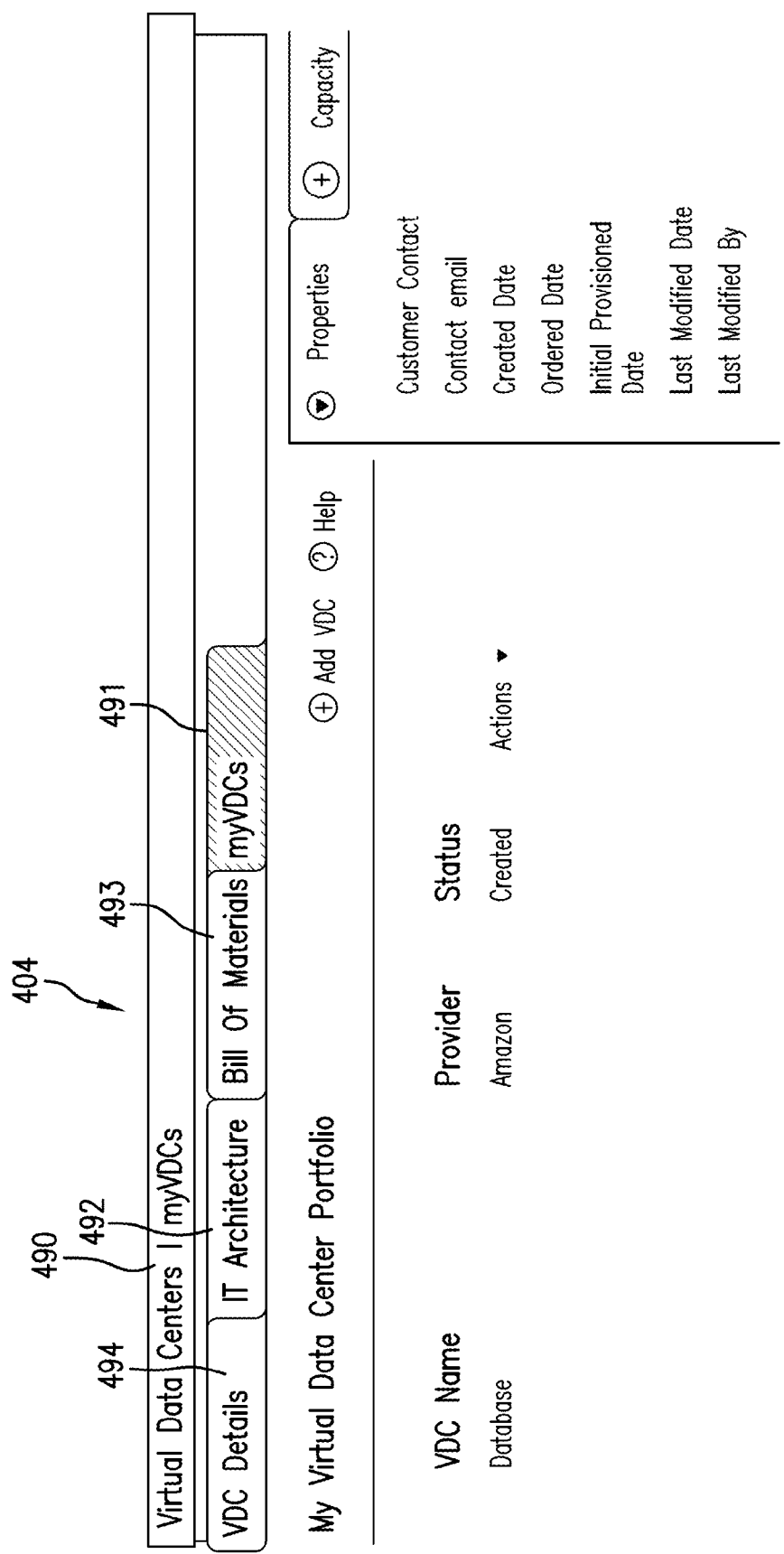
FIG. 14 is an illustrative view of a my VDCs page in a my VDCs section of a VDC tab of a CSB platform (e.g., a portal thereof) configured in accordance with an embodiment of the present invention.
Figure 15:
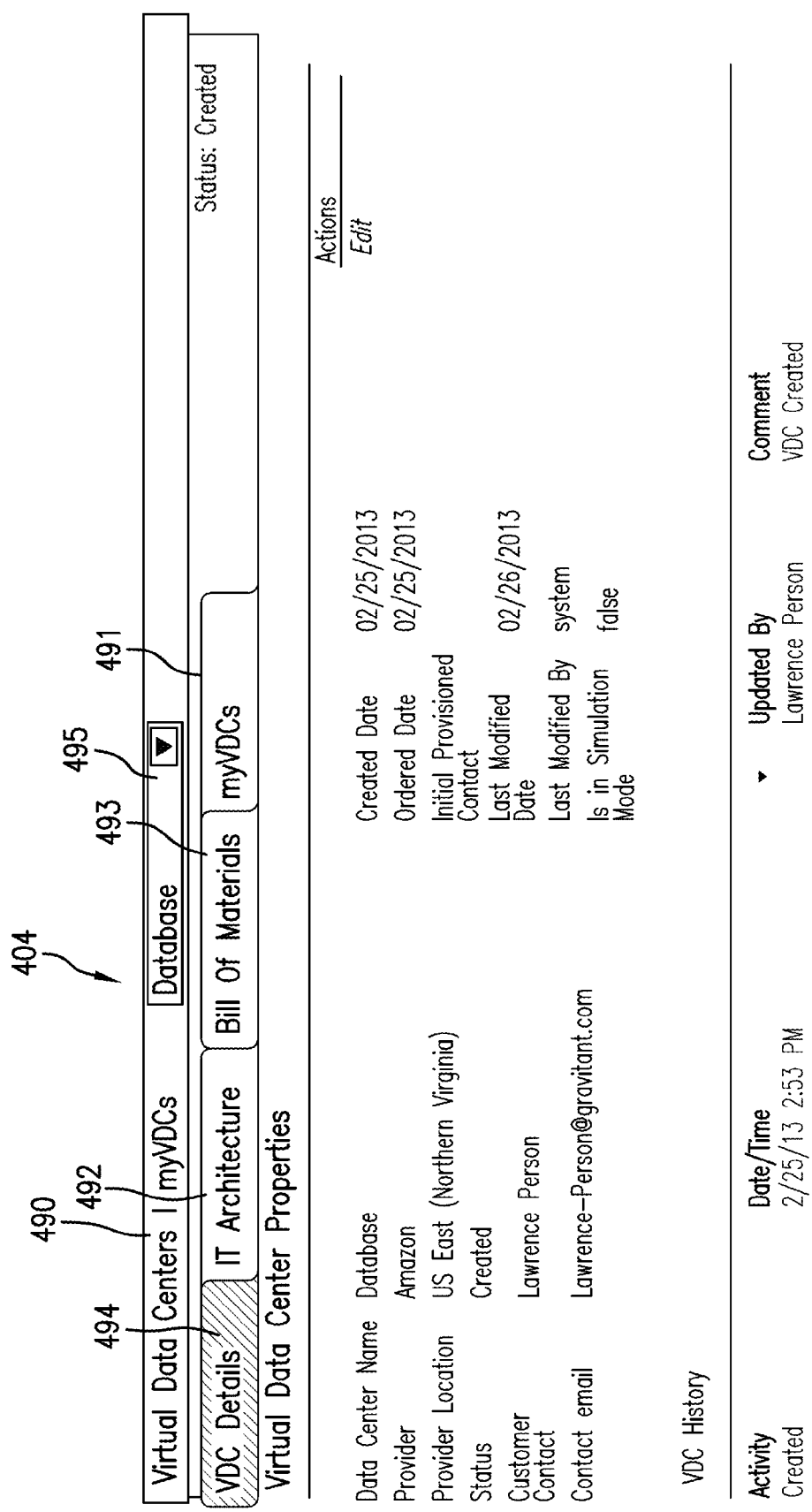
FIG. 15 is an illustrative view of a VDC Details page in the myVDCs section of FIG. 14.

Through a suitable action (e.g., selection of a myVDCs selection 465 at the VDC tab 404), the user is presented with a myVDCs section 490 of the VDC tab 404, as shown in FIGS. 14 and 15. At a myVDCs page 491 in the myVDCs section 490 (FIG. 14), the user's VDCs are listed along with their corresponding status (e.g., Created, Approval in Progress, Order In Progress, Provisioning In Progress, Changes Pending, Active, Inactive). If the status of any particular VDC sis Created or Active, resources can be modeled through on an IT Architecture page 492 of the VDC tab 404, as discussed below in greater detail. The BOM information discussed above in reference to FIG. 12 can be accessed via the Bill of Materials page 493 of the VDC tab 404. A VDC Details page 494 of the VDC tab 404 shows various properties and actions available for a selected VDC (e.g., VDC named "Database" selected within drop down menu 495 of the VDC Details page 494). Advantageously, as discussed below in greater detail, certain ones of the pages of one screen are also a viewable page option of another screen (e.g., the IT Architecture page 492 is a viewable option within the VDC tab 404 and within the Applications tab 406).

Figure 16:
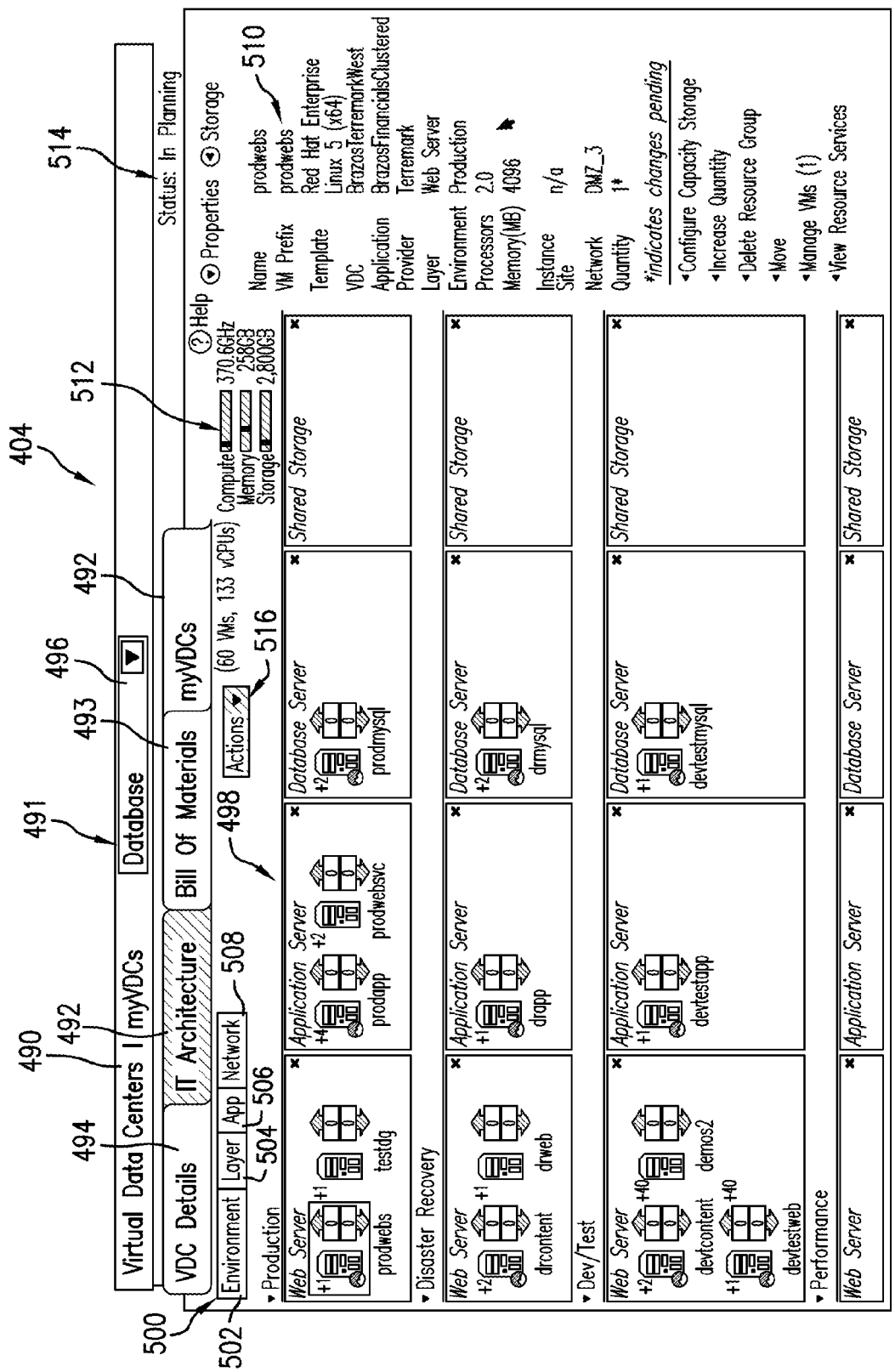
FIG. 16 is an illustrative view of an IT architecture page in a myVDCs section of a VDC tab of a CSB platform (e.g., a portal thereof) configured in accordance with an embodiment of the present invention, wherein the VDC information depicted in an architecture layout is filtered by environment and layer.

Referring now to FIG. 16, an IT Architecture page 492 of the VDC tab 404 is shown. The IT Architecture page provides a composite (e.g., single pane of glass) view of an architecture layout 498 of resources within a selected VDC (i.e., as designated at a VDC dropdown list 496), enables comprehensive service aggregation, and enables the user to model and provision VDC resources and services from different providers. In essence, the IT Architecture page 492 provides the user with a cloud level view of the resources that populate its cloud (i.e., provides an illustrative depiction of what is in the user's cloud(s)). The IT Architecture page 492 enables the user to create resources and resource groups. All resources are assumed to be in a resource group, even if there is only one resource in the group. Resource groups can be assigned to an architectural layer such as, for example, a Web Server layer, an Application Server layer, a Database Server layer, a Shared Storage layer, a LDAP layer, or the like. Resource groups can also be assigned to an application environment such as, for example, a Development environment, a Test environment, a development/test environment, a performance environment, a disaster recovery environment, or the like.

Advantageously, assignment of resources to a respective architectural layer and a respective application environment allow the resources of each VDC (and network on which the VDC is hosted) to be presented to the user in a plurality of different resource views 500. As shown in FIG. 16, at the VDC tab 404, these views include, an Environment view 502, a Layer view 504, an Application view 506, and a Network view 508. Furthermore, selection of a given one of the layers 502-508 allows multi-level filtering on a per-view basis. For example, the architecture layout 498 in FIG. 16 is filtered with the environment view 502 as a primary filter and the layer view 504 as a secondary filter. It should also be understood that the layers can be defined on a per-tab basis. For example, in the VDC tab, the Application view 506 is available whereas, when the IT Architecture page 492 is accessed from within the Application tab 406 (FIG. 7), the Application view 506 is replaced with a VDC view (i.e., resources filtered based on the VDC in which they are a resource).

Resource group specification information 510, resource group utilization information 512, and resource status information 514 is presented at the IT Architecture page 492. Examples of the group specification information 510 include, but are not limited to, VM name, VM prefix, VDC template name, application name, provider name, environment name, processor specification, memory size, network name, VM quantity and the like. Examples of resource group utilization information includes, but are not limited to, compute resource (e.g., CPU) utilization amount, memory resource (e.g., RAM) utilization amount, and storage (e.g., harddrive, flash, etc) utilization amount. Examples of resource status information includes, but are not limited to, created, in planning, order in progress, provisioning in process, active, changes pending, inactive, submitted, approval in process, submitted to provider, and the like.

At the IT Architecture page 492, the user can manage resources such as, for example, though use of the Action menu 516. Examples of Resource Group management actions include, but are not limited to, configuring capacity/ storage (e.g., increase the amount/quantity of processors, memory, network bandwidth, storage, etc); increasing quantity of a VM; deleting a resource group; moving selected resources between VDCs, environments, or layers; managing VMs parameters (e.g., name, status, capacity, login password and IP address, etc); controlling power state of VMs (e.g., power on, power off, reboot). Examples of VDC management actions include, but are not limited to, adding resource groups (e.g., VMs), adding VMs to a VDC, a adding resources or services to a VM; viewing services configured to a VDC as well as service provider and the service status; provisioning changes made to a VDC; connecting into a VDC using a VPN connection; viewing activity logs for a VDC; and synching to an existing VM.

Figure 17:
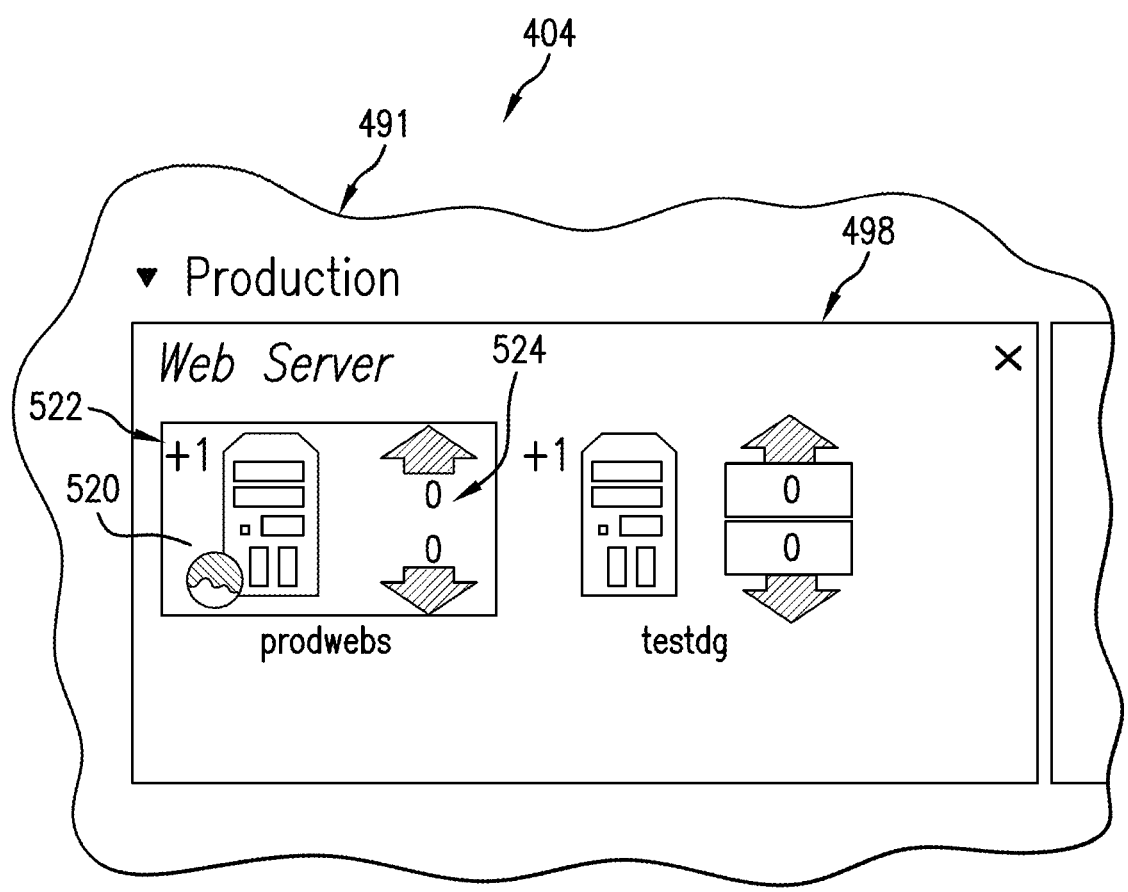
FIG. 17 is an illustrative view of a virtual machine (VM) within the architecture layout shown in FIG. 16.

FIGS. 16 and 17 show that resource groups of each environment (e.g., Production environment, Disaster Recover environment, Dev/Test environment, Performance environment, etc) are associated with respective layers (e.g., Web Server layer, Application Server layer, Database Server layer, etc). Each resource (e.g., the selected resource group 520 in FIG. 17) shows a VM quantity indicator 522 and a VM status indicator 524. The VM quantity indicator 522 is visible in statuses such as Planning to show the number of VMs that are in the resource group. As the VMs are provisioned and brought to an active status, the VM quantity indicator 522 is decremented and the VM status indicator 524 shows the number of VMs that are active (e.g., powered up as indicated by number next to up arrow) and the number that are not powered up (e.g., not powered up (e.g., inactive) as indicated by number next to down arrow). For example, the VM quantity indicator 522 for the selected resource group 520 indicates that this resource group has one (1) VM (i.e., indicated by "+1") and the VM status indicator 524 for the selected resource group 520 indicates that VM is not yet provisioned (i.e., indicated by "0" next to the up and down arrows and thus is not active or inactive. Once provisioning is complete, the +1 will be removed and the VM status indicator 524 will indicate that the VM is active (i.e., indicated by "1" next to the up arrow) or, if so set, inactive (i.e., indicated by "1" next to the down arrow). Accordingly, one can see that the VM quantity indicator 522 and the VM status indicator 524 (and other information in the VDC tab 404) jointly provide information as to a number of VMs in a resource group, the provisioning status of a resource group (e.g., the VMs thereof), the activity status of the resource group (e.g., the VMs thereof once provisioned), and a current status of a VDC comprising the resource group.

Applications Tab

The Applications tab 406 (FIG. 7) provides functionalities related to creating, editing and managing applications. Examples of applications include, but are not limited to, custom business applications, IT applications, third-party applications and SaaS applications. Through the Applications tab 406, a user can perform actions such as, for example, creating new applications, map virtual data centers to applications; define, view and manage application architecture within a single VDC or across multiple VDCs; and associate applications with virtual resources. When a resource is associated to an application and VDC, mapping created automatically between that application and the VDC enables collaboration and orchestration of Application resources for many users.

Figure 18:
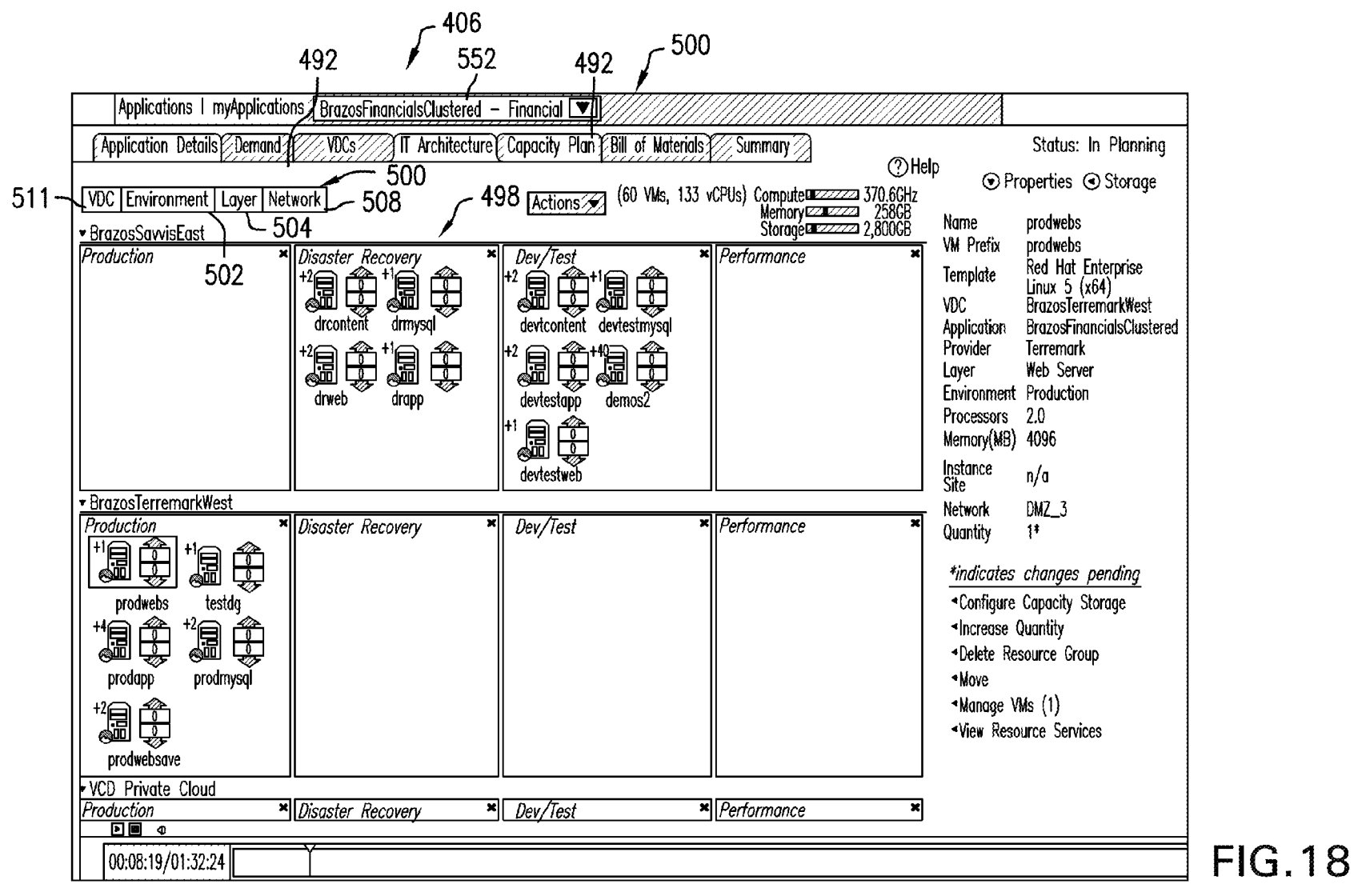

Through a suitable action (e.g., selection of a myApplications selection at the Applications tab 406), the user is presented with a myApplications section 550 of the Applications tab 406, as shown in FIG. 18. As shown in FIG. 18, various information pages can be accessed via the myApplications section 550 of the Applications tab 406. Examples of these pages include an applications details page, a demand page, a VDC, page, an IT architecture page, a capacity plans page, a bill of materials page, and a summary page. Advantageously, at least a portion of this information is presented in the context of the available applications (e.g., on a per-application basis). For example, as discussed above in reference to the VDC tab 404, the IT Architecture page 492 (FIG. 16) can be accessed from within the Application tab 406. In this regard, IT architecture functionalities such as those discussed above in reference to the VDC tab 404 can be performed from the myApplications section 550 via the IT Architecture page 492. As discussed above in reference to the VDC tab 404, assignment of resources to a respective architectural layer and a respective application environment allow the resources of each VDC (and network on which the VDC is hosted) to be presented to the user in a plurality of different resource views 500. As shown in FIG. 18, at the Applications tab 406, these views include, the Environment view 502, the Layer view 504, the Network view 508 and the VDC view 511. In this regard, in the Applications tab 406, the IT Architecture page 492 provides a composite view of the architecture layout 498 of resources within a selected Application (i.e., as designated at a application dropdown list 552), enables comprehensive service aggregation, and enables the user to model and provision VDC resources and services from different providers.

At an Applications Details page 554 (e.g., assessed by a corresponding selection at the myApplications section 550) on the Applications tab 406, the user can view application properties information, application classification information and application history information on a per-application basis. Examples of the application properties information includes, but are not limited to, name of the application; name of a scenario associated with the application; a description of the application; an architecture type (e.g., Java N-Tier, Java Client-Server, .NET N-Tier, .NET Client Server, etc); status of the application (e.g., Created, Provisioning in Progress, Active, Changes Pending, and Inactive); a date the application was first created; contact information for a person associated with the application; and revision information for the application. The application classification information relates to application templates, supported environments (e.g., Development, Disaster Recovery, Production and Test), and architectural layers (e.g., Application Server, Database Server and Web Server). The application history information relates to history of edits to a selected application. Examples of the application history information includes, but are not limited to activity carried out on the application; date and time an activity occurred; the user updating the application; and description of the change.

The Applications tab 406 provides functionality for determining whether or not an application of a user (i.e., a cloud service consumer) is a good candidate to migrate to a cloud, as well as whether the user is ready to make that transition. This functionality is embodied in the Applications tab 406 (e.g., in the myApplications section 550) as an application screener 570, as shown in FIG. 19. The application screener 570 includes a portion for assessing applications (i.e., an application assessing portion 572), a portion for presenting application recommendations (i.e., an application recommendations portion 574), a portion for visually depicting application migration recommendation (i.e., an application migration chart 576), and a portion for visually depicting recommended cloud architecture for supporting migration of the application (i.e., a migration infrastructure chart 578). The application assessing portion 572 enables a user to subject an application to an assessment process for determining migration factors such as, for example, a relative migration readiness and a relative migration savings. The application recommendations portion 574 presents recommendation information for an application selected within the application assessing portion 572. Examples of the recommendation information include, but are not limited to, information related to migration feasibility relative to infrastructure, budget, and deployment time; information quantifying cost of migration, savings from migrating, and time to implement migration. The application migration chart 576 depicts a relative benefit of migrating the application with regard to readiness and value. The migration infrastructure chart 578 depicts a recommended infrastructure for migrating the application with regard to level of cloud (e.g., commodity or enterprise) and type of cloud (e.g., public or private).

Selecting an Add New Application field 580 in the an application assessing portion 572 of the application screener 570 initiates an application assessment process for evaluating migration of a particular application. In response to selecting the Add New Application field 580, a plurality of steps are performed for providing information upon which the application will be assessed. Examples of this information include, but are not limited to, application name; application category; number of concurrent users the application supports; annual growth rate for the application; demand variability if application demand varies by time of day, day of week, week or month, and/or month of year; location details including geographical dispersal, use of mobile apps (e.g., whether the user's organization functions independently or is susceptible to power outages or disasters); if the application is dependent on other upstream applications; the application platform (e.g., x86, Sun Sparc, PowerPC, and/or Mainframe) and the application OS (e.g., Linux, Windows, AIX, Solaris, and/or HP UX); if the online architecture is web-based, client-server or mainframe with terminal emulation; if the batch architecture is homogenous or heterogeneous with the online architecture; how many servers are required for each of development, test, production and disaster recovery environments; additional storage needs; bandwidth needs; required network reliability; time frame for migration; estimated budget for the migration; IT staff headcount; if a cloud migration strategy and/or organization exists; if the user's financial department has been updated to support a Cloud strategy; is there are any basic cloud monitoring tools in place and if they are across applications and systems; if there is a central configuration and management tool in place; if there is auto-provisioning and deployment governance tools in place; if the user own all hardware; if hardware is/will be located onsite or offsite; and if data is/will be onsite or offsite. The specific information for which the user is queried will be dependent on the specific implementation of the application assessment process.

Command and Control Tab

The Command And Control tab 408 (FIG. 7) provides functionalities related to managing orders, viewing monthly consolidated bills, and monitoring VDCs and applications. Through the Command And Control tab 408, the user can access various monitoring dashboards (i.e., pages) to track capacity, cost and utilization of resources or applications. Through the Command And Control tab 408, the user can also access and edit current orders in the system as well as access a consolidated bill for each calendar month showing actual charge details for all services from all providers.

Advantageously and beneficially, monitoring dashboards of the Command And Control tab 408 to track capacity, cost and utilization of VDCs (i.e., resources) and applications. More specifically, the monitoring dashboards enable a user to track capacity, cost and utilization of provisioned resources and to track capacity, cost and utilization of applications. These monitoring dashboards provide detailed information relating to aggregate spending across applications and VDCs, including deployment environments and architecture layers. The following discussion in regard to monitoring dashboards is directed to VDCs, but the same dashboard monitoring functionalities can be directly applied to monitoring applications (i.e., dashboard analysis by cloud allows a user you to monitor its provisioned clouds by VDC/Provider and dashboard analysis by application allows the user to monitor its provisioned applications).

Through a suitable action (e.g., selection of a myDashboards selection at the Control And Command tab 408), the user is presented with a myDashboards section 600 of the Control And Command tab 408, as shown in FIGS. 20-25. The myDashboards section 600 includes a drop-down menu 602 through which a desired one of a plurality of dashboards can be selected. Examples of information that can be presented via the dashboards include, but are not limited to, capacity cost trends, cost analysis, capacity summary, chargeback summary, and utilization. In this particular discussion, the selected dashboards is relate only to VDC analysis. But, dashboard for application analysis can be similarly selected at the drop-down menu 602.

Figure 20:
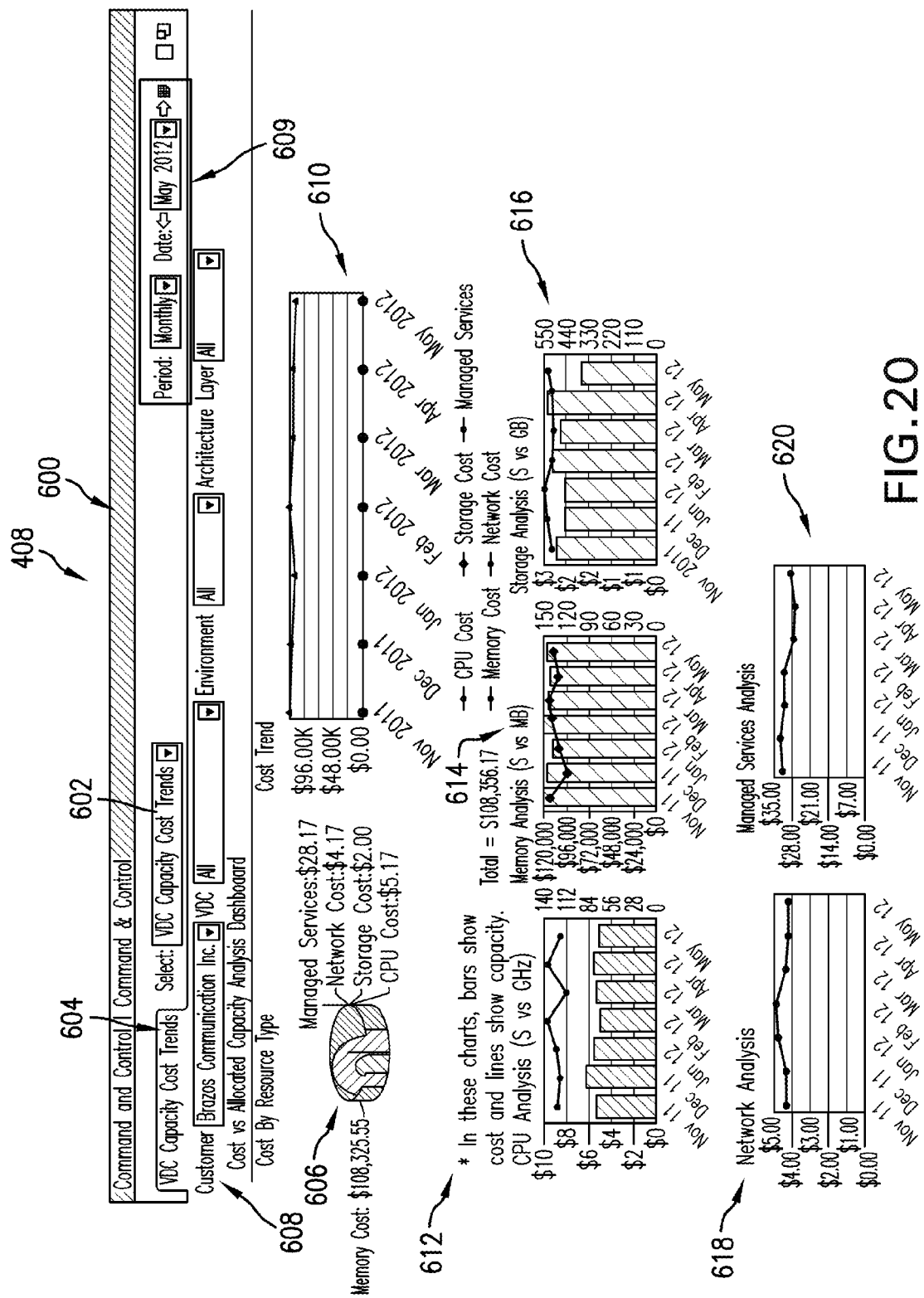
FIG. 20 is an illustrative view showing a VDC capacity cost trends dashboard configured in accordance with an embodiment of the present invention.

FIG. 20 shows a VDC capacity cost trends dashboard 604 configured in accordance with an embodiment of the present invention. A similar dashboard can be provided for presenting the same information for applications. As can be seen, for a particular VDC as specified in analysis content selection field(s) 608 and time period as specified in analysis time period field(s) 609, the VDC capacity cost trends dashboard 605 includes the following information: Cost by Resource Type in the form of a pie chart 606 showing the percentage cost for each type of resource (CPU, memory, etc.); Cost Trend in the form of a consolidated line chart 610 that tracks CPU cost, storage cost, managed services, memory cost, and network cost; CPU Analysis (e.g., $ vs. GHz) in the form of a cost bar chart 612 with capacity trend lines for CPU GHz (e.g., GHz is a proxy measure adding up the collective GHz of all provisioned CPUs); Memory Analysis (e.g., $ vs. MB) in the form of a cost bar chart 614 with capacity trend lines for memory; Storage Analysis (e.g., $ vs. GB) in the form of a cost bar chart 616 with capacity trend lines for storage cost per GB; Network Analysis in the form of a line chart 618 that shows monthly network costs and managed services analysis in the form of a line chart 620 that shows monthly managed services costs.

Figure 21:
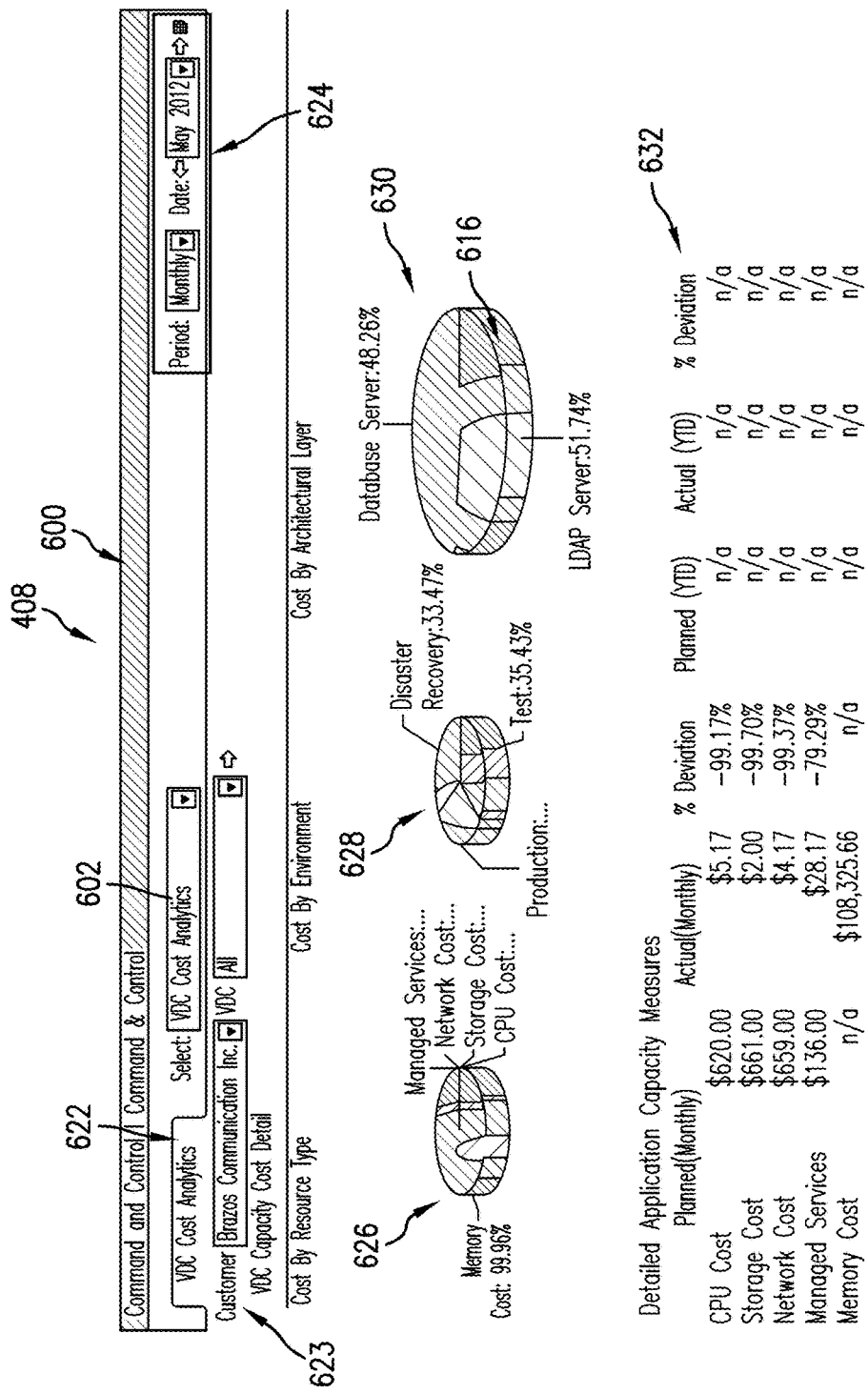
FIG. 21 is an illustrative view showing a VDC cost analysis dashboard configured in accordance with an embodiment of the present invention.

FIG. 21 shows a VDC cost analysis dashboard 622 configured in accordance with an embodiment of the present invention. A similar dashboard can be provided for presenting the same information for applications. As can be seen, for a particular VDC as specified in analysis content selection field(s) 623 and time period as specified in analysis time period field(s) 624, the VDC cost analysis dashboard 622 includes the following information: Cost by Resource Type in the form of a pie chart 626 that shows cost percentage by managed services, memory, CPU, storage, and network; Cost by Environment in the form of a pied chart 628 that shows cost percentage by each environment (e.g., production, disaster recovery, etc.); Cost by Architectural Layer in the form of a pie chart 630 that shows cost percentage by architectural layer (Web Server, Database Server, etc.); and Detailed VDC Cost Measures in the form of a table 632 that shows costs and deviation percentages in tabular form (e.g., planned monthly cost for the resource type, actual monthly cost for the recourse type, percentage deviation from planned cost, planned year to date cost for the resource type, actual year to date cost for the recourse type, and percentage deviation from planned cost as they relate to managed services, memory cost, CPU cost, storage cost and network cost).

Figure 22:
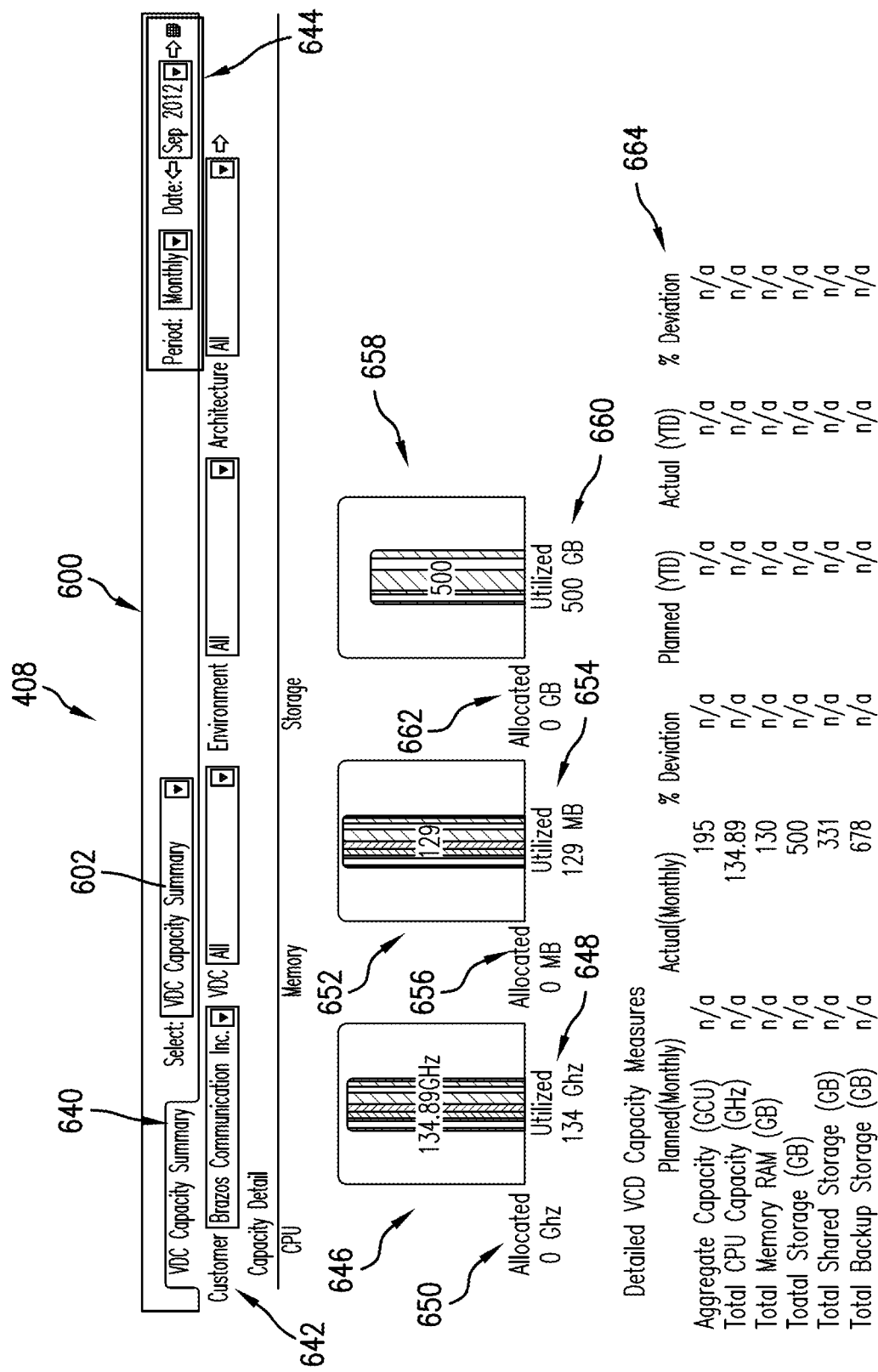
FIG. 22 is an illustrative view showing a VDC capacity summary dashboard configured in accordance with an embodiment of the present invention.

FIG. 22 shows a VDC capacity summary dashboard 640 configured in accordance with an embodiment of the present invention. A similar dashboard can be provided for presenting the same information for applications. As can be seen, for a particular VDC as specified in analysis content selection field(s) 642 and time period as specified in analysis time period field(s) 644, the VDC capacity summary dashboard 640 includes the following information: CPU Capacity Detail in the form of a vertical bar chart 646 and corresponding numeric value 648 indicating utilized CPU capacity and a numeric value 650 indicating allocated CPU capacity; Memory Capacity Detail in the form of a vertical bar chart 652 and corresponding numeric value 654 indicating utilized memory capacity and a numeric value 656 indicating allocated memory capacity; Storage Capacity Detail in the form of a vertical bar chart 658 and corresponding numeric value 660 indicating utilized storage capacity and a numeric value 662 indicating allocated storage capacity; and Detailed VDC Capacity Measures in the form of a table 664 that shows costs and deviation percentages in tabular form (e.g., planned monthly capacity for the resource type, actual monthly utilization for the recourse type, percentage deviation from planned capacity, planned year-to-date capacity for the resource type, actual year-to-date utilization for the resource type, and percentage deviation from planned cost as they relate to aggregate capacity (GCU), total CPU capacity (GHz), total memory RAM (GB), total storage (GB), total shared storage (GB), and total backup storage (GB)).

Figure 23:
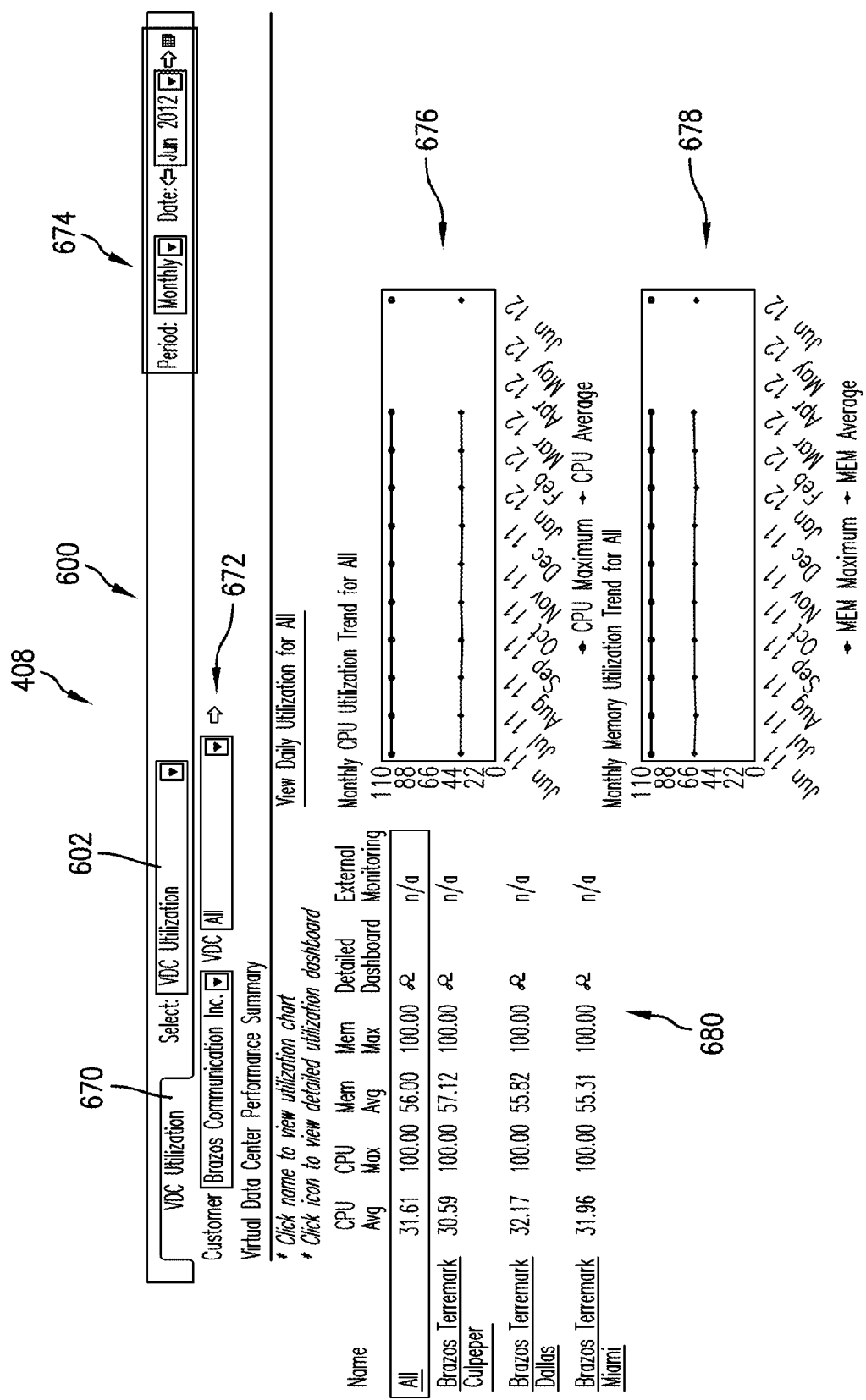
FIG. 23 is an illustrative view showing a VDC utilization dashboard configured in accordance with an embodiment of the present invention.

FIG. 23 shows a VDC utilization dashboard 670 configured in accordance with an embodiment of the present invention. A similar dashboard can be provided for presenting the same information for applications. As can be seen, for a particular VDC as specified in analysis content selection field(s) 672 and time period as specified in analysis time period field(s) 674, the VDC utilization dashboard 670 includes the following information: Monthly CPU Utilization Trends in the form of a line chart 676 that shows month-by-month trend lines for CPU Maximum and CPU Average utilization percentage; Monthly Memory Utilization Trends in the form of a line chart 678 that shows month-by-month trend lines for Memory Maximum and Memory Average utilization percentage; and VDC Performance Summary in the form of a table 680 that shows name and location of the VDC; average CPU utilization percentage for a selected timeperiod; CPU utilization percentage for the selected timeperiod; average memory utilization percentage for the selected timeperiod; maximum memory utilization percentage for the selected timeperiod; access to a VDC detailed utilization dashboard; and a link to externally monitored information.

Figure 24:
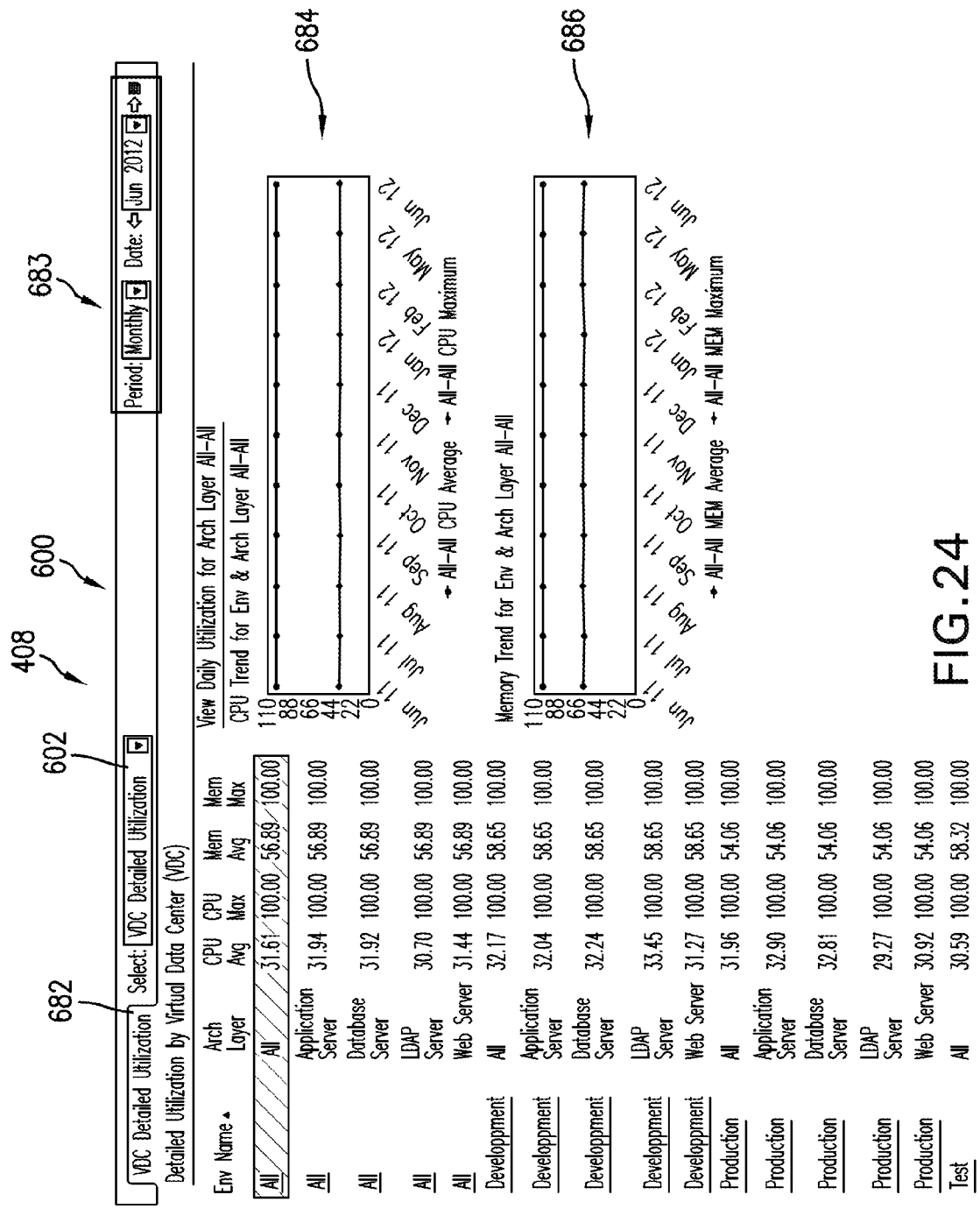
FIG. 24 is an illustrative view showing a VDC detailed utilization dashboard configured in accordance with an embodiment of the present invention.

FIG. 24 shows a VDC detailed utilization dashboard 682 configured in accordance with an embodiment of the present invention. A similar dashboard can be provided for presenting the same information for applications. As can be seen, for a particular time period as specified in analysis time period field(s) 683, the detailed VDC utilization dashboard 682 includes the following information: Monthly CPU Utilization Trends in the form of line chart 684 that shows month-by-month trend lines for CPU maximum and CPU average utilization; Monthly Memory Utilization Trends in the form of a line chart 686 that shows month-by-month trend lines for memory maximum and memory average utilization; and Detail Utilization by Virtual Data Center in the form of a table 688 that shows name of the VDC environment; name of the Architectural layer; average CPU utilization percentage for the selected month; maximum CPU utilization percentage for the selected timeperiod; average memory utilization percentage for the selected timeperiod; and maximum memory utilization percentage for the selected timeperiod.

Figure 25:
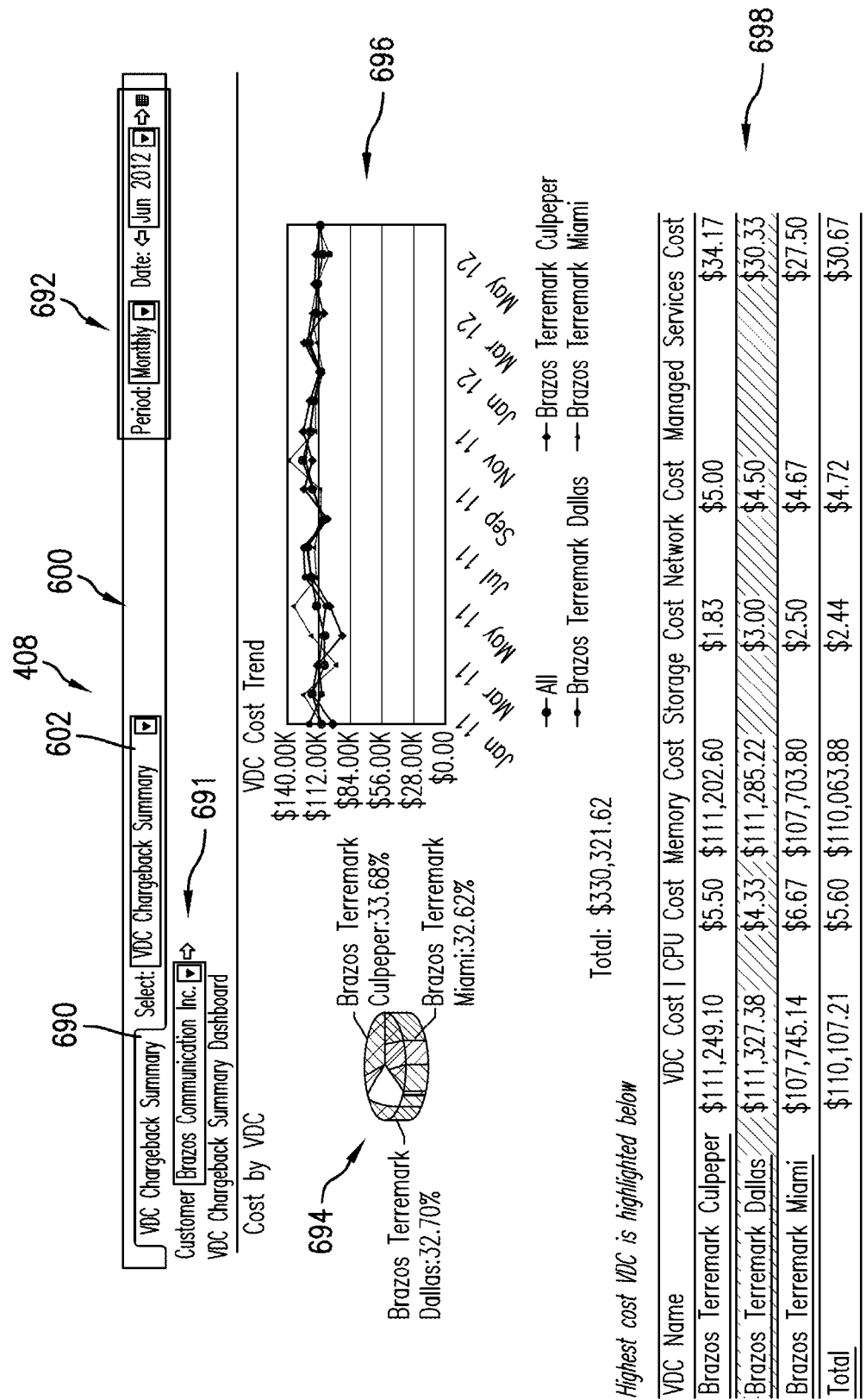
FIG. 25 is an illustrative view showing a VDC Chargeback Summary dashboard configured in accordance with an embodiment of the present invention.
Figure 26:
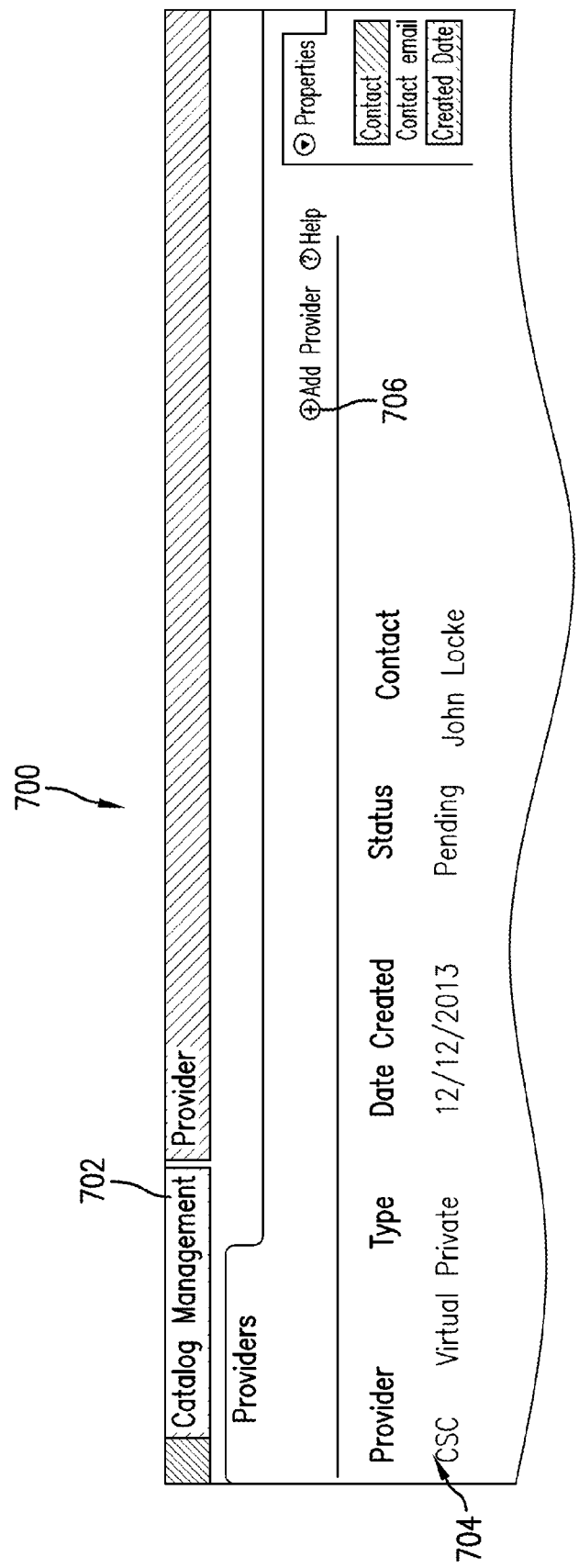
FIG. 26 is an illustrative view showing a provider screen of a catalog management section of a CSB platform portal.
Figure 29:
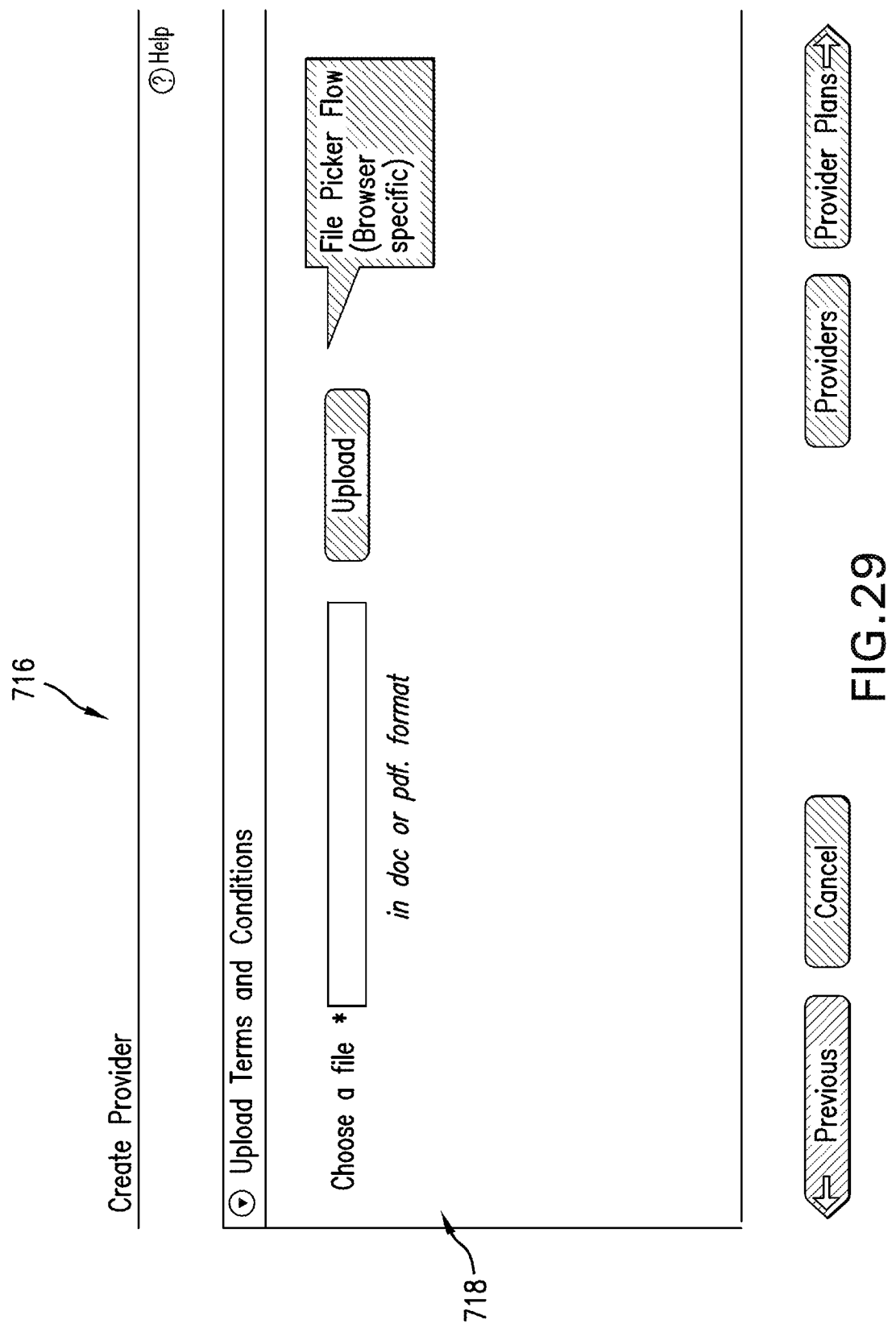
FIG. 29 is an illustrative view showing a provider terms and conditions pop-up screen of the catalog management section shown in FIG. 26.
Figure 30:
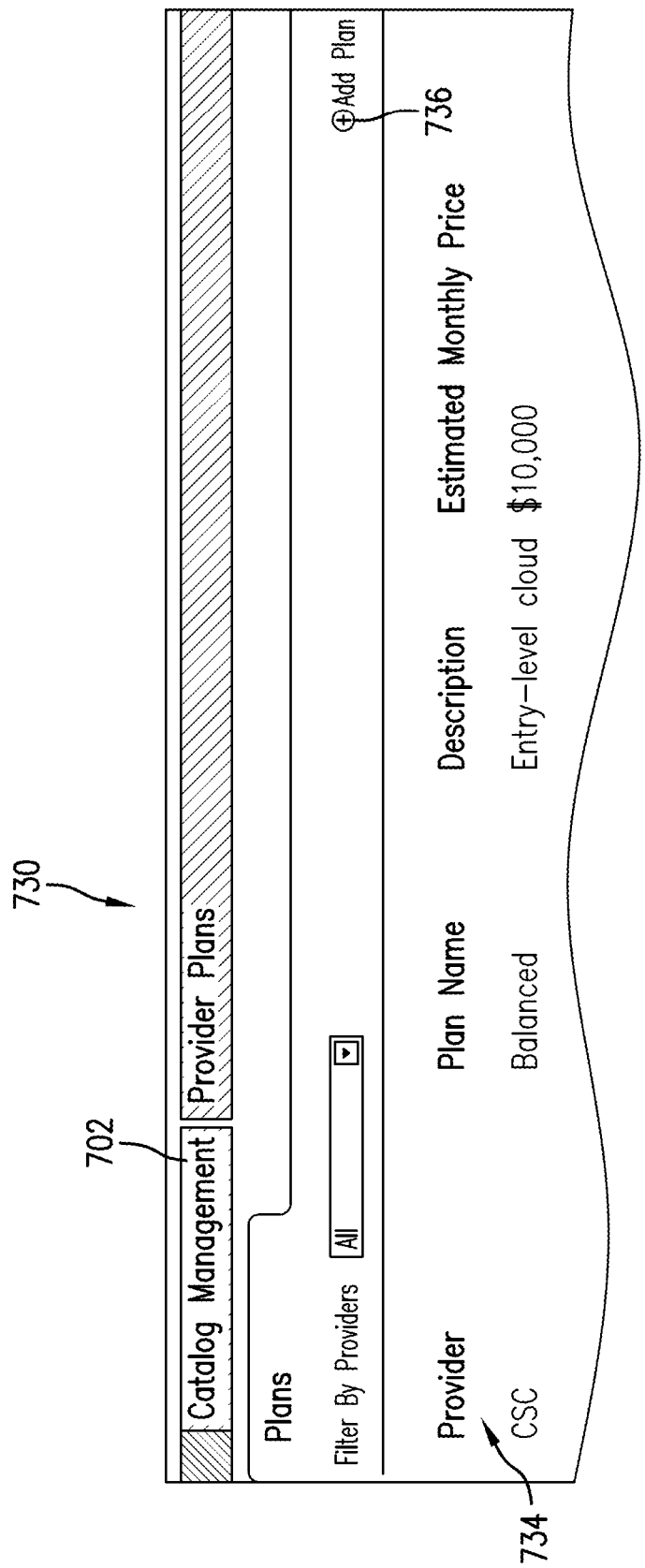
FIG. 30 is an illustrative view showing a provider plans screen of the catalog management section of the catalog management section in FIG. 26.
Figure 32:
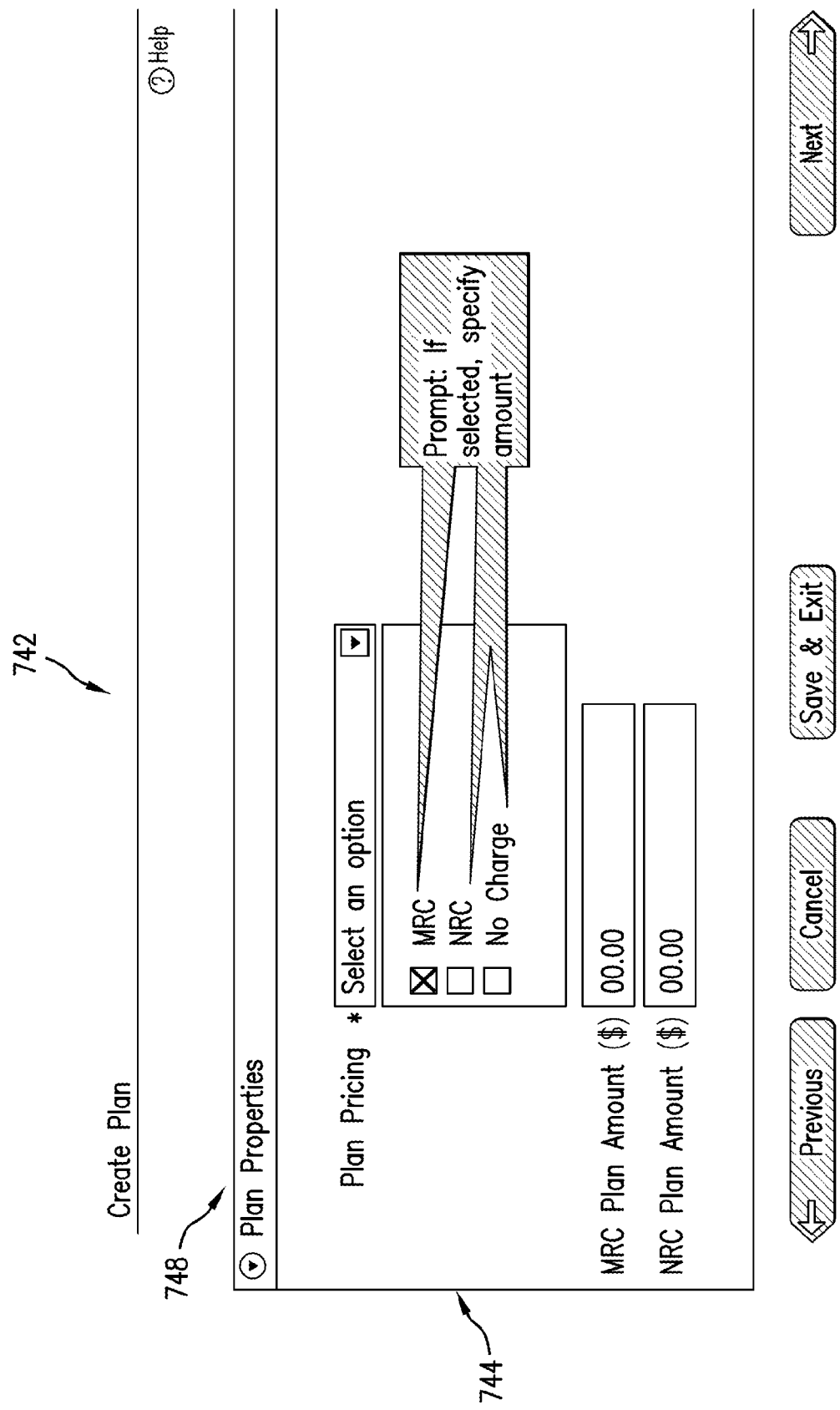
FIG. 32 is an illustrative view showing a provider plan properties pop-up screen of the catalog management section in FIG. 26.
Figure 33:
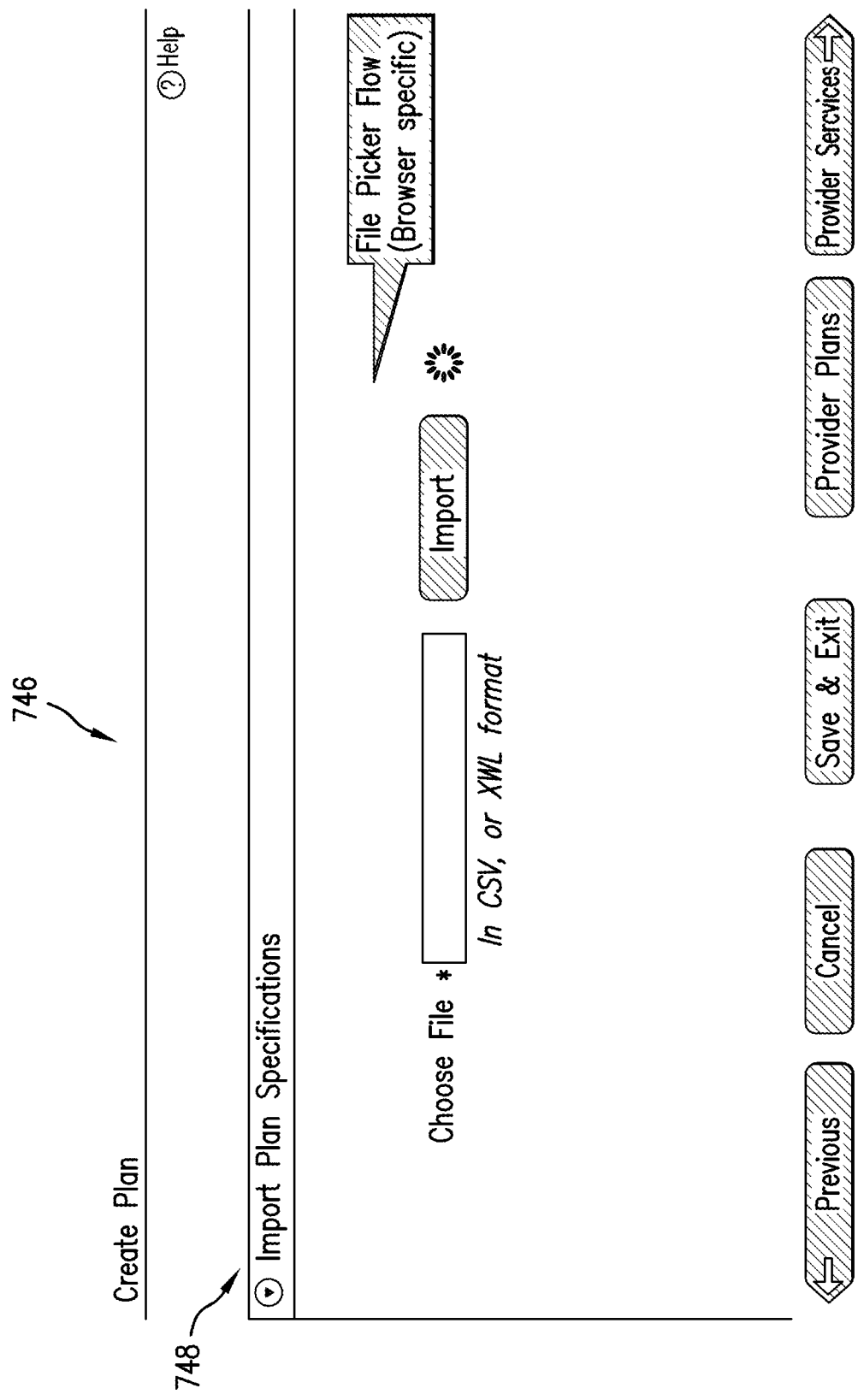
FIG. 33 is an illustrative view showing a provider plan specifications pop-up screen of the catalog management section in FIG. 26.
Figure 34:
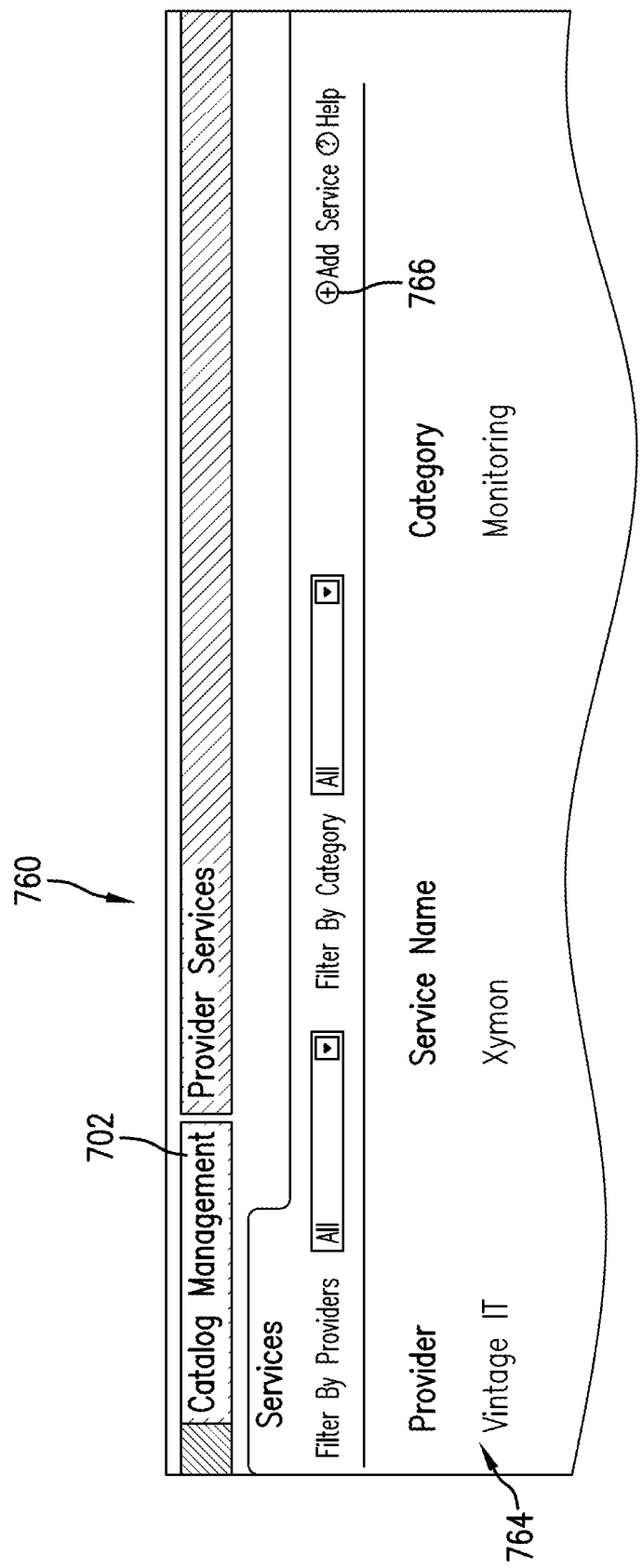
FIG. 34 is an illustrative view showing a provider services screen of the catalog management section of the catalog management section in FIG. 26.
Figure 37:
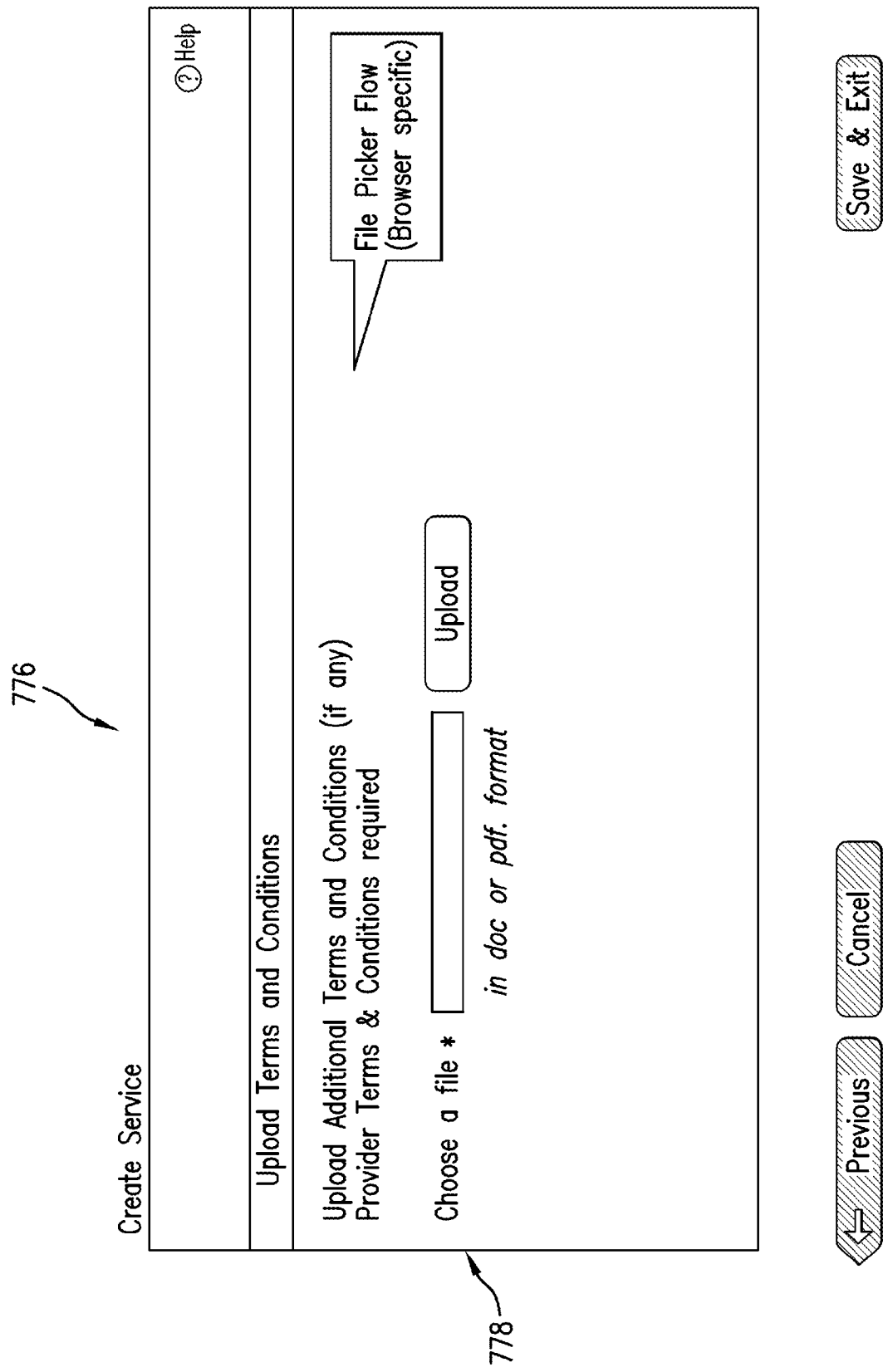
FIG. 37 is an illustrative view showing a service terms and conditions pop-up screen of the catalog management section in FIG. 26.

FIG. 25 shows a VDC Chargeback Summary dashboard 690 configured in accordance with an embodiment of the present invention. A similar dashboard can be provided for presenting the same information for applications. As can be seen, for a particular VDC as specified in analysis content selection field(s) 691 and time period as specified in analysis time period field(s) 692, the VDC Chargeback Summary dashboard 690 includes the following information: Cost by VDC in the form of a pie chart 694 that shows a breaking down cost percentage by VDC for a particular timeperiod; VDC Cost Trends in the form of a line chart 696 that tracks the cost of each VDC on a specified timeperiod interval; and Detail Cost Breakdown in the form of a table 698 that shows name and location of the VDC; Total VDC cost for the timeperiod; total CPU cost for the timeperiod; total memory cost for the timeperiod; total storage cost for the timeperiod; total network cost for the timeperiod; and total managed services costs for the timeperiod.

Through the Command And Control tab 408, the user can access pages for viewing various information related to cloud resources. One or more pages can be accessed for viewing resource order information (e.g., VDC orders discussed above in reference to the VDC Tab 404). One or more pages can be accessed for viewing bill of material (BOM) information (e.g., Bills of Material discussed above in reference to VDC Tab 404). One or more pages can be accessed for viewing billing information (e.g., the consolidated bill discussed above in reference to the VDC Tab 404).

Accounts Tab

The Accounts tab 410 (FIG. 7) provides functionalities related user of the CSB platform. Users perform a variety of functions, the access to which is determined by their roles and optionally their organization's platform subscription level. (i.e., cloud service consumer account). To this end, The Accounts tab 410 provides access to functionalities for assigning roles (e.g., approval roles as discussed above in reference to the VDC Tab 404) and adding editing and managing user information. Examples of such roles include, but are not limited to, Customer Administrator (e.g., manages and maintains the organization's list of authorized users and assigns the roles they perform in the system); Customer Executive (e.g., accesses "Executive-level" information and capabilities, which can include organizational/summary performance information, analysis and forecast reports, and governance information); Customer IT User (e.g., usually an IT Architect that performs Information Technology-related tasks and activities such as modeling and managing virtual services); Customer Financial Approver (e.g., reviews and approves or rejects financial tasks within workflows including reviewing the Bill of Materials created when an order is placed); Customer Technical Approver (e.g., reviews and approves or rejects technical tasks within workflows); Customer Legal Approver (e.g., reviews and approves or rejects legal tasks within workflows including reviewing Terms & Conditions); Customer Cost Analyst (e.g., reviews and approves or rejects financial tasks within workflows); Customer IT Application Analyst (e.g., monitors application performance using planned and allocated capacity, and utilization metrics); Customer IT VDC Analyst (e.g., monitors VDC performance using planned and allocated capacity, and utilization metrics); and Customer Solution Analyst (e.g., identifies the right solution based on business and IT requirements).

CSB Catalog

As disclosed above, one advantageous aspect of the present invention is the services catalog that includes services from available public cloud providers. As previously disclosed, a cloud service consumer can use a private cloud catalog and service package template to quickly operationalize an enterprise CSB solution. For example, a cloud services catalog and asset manager module of a CSB platform configured in accordance with an embodiment of the present invention enables (e.g., via the CSB platform access portal) command and control services that are critical to successful adoption and acceptance of the cloud services model (i.e., cloud services catalog and asset manager functionality). Furthermore, a resource solution center of a CSB platform configured in accordance with an embodiment of the present invention can serve as a single point (e.g., one-stop) source for all of virtual resource services needs of a user of the CSB platform. To this end, the resource solution center is configured to correlate service catalog line items to an available cloud service selection (i.e., a resource context). In this regard, a services catalog configured in accordance with an embodiment of the present invention is highly customizable.

Broadly speaking, the catalog supports an abstraction of marketplace services and categorizations that then maps to provider specific catalog line items. In this regard, a cloud services catalog provides a service abstraction that can map to one or more provider services/line items. Additionally, attributes that are specific to cloud service consumers such as, for example, pricing rules, security, and access constraints can be defined in the same catalog. This allows for a high degree of function and flexibility. This also simplifies maintenance as well as enables comparison of cloud services and plans from different providers. One example of an attribute of a CSB platform that is provided via a catalog configured in accordance with an embodiment of the present invention relates to contract based pricing for cloud business models (e.g., reserved capacity, pay-as-you-go, memory plans, bursting, VM based pricing, etc. along with discounts, upcharges, business management fees, and spend based fees). Another example of an attribute of a CSB platform that is provided via a catalog configured in accordance with an embodiment of the present invention relates to on-going daily synchronization of certain catalog components that are rapidly changing in the cloud world (e.g., a list of AMIs (Amazon Machine Images) is synchronized on a periodic scheduled basis (e.g., nightly)). Another example of an attribute of a CSB platform that is provided via a catalog configured in accordance with an embodiment of the present invention relates to cloud services business models, legal agreements (e.g., flow-through terms, pricing rules for the cloud supply chain to accommodate upcharges & management fees for different entities in the supply chain such as resellers, distributors, System Integrators, CSB Operators, etc)). Another example of an attribute of a CSB platform that is provided via a catalog configured in accordance with an embodiment of the present invention relates to cloud service abstraction that maps to underlying cloud provider catalog line items. This enables a consumption view of a cloud service that maps to one or more cloud provider catalog line items and also enables an aggregated or composed service that goes across multiple cloud provider line items (e.g., a value added service by an SI that is made of a set of underlying provider services bundled with a managed service and support services provided by the SI with a unique cost model that is different from that of the provider service(s). Another example of an attribute of a CSB platform that is provided via a catalog configured in accordance with an embodiment of the present invention relates to multi-tenancy support in the form of consumer-specific views of the catalog (e.g., across services, providers, pricing and branding), provider-specific line item management (e.g., data import/export/user interface/API) and CSB operator management capabilities (e.g., publishing a private cloud instance into a set of cloud services, templates for converting a private cloud instance into a set of cloud services for consumption, and the like).

Referring now to FIGS. 26-29, a method for adding a service provider to a catalog of the CSB platform 202. For example, through a suitable action (e.g., selection of an add provider selection at a catalog management tab of the CSB platform 202 (e.g., a portal thereof), a provider screen 700 (FIG. 26) of a catalog management section 702 of the catalog management tab is displayed. The provider screen 700 includes provider details 704 for providers that are currently configured within the CSB platform and includes an Add Provider button 706 for enabling new providers to be added. Selection of the Add Provider button 706 causes a process for creating a new provider within the service catalog of the CSB platform 202 to be initiated. A provider information pop-up screen 708 (FIG. 27) is displayed for enabling provider information 710 to be entered. A provider properties pop-up screen 712 (FIG. 28) is displayed for enabling provider properties 714 to be entered. A provider terms and conditions pop-up screen 716 (FIG. 29) is displayed for enabling provider terms and conditions 718 to be entered. The provider information 710, the provider properties 714, and the provider terms and conditions 718 are then used for creating a new provider offering within the service catalog of the CSB platform 202.

Referring now to FIGS. 30-33, a method for adding a service provider plan to a catalog of the CSB platform 202. For example, through a suitable action (e.g., selection of an add provider plan selection at the catalog management tab of the CSB platform 202 (e.g., a portal thereof), a plans screen 730 (FIG. 30) of the catalog management section 702 of the catalog management tab is displayed. The provider screen 730 includes provider plan details 734 for providers that are currently configured within the CSB platform and includes an Add Plan button 736 for enabling new provider plans to be added. Selection of the Add Plan button 736 causes a process for creating a new provider plan within the service catalog of the CSB platform 202 to be initiated. A plan information pop-up screen 738 (FIG. 31) is displayed for enabling plan information 740 to be entered. A plan properties pop-up screen 742 (FIG. 32) is displayed for enabling plan properties 744 to be entered. A plan specification pop-up screen 746 (FIG. 33) is displayed for enabling plan specifications 748 to be entered. The plan information 740, the plan properties 744, and the plan specifications 748 are then used for creating a new plan offering within the service catalog of the CSB platform 202. An instance of a cloud can be added through a similar process.

Referring now to FIGS. 34-37, a method for adding a provider service to a catalog of the CSB platform 202. For example, through a suitable action (e.g., selection of an add provider service selection) at the catalog management tab of the CSB platform 202 (e.g., a portal thereof), a provider services screen 760 (FIG. 34) of the catalog management section 702 of the catalog management tab is displayed. The provider screen 760 includes service plan details 764 for providers that are currently configured within the CSB platform and includes an Add Service button 766 for enabling new services to be added. Selection of the Add Service button 766 causes a process for creating a new service within the service catalog of the CSB platform 202 to be initiated. A service information pop-up screen 768 (FIG. 35) is displayed for enabling service information 770 to be entered. A service properties pop-up screen 772 (FIG. 36) is displayed for enabling service properties 774 to be entered. A service terms and conditions pop-up screen 776 (FIG. 33) is displayed for enabling service terms and conditions 778 to be entered. The service information 770 (FIG. 35), the service properties 744, and the service terms and conditions 778 are then used for creating a new provider service offering within the service catalog of the CSB platform 202 where provider location, instance name, provide plan (e.g., balanced or essential), technology (e.g., VCD, open stack, Eucalyptus), integration method (e.g., REST API, Web Services, JAVA API) Provisioning API URL/, user name/password, Billing API/user name/password) are provided via one or more pop-up screens.

Figure 38:
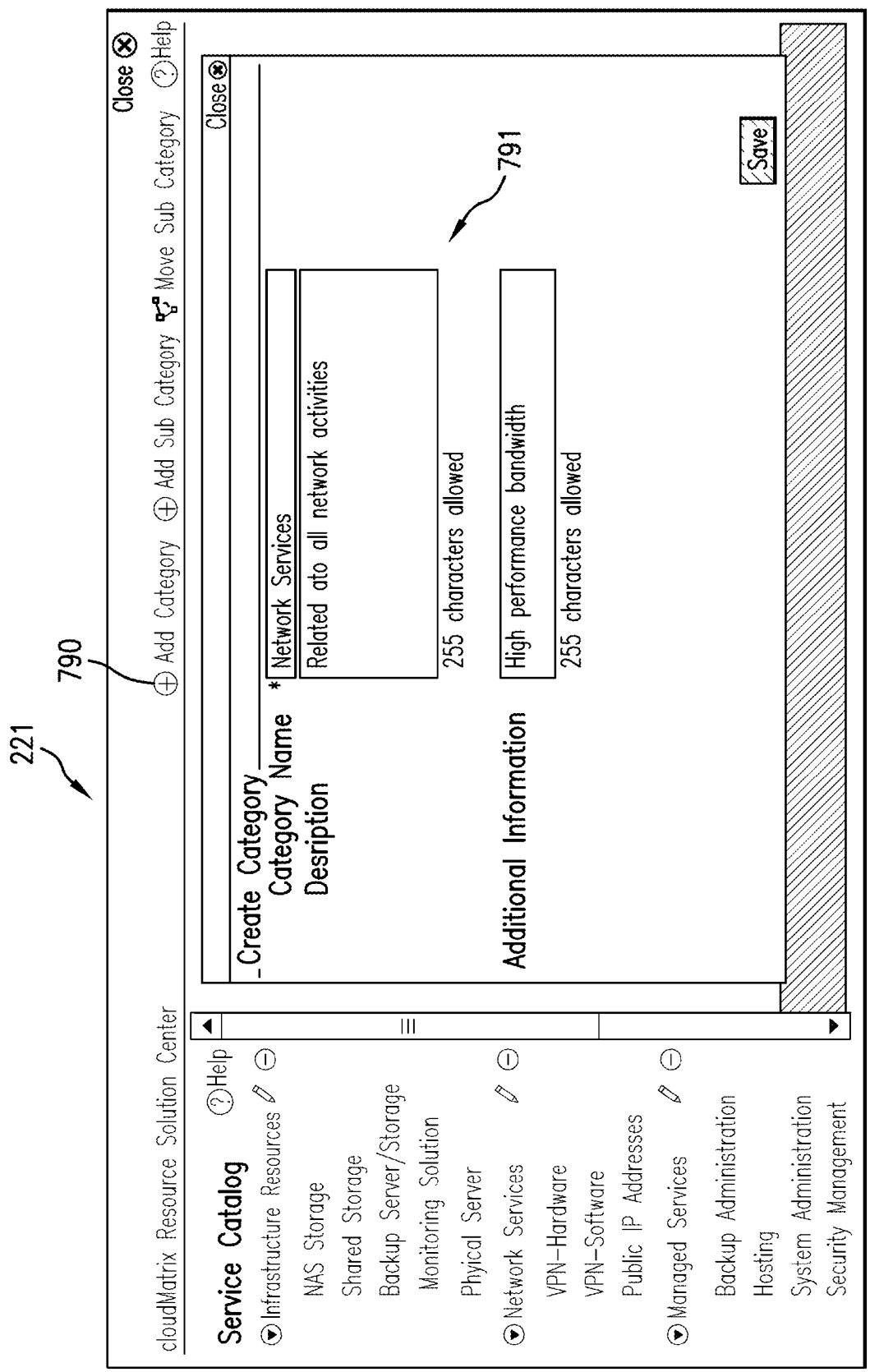
FIG. 38 is an illustrative view showing create category screen of the resource solution center in FIG. 3B.
Figure 39:
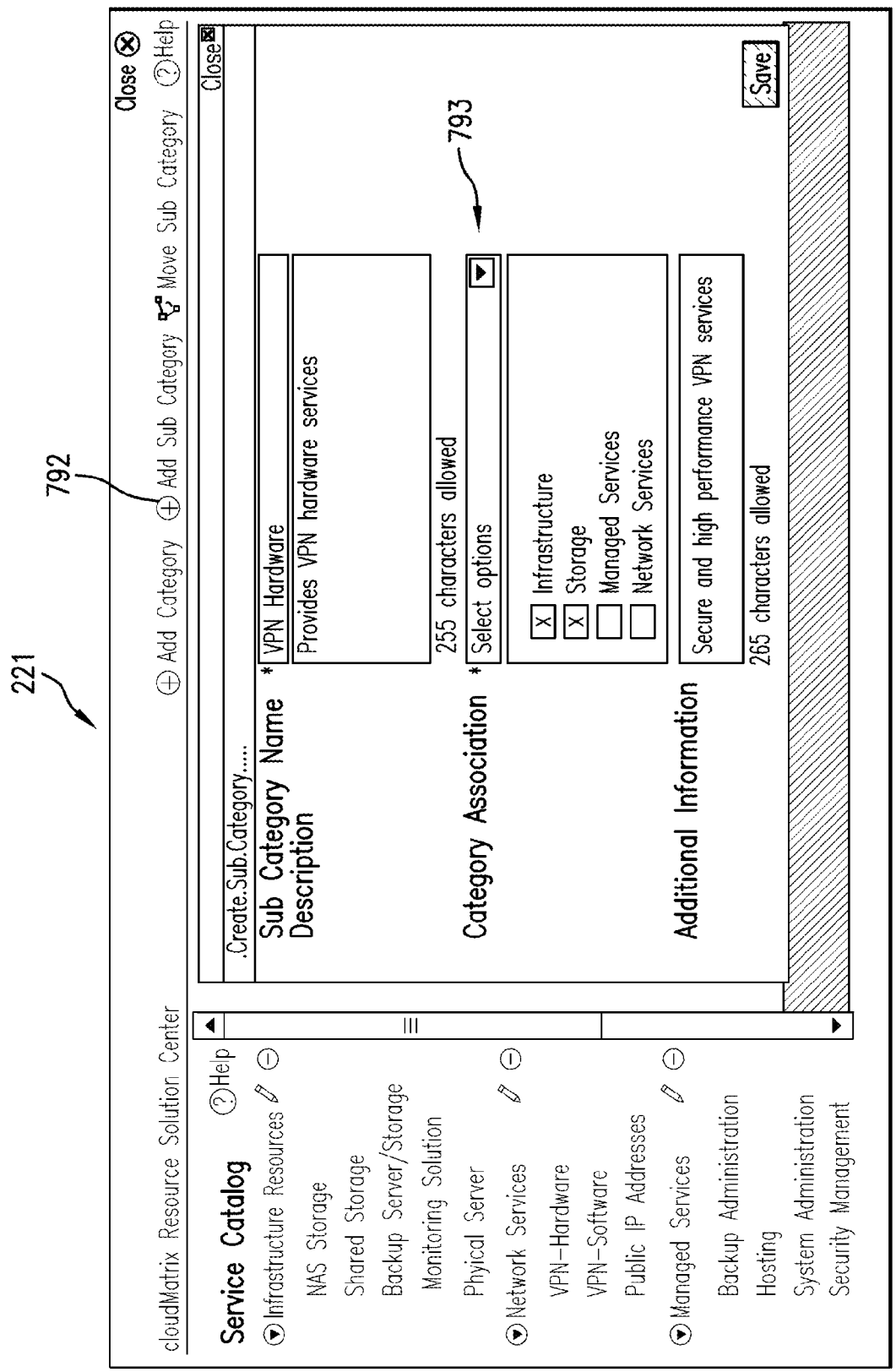
FIG. 39 is an illustrative view showing create sub-category screen of the resource solution center in FIG. 3B.

Entries in the service catalog can also be managed through the resource solution center 221 discussed above in reference to FIG. 3B. The resource solution center 221 can have selections available for enabling a user to add providers, plans and services such as, for example, through the respective process presented above in reference to FIGS. 26-29, 30-33, and 34-37, respectively. Furthermore, through a suitable action at the resource solution center 22, a new category and/or sub-category can be added. For example, selection of an Add Category button (FIG. 38) causes a process for creating a new category (defined by category information 791) within the service catalog of the CSB platform 202 to be initiated and selection of an Add Sub-category button 792 (FIG. 39) causes a process for creating a new sub-category (defined by sub-category information 793) within the service catalog of the CSB platform 202 to be initiated.

In view of the disclosures made herein, a skilled person will understand and appreciate that a service catalog configured in accordance to the present invention is not limited to any particular content. In this regard, a service catalog configured in accordance to the present invention can comprise any necessary and suitable cloud service offerings as necessary or desired by a CSB platform user (e.g., cloud solution architects, IT administrators, procurement managers, application developers, IT managers and the like).

Cost Allocation and Billing

Cost Apportioning in the context of embodiments of the present invention refers to apportioning individual bill items of a CSB bill to different cloud service entities (e.g., VM, VDC, etc) to find the true cost of a resource within an enterprise. As discussed above in the CSB Platform user interface section, a CSB platform configured in accordance with an embodiment of the present invention (e.g., the CSB platform 202) provides an IT architectural view of a cloud in the form of a "Single Pane of Glass" (e.g., under the IT architecture screen 492 of the VDC tab 404) to create and associate any given resource (e.g., an entity like a VM) to different contexts. The entity that is created can then be associated to an environmental context (e.g. Production, Development and Testing), or an architectural layer context (e.g. Web, Middleware and Database), or an software project layer to identify which software project this entity belongs too. The ability to group resources under a particular virtual data center is also provided. As a result, a CSB platform configured in accordance with an embodiment of the present invention supports association (e.g., correlation) and viewing of cost breakups for various resources in detail within the given contexts for any given specific cloud service entity (VM, or VDC). Examples of these contexts for any given resource in the system include, but are not limited to, resource group context, environment context, layer context, and VDC context.

Figure 40:
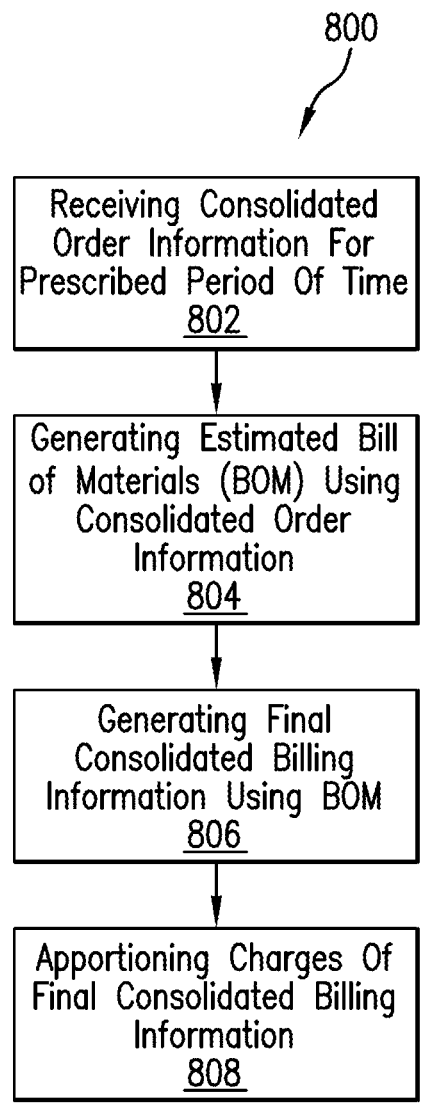
FIG. 40 shows a method for implementing cost apportioning in accordance with an embodiment of the present invention.

FIG. 40 shows a method 800 for implementing cost apportioning in accordance with an embodiment of the present invention. In one implementation, the method 800 for implementing cost apportioning can be implemented from within one or more modules of the CSB platform 202. For example, the method 800 for implementing cost apportioning can be implemented via a cost apportioning engine within the broker operations module 238 (FIG. 3A) of the CSB platform 202.

The method 800 begins with a step 802 is performed for accessing (e.g., retrieving, receiving, etc) consolidated order information for a prescribed time period (e.g., a prior month). Consolidated order information refers to cloud service order information for a particular cloud service consumer. A step 804 is then performed for generating an estimated bill of materials (BOM) using the consolidated order information, followed by a step 806 being performed for generating final consolidated billing information using the BOM. In this regard the final consolidated billing information is derived from the consolidated order information. It is disclosed herein that the through billing management lifecycle, the estimated BOM can be published as the actual bill, can be exported, updated and reloaded as the actual bill, and/or can go through a lifecycle of validation, review, and publish to become the final consolidated bill to the customer that comprises all or a portion of the final consolidated billing information. A step 808 is then performed for apportioning charges of the final consolidated billing information to various entities such as business unit (e.g., customer account), application, VDC, environment, architecture layer, etc. It I disclosed herein that apportioned cost can be presented in one or more dashboards of a CSB platform configured in accordance with an embodiment of the present invention. For example, apportioned costs can be presented in the VDC capacity cost trends dashboard 604 discussed above in reference to FIG. 20 and/or a similar Applications capacity cost trends dashboard.

Apportioning charges of the final consolidated billing information to various cloud service entities entails using information from sources such as, for example, the consolidated order, the estimated and actual charges for each provider bill line item, cloud service to provider line item mapping, 'then-current and up-to-date' solution architecture maintained (and synchronized) in CSB platform, cost apportioning policies (discussed below), customer overrides and configurations and the like. Apportioning can also be based on considerations such as, for example, utilization data for apportioning cost, time of service in addition to capacity to determine the cost to apportion, and custom weights as inputs from the user for a specific cloud service entity.

There are several prerequisites to cost apportioning that are taken into consideration when apportioning charges of the final consolidated billing information to various cloud service entities. A first one of these prerequisites relates to apportioning cost. Apportionment rules specify how a particular cost is to be split. The CSB platform is pre-configured with a default instance of a cost appointment policy that contains a set of appointment rules. When the cost apportioning engine runs, it inspects the bill item and looks at its metadata and correlation rules and determines which rules to apply for costing. In certain implementations, the cost apportioning engine can be configured for enabling customization of the cost appointment policy and/or a specific rule for a specific customer (e.g., picking a policy based on the time the cost was incurred for time bound policy effectiveness changes, picking a policy based on provider, usergroup and time). A second one of these prerequisites relates to residual cost, which can be capacity-based or utilization-based. In the case of capacity-based residual cost, residual cost is the unused cost that is present in the platform (i.e., system). The unused cost is determined by subtracting the configured capacity from the total capacity, then the cost is calculated for the remaining capacity. The cost is determined based on the configuration that is available from an associated provider. In the case of utilization-based residual cost, the average utilization of VMs versus the configured capacity represents the unused utilization capacity. Residual cost can also be influenced by whether the cost is a direct or indirect cost. A direct cost is one where a charge is not apportioned to other entities in the system but is directly associated with the primary entity. For example, a cost for a specific VM is associated to that VM and not apportioned (e.g., split) to other entities in the system. An indirect cost is one where a bill line item such as, for examples, subscription charges" is apportioned based on capacity or evenly apportioned to all entities if capacity data is not available or proportional cost such as charges that are split based on the original cost of the line item. A third one of these prerequisites relates to provider pricing models. Different providers have different pricing models. For example, some providers charge for the number of hours a particular sized VM is up and running whereas other providers sell capacity on a monthly basis and it is up to the consumer to carve out specific VM sizes. Based on the particular pricing model, it is possible to understand how different charges need to be split at the provider level. A fourth one of these prerequisites relates to identifying the charges to be apportioned and the item (i.e., cloud service entities) that it has to be associated to in the CSB platform (i.e., correlation between the charges and items). It should be understood that association is not apportioning but rather tells the CSB platform that a particular bill item has been found as a valid existing resource within the CSB platform. This is valuable because, for example, a VM can be created through the CSB platform or it can be synchronized similar to an external process, and this correlation step helps to resolve naming conflicts and identify the entity exactly in the CSB platform. Accordingly, correlation helps to identify the cloud service entity, which in turn is useful for determining the best cost apportioning rules to apply for a given bill item and cloud service entity that is identified.

For every bill line item assessed in association with implementing cost apportioning, the following checks are made to correlate a resource (i.e., cloud service entity) and apportion respective costs.

| Bill Resource Name (Contains) | Bill Entity Name (Contains) | Applicable Provider | Apportioned To: | Residual Policy |
|---|---|---|---|---|
| License Examples Matches Specifically Windows Licenses | VDC Name | Any | All active VMs within the bills service period dates; with matching order catalog item. | Not applicable. |
| Bus Mgmt Fee | VDC Name | Any | VM's | Not applicable. |
| Examples Matches VM Name VM | VDC Name | Any | All Active VMS (virtual memory/machine | Not applicable. |

-continued

| Bill Resource Name (Contains) | Bill Entity Name (Contains) | Applicable Provider | Apportioned To: | Residual Policy |
|---|---|---|---|---|
| Name/VDC Name VM Name-Hard Disk 1 VM Name Type: GraResource Examples Matches one of the following Resource Group Supplemental Service Type: GraServiceInstance | VDC Name | Any | system) in that resource group All Active VMS in that Specific Resource Group or Supplemental Service | Not applicable. |
| VDC Name | VDC Name | TRMRK or Vintage (Compute & Memory) | VM Configuration is Numerator/VDC Configuration is Denominator | Absorb residual cost at VDC level only. |
| VDC Name | VDC Name | TRMRK or Vintage (Compute, Memory & Storage) | VM Configuration is Numerator/VDC Configuration is Denominator | Absorb residual cost at VDC level only. |
| VDC Name | VDC Name | Any | All Active VMS in that vdc. | Absorb residual cost at VDC level only. |
| Account/Bill Details | Bill Summary ID | Any | All distinct count bill items in that target bill summary | Not applicable |

As mentioned above, the CSB platform can ship with a default cost allocation policy (NeutralPolicy) that contains a pre-configured set of apportioning rules and other information necessary for implementing cost apportioning in accordance with an embodiment of the present invention and can enable the default neutral policy can be customized for specific situations (e.g., a particular cloud service consumer). One example of an apportioning rule is a residual policy rule. This is a sub-rule for all the below rules, where in all the cases and wherever applicable, the residual cost is inherently kept track of and apportioned to the VDC or all active resources with a different cost type flag. Another example of an apportioning rule is a spend fee rule (i.e., a particular type of fee rule). In the spend fee rule, the fee is for a group of bill items and, if that bill items has duplicate correlated items, then it is a count of duplicated items to the overall total records. For example, if the bill has two VM charges and there are two other distinct charges, then the spend fee is uniquely charged as 2/4 for the VM and 1/4 for the other resources. These ratios are based on the total cost of the all the unique items versus the total items. Another example of an apportioning rule is a resource group rule in which a bill item is identified based on the correlation an requires that it should be split to all the resources that is contained in that resource group. The bill item is delegated to the capacity based rule for the individual resource groups. Another example of an apportioning rule is a resource services rule in which a bill item is delegated to the resource group rule. Another example of an apportioning rule is a subscription rule in which the bill item is apportioned to the account that is associated for the bill item of a particular cloud service consumer. Another example of an apportioning rule is a capacity rule in which it is necessary to how the provider is configured in order to determine how to split an associated cost. If the provider is capacity based, it is necessary to determine the configured capacity for the individual VMS (virtual machine/memory system) for (CPU×Mem)+(Storage×Number of hours used) and the denominator is a sum for all VMs. If the provider is usage based where usage means hours used not utilization of CPU or Memory, it is necessary to identify the configured capacity and hours utilized for an associated VM. If the capacity information is not available, one approach is to rely on an even split of all of the appropriate costs. Another example of an apportioning rule is a VM rule in which a correlated cost is assigned directly to an associated VM. Another example of an apportioning rule is a supplemental services rule in which a cost is assigned to all items under an associated resource group. Another example of an apportioning rule is a direct VDC rule in which cost is assigned directly to an associated VDC. Another example of an apportioning rule is a VDC resources rule in which cost is split to all resource groups/VMSs under an associated VDC. And is delegated in accordance with the capacity based rule for the individual resource groups. Another example of an apportioning rule is a utilization rule in which cost is apportioned based on the utilization of an associated VMS.

Implementing Application Screening Functionality

Referring now to FIGS. 41A-41F, an application screener configured in accordance with a second embodiment of the present invention is shown (i.e., the application screener 800). Specifically, FIGS. 41A-41F show an embodiment of a process for assessing (i.e., screening) an application in regard to deployment within a cloud environment. It is disclosed herein that a CSB platform configured in accordance with an embodiment of the present invention can comprise an application screener such as, for example, the application screener 800 disclosed in reference to FIGS. 41A-41F. The usefulness of application screener 800 is it being configured for determining whether or not an application of a user (i.e., a cloud service consumer) is a good candidate to migrate to a cloud, as well as whether the user is ready to make that transition.

An application page 801 of the application screener 800 includes an application selection field 803, a plurality of assessment category tabs 804-812, an assessment information field 814, and an assessment results field 816. Each one of the assessment category tabs 804-812 is related to a respective aspect of assessment of an application. The assessment information field 814 allows a user completing the assessment to input responses to information requests (e.g., requests for information in the form of system-determined questions) upon which results from assessment of the application are based. Each one of the assessment category tabs 804-812 is selectable and the information communicated through the assessment information field 814 is dependent upon a particular one of the assessment category tabs 804-812 that is currently selected. More specifically, the information requests presented to the user are dependent upon the selected tab and some or all of the information requests can chosen dependent upon the response given by the user to one or more previously responded to information requests. The assessment results field 816 presents information characterizing the results of the assessment of the application.

The technical assessment tab 804 includes assessment aspects relating to architecture and system design details of an application that is being assessed. The workflow profile tab 806 includes assessment aspects relating to functionality and operational details of the application. The organizational assessment tab 808 includes assessment aspects relating to internal organizational details of the entity having authority/control of moving the application to the cloud environment. The provider requirements tab 810 includes assessment aspects relating to requirements and expectations of a cloud provider should the application be moved to a cloud environment. The review tab 812 presents any information required for ensuring that necessary information has been received from the user in response to questions presented in association with selection of the technical assessment tab 804, the workflow profile tab 806, the organizational assessment tab 808, and the provider requirements tab 810.

For each one of the assessment category tabs 804-812, information requests associated with the assessment aspects of a currently selected one of the assessment category tabs 804-812 are presented to the user and one or more fields are provided for responding to such information requests. In preferred embodiments of the present invention, some of the information requests are chosen for being presented to the user dependent upon the response given by the user to one or more previously responded to information requests of the currently selected one of the assessment category tabs 804-812 and/or a different one of the assessment category tabs 804-812 through which one or more responses to an information request has been provided.

Examples of the architecture and system design details for which information requests relate in the technical assessment tab 804 include, but are not limited to, server (i.e., system) architecture (e.g., mainframe, client-server, web-based), system tiers, network architecture (e.g., internal communication, external communication, bandwidth, etc), storage architecture (e.g., local storage, shared storage, etc), system framework (e.g., parallelization, platform customization, and the like. Examples of the functionality and operational details for which information requests relate in the workflow profile tab 806 include, but are not limited to, application profile (e.g., application workflow type, application age, application complexity, application user experience, application scalability, application interoperability, etc), demand profile (e.g., demand trends/utilization, demand spread, etc) and the like. Examples of the internal organizational details for which information requests relate in the organizational assessment tab 808 include, but are not limited to, cloud strategy (e.g., budget, staff, deployment timeline, etc), application lifecycle (e.g., technology refreshment, contracts terms, etc) and the like. Examples of the cloud provider requirements and expectations for which information requests relate in the provider requirements tab 810 include, but are not limited to, infrastructure (e.g., location, sharing, etc), cloud features (e.g., spin-up time, capacity bursting, storage scaling, international capability, Internet downloading capacity, operating system licensing, etc), security (e.g., user authentication, network and data encryption, intrusion protection/OS vulnerability, etc), miscellaneous (e.g., cloud location, performance, compliance, etc) and the like.

Figure 41A:
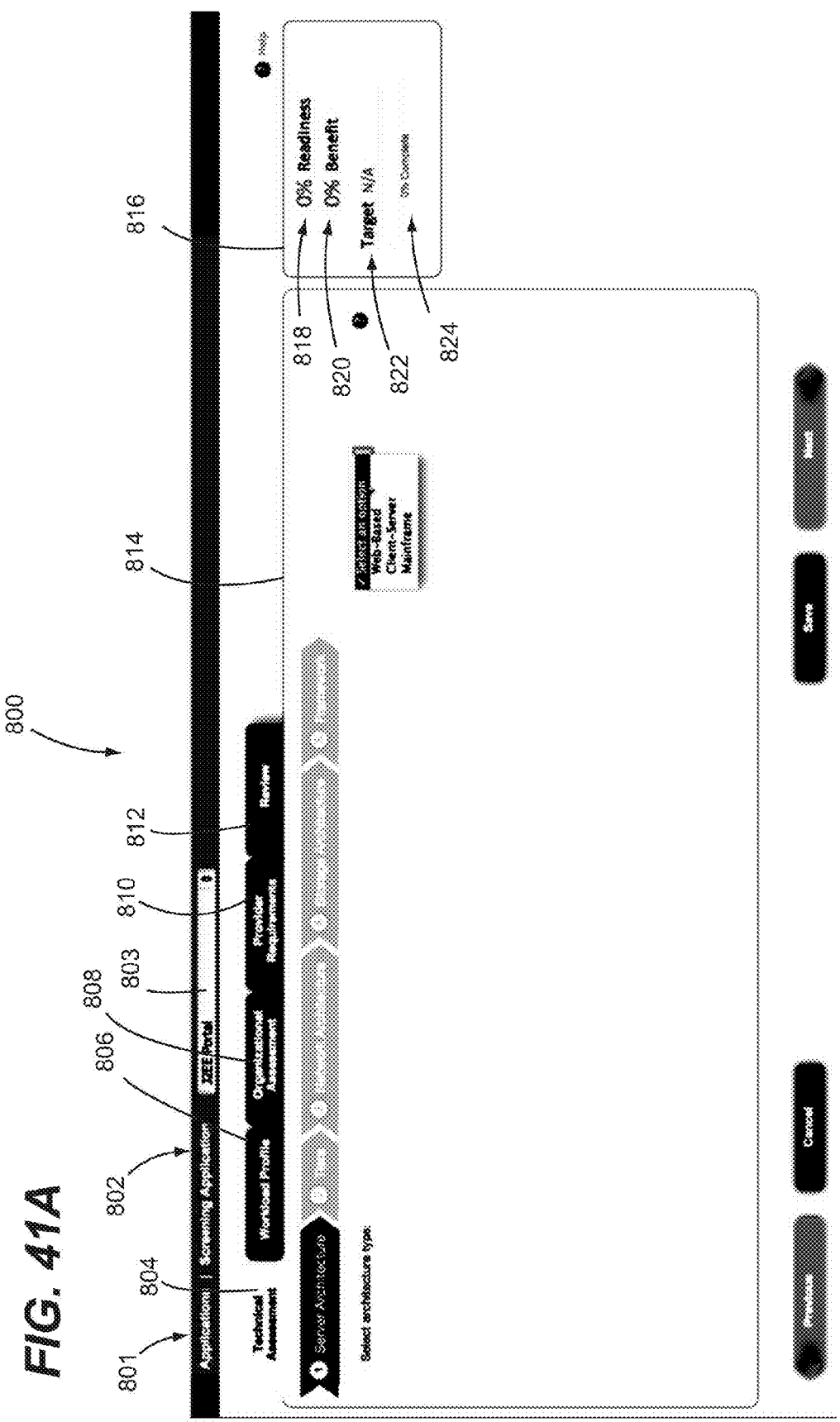
FIGS. 41A-41F are illustrative views showing various aspects of an application screener configured in accordance with a second embodiment of the present invention.
Figure 41B:
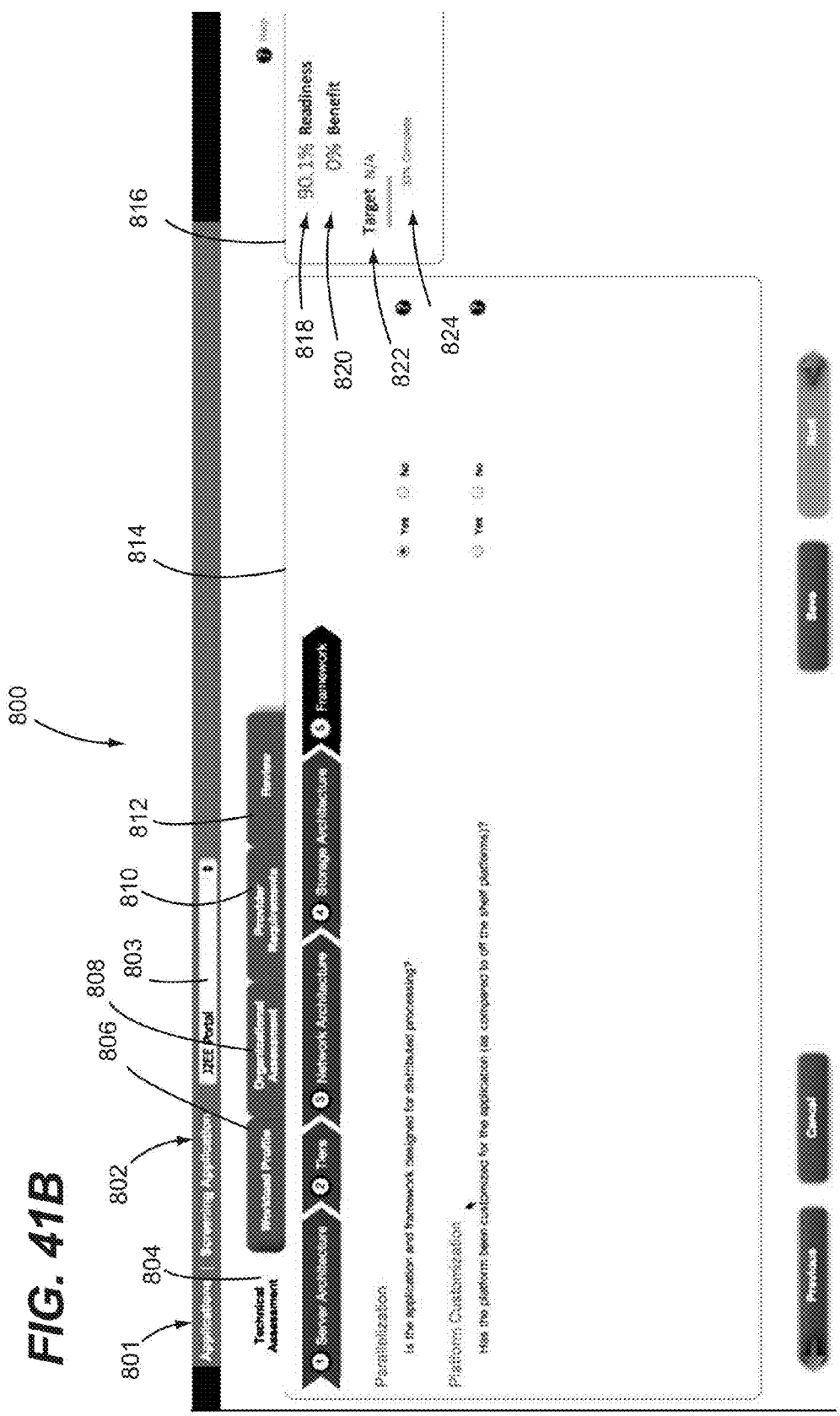
Figure 41C:
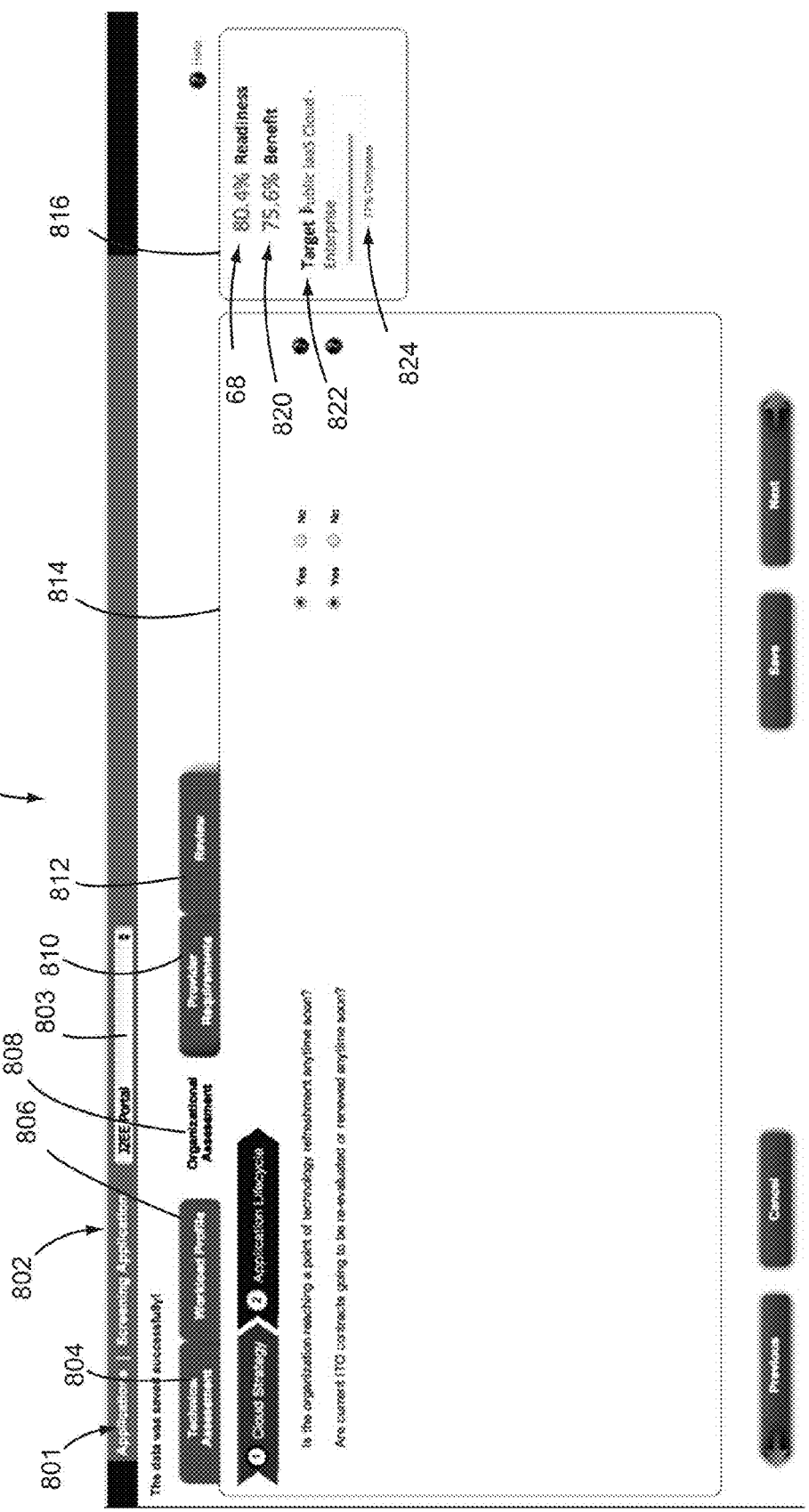
Figure 41D:
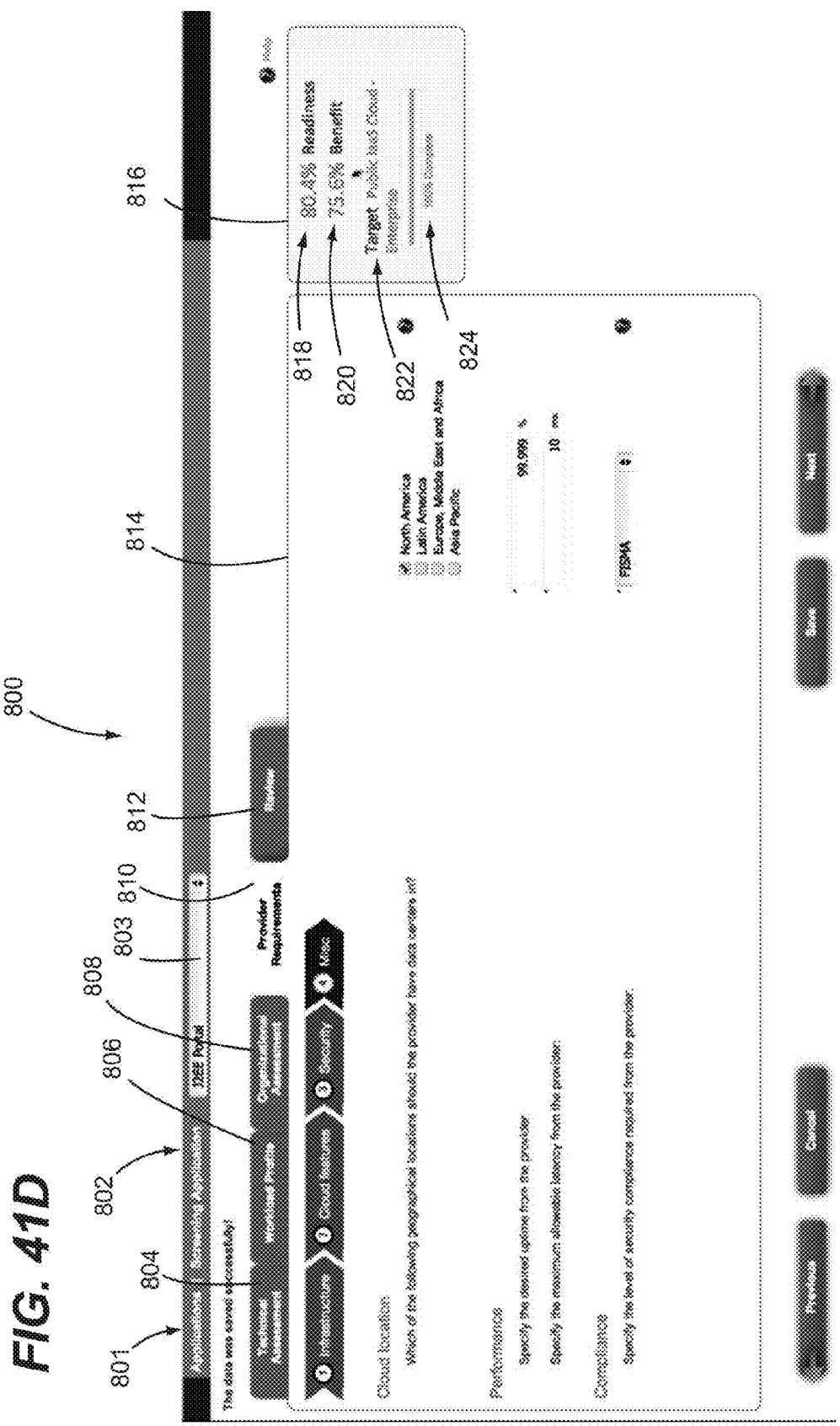

As shown in FIG. 41A, the assessment results field 816 includes a variety of assessment results that characterized attributes associated with deployment of an application within a cloud environment. As depicted, the assessment results include, but are not limited to, a value characterizing a state of being prepared for operation in the cloud (driven by architecture feasibility, platform/OS popularity, and application complexity) (i.e., the readiness index 818), a value characterizing a degree of improvement derived by operating in the cloud (e.g., driven by TCO savings, application performance, and network performance) (i.e., the benefit index 820), a deployment model that is deemed best suited for the application (i.e., the target deployment model 822), and a value characterizing a degree of completion of the assessment (i.e., the assessment completion value 824). A higher readiness index refers to there being less effort needed for deployment of the application within the cloud environment and a higher benefit index refers to there being better agility once the application is in the cloud environment. The readiness index 818, the benefit index 820, the target deployment model 822, and the completion value 824 jointly represent result field content.

As indicated in FIGS. 41A-41D, as assessment of an application is performed, the result field content changes. The assessment completion value 824 indicates a relative degree of completion of the assessment such as by a combined evaluation of information requests already responded to, information requests yet to be responded to, and technical assessment tabs for which all necessary responses have been provided. When the assessment is indicated as being 100% completed (shown in FIG. 41D), the readiness index 818, the benefit index 820, and the target deployment model 822 each indicate a respective result from the assessment. Furthermore, as can be seen in FIGS. 41A-41D, information comprising the readiness index 818, the benefit index 820 and the target deployment model 822 and the assessment completion value 824 is updated as the user provides responses to various information requests. In this regard, the user is provided with up to date result field content as responses to the information request of the various are provided and/or with completion of responses for each of the assessment category tabs 804-812.

Figure 41E:
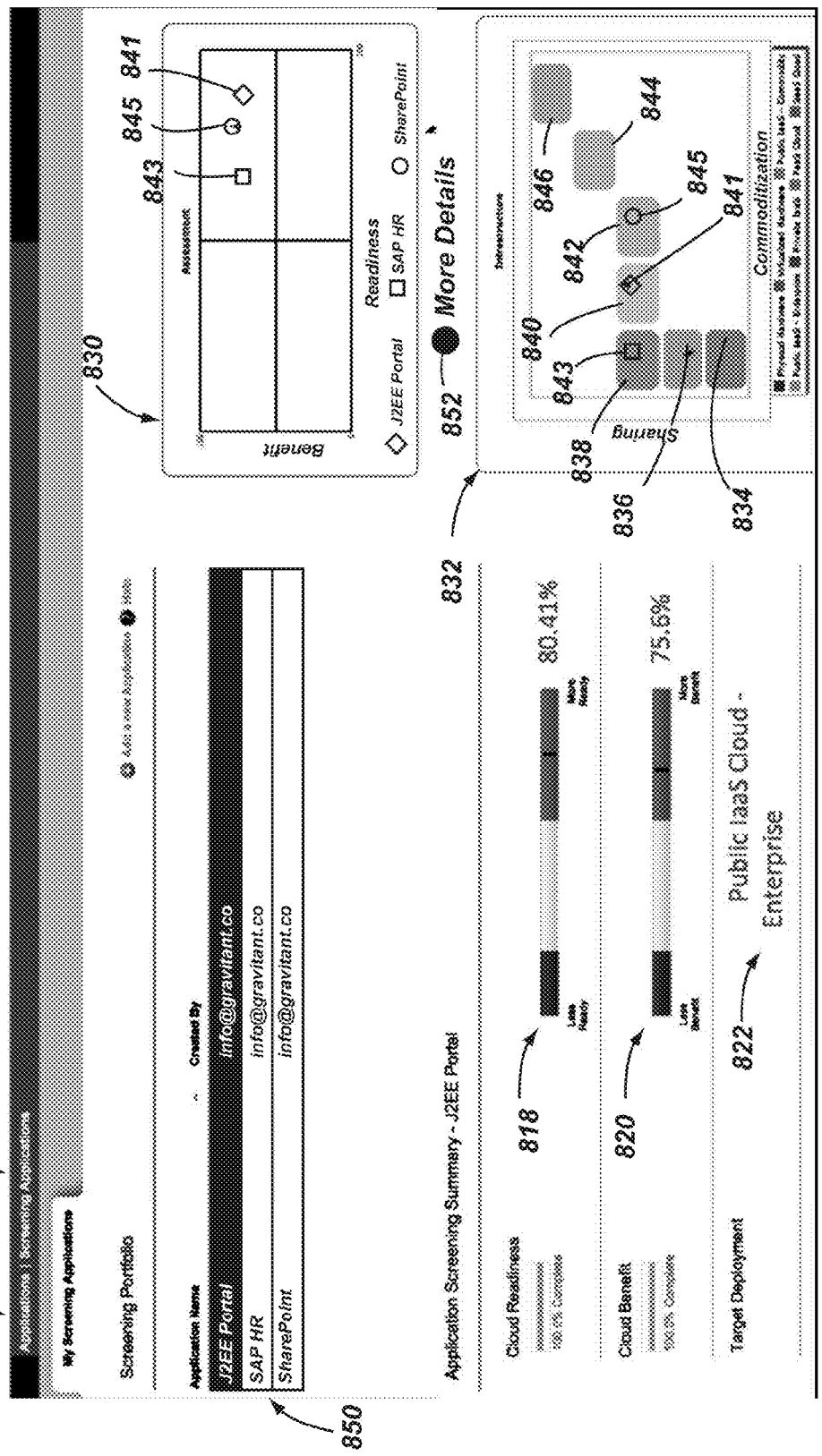

Referring now to FIG. 41E, a screening application page 802 of the application screener 800 includes an expanded view of the result field content. An application assessment chart 830 (e.g., also referred to as a migration chart or deployment chart) depicts a relative benefit of cloud deployment of assessed applications with regard to readiness (i.e., readiness index increasing from left to right) and benefit (i.e., benefit index increasing from bottom to top). A target infrastructure chart 832 depicts a recommended infrastructure for deployment the assessed applications with regard to level of cloud sharing (i.e., degree of sharing increasing from bottom to top) and type of cloud commoditization (i.e., degree of commoditization increasing from left to right). The depicted target deployment infrastructures include, but are not limited to, physical hardware 834, virtualized hardware 836, private IaaS 838, public IaaS-enterprise 840, public IaaS-commodity 842, PaaS cloud 844, and SaaS cloud 846.

As an example of the utilization and resulting benefit of the application screener 800, still referring to FIG. 41E, three applications are shown as having been assessed (i.e., assessed applications) and their results presented in the application assessment chart 830 and the target infrastructure chart 832. These assessed applications are: J2EE Portal application 841, SAP HR application 843, and SharePoint application 845. As can be seen, all three of the assessed applications are located in the top right quadrant of the application assessment chart 830, which indicates that all of the assessed applicants would be a good fit for the cloud based on their respective benefit and readiness indexes. As can also be seen, the J2EE Portal application 841 and the SharePoint application 844 dominate the SAP HR application 843. This dominant characterization is because the J2EE Portal application 841 and the SharePoint application 845 both have a higher readiness index and higher benefit index compared to the SAP HR application 843. Due to this dominance, which is also known as an efficient frontier, the J2EE Portal application 841 and the SharePoint application 845 should be given priority for cloud migration over the SAP HR applications 843. Next, using the target infrastructure chart 832, the target infrastructure of the J2EE Portal application 841 and the SharePoint application 845 should be considered before selecting a first one of the applications for deployment. As shown in the target infrastructure chart 832, it is recommended for the SharePoint applications 845 to be deployed on a Public IaaS Commodity cloud and for the J2EE Portal applications 841 to be deployed on a Public IaaS Enterprise cloud. Because commodity clouds are cheaper than enterprise clouds, deployment of the SharePoint application 845 on the Public IaaS Commodity cloud represents the preferred efficient frontier deployment.

Figure 41F:
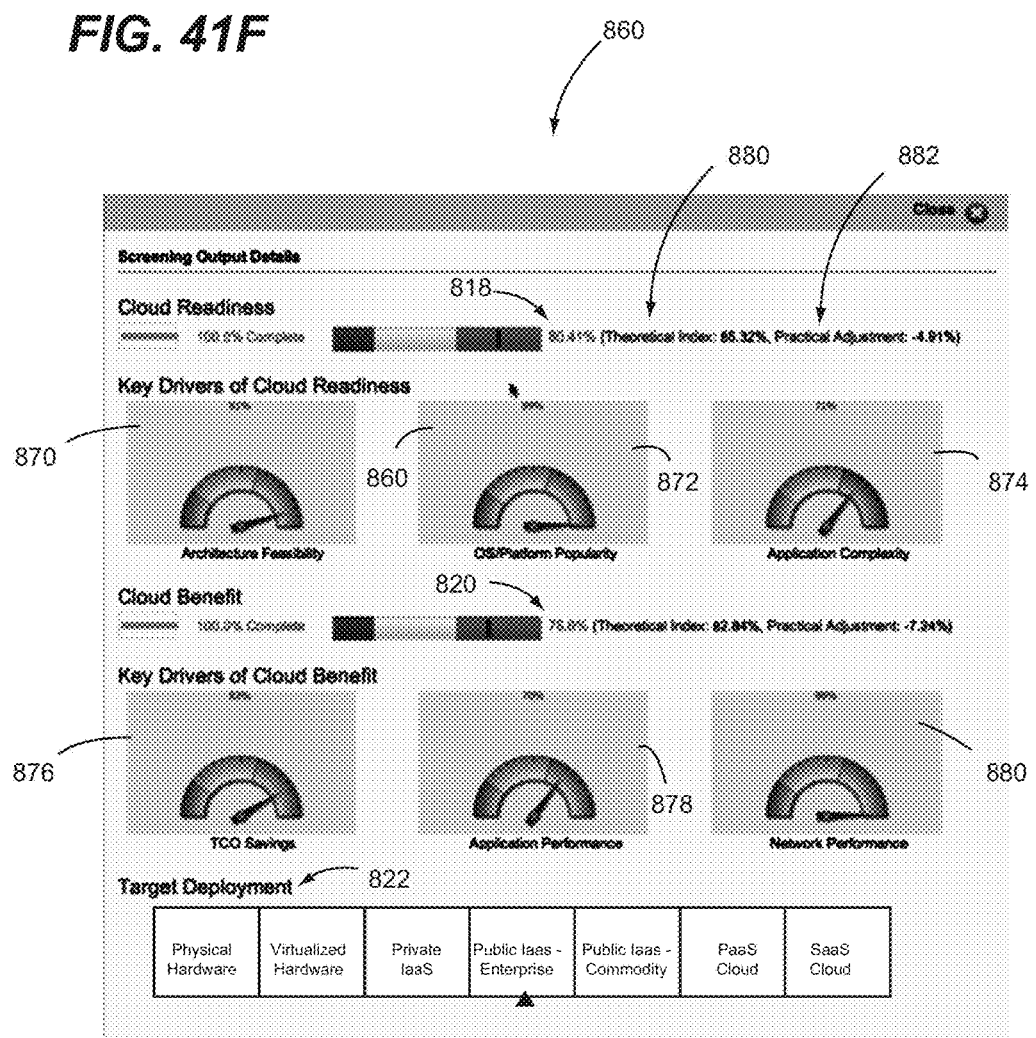

Referring now to FIG. 41F, a screening outputs detail page 680 is shown. The screening outputs detail page 680 shows further detail of assessment of a selected one of the assessed applications. The selected one of the assessed applications can be chosen by selecting the corresponding application name in the screening portfolio section 850 of the screening application page 802 and then requesting more detail (e.g., by choosing "more detail selector" 852 on the screening application page 802 shown in FIG. 41F). The screening outputs detail page 680 shows factor functions (i.e., key drivers) for the cloud readiness index 818 and for the cloud benefit index 820. Examples of the factor functions for the cloud readiness index 818 include, but are not limited to, architecture feasibility 670, OS/platform popularity 672 and application complexity 674. Examples of the factor functions for the cloud benefit index 820 include, but are not limited to, TCO (total cost of ownership) savings 676, application performance 678 and network performance 674.

Still referring to FIG. 41F, it can be seen that the cloud readiness index 818 and the cloud benefit index 820 each include a respective theoretical index 680 and a respective practical adjustment 682. The cloud readiness index 818 and the cloud benefit index 820 are each the sum of their respective theoretical index 680 and respective practical adjustment 682. As discussed below in greater detail, the theoretical index is a value computed using responses to the information requests in association with the assessment category tabs 804-812 of the application screener 800 (see FIGS. 41A-41D) and the practical adjustment is a value determined by quantifying actual deployment results for one or more applications with respect to a respective set of the factor functions 670-680 and comparing to the associated theoretical index. In this regard, assessment functionality of the application screener 800 has a feedback input that adjusts for differences between theoretical assessment of an application deployment in a cloud and actual cloud deployment of assessed applications in accordance with their respective assessment (i.e., the benefit, readiness and/or deployment infrastructure corresponding to actual successful cloud deployment of one or more previously assessed applications).

Figure 42:
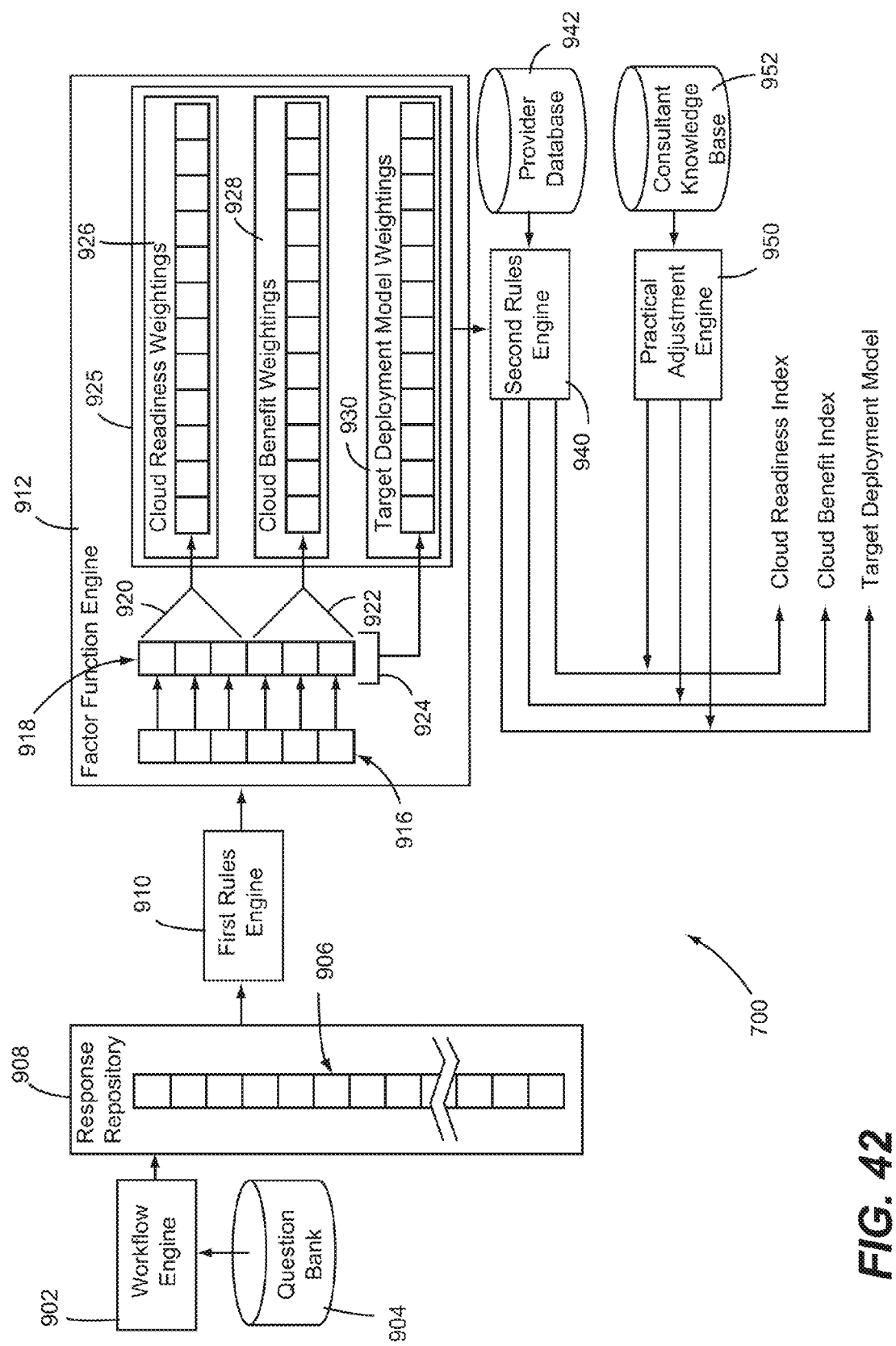
FIG. 42 is a diagrammatic view showing an abstraction of logic configured in accordance with an embodiment of the present invention for performing application screening.

Referring now to FIG. 42, an abstraction of logic configured in accordance with an embodiment of the present invention for performing application screening is disclosed (i.e., the application screening logic abstraction 900). A workflow engine 902 is provided for carrying out application assessment, which in one embodiment comprises the information requests and corresponding requests disclosed above in reference to FIGS. 41A-41D. The workflow engine 902 can choose the information requests in the form of questions from a question bank 904 (e.g., a database or other form of information storage structure). Responses to the information requests (i.e., responses 906) are stored in a response repository 908 that is coupled between the workflow engine 902 and a first rules engine 710. Preferably, the workflow engine causes each one of the responses 906 to be stored in the response repository 908 as a numeric value regardless of the form in which the response was indicated. Examples of forms that responses can be indicated include, but are not limited to, qualitative (e.g., answer="yes"), numeric (e.g., answer="4"), and descriptive (e.g., answer=mainframe). In this regard, the workflow engine would convert qualitative responses and descriptive responses to respective corresponding numeric responses (e.g., "yes"=1, "no"=0, "mainframe"=1, "client-server"=2, etc). The first rules engine 910 is configured for causing a plurality of non-normalized factor function values 914 to be created from respective sets of the responses 906 such as through an algorithm that uses weightings, arithmetic equations, and the like to generate a single resulting numeric value from the numeric values of a set of responses. Through a respective normalizing process 916, the non-normalized factor function values 914 are transitioned to corresponding normalized factor function values 918 such as, for example, a percentage (i.e., the normalization process causes the non-normalized numeric factor function value to be represented as a percentage of the possible range of numeric values of the factor function (e.g., 10% represents a non-normalized numeric value of 0-100 and 100% represents a non-normalized numeric value of 900-1000).

It is disclosed herein that normalization of the factor function value is performed for converting the factor function values into a normalized value so that weights can be applied in a meaningful manner. The process of normalization can includes applying the correct sign (e.g., to show if higher or lower is better), lower limits, upper limits, and a predefined growth curve. As the user provides different answers to the information requests, a respective factor function value would be normalized and scaled up or down as appropriate (i.e., the theoretical output).

A first set 920 of the factor functions are cloud readiness index determining factor functions (e.g., architecture feasibility, OS/platform popularity, and application complexity) and a second set 922 of the factor functions are cloud benefit index determining factor functions (e.g., TCO savings, application performance, and network performance). All of the factor functions are available as target deployment infrastructure determining factor functions 924. In this regard, the sets of factor functions 920-924 are used for generating application assessment results discussed above with respect to FIG. 41A-41F (i.e., the readiness index 818, the benefit index 820, and the target deployment model 822). To allow for user-specific importance of responses used in computing the factor functions to be taken into account during computation of the application assessment results, the factor function engine includes factor function output portion 925 for enabling weighting structures 926-930 to be applied on a per-response and/or per rule basis for each of the sets of factor functions 920-924. In one embodiment, each one of the weighting structures 926-930 is associated with a respective set of the factor functions 920-924 and each one of the weighting structures 926-930 includes a plurality of weightings that are each applied to a response used in deriving one or more factor functions of the respective set associated therewith.

A second rules engine 940 is coupled to the factor function output portion 925 for receiving factor function information (e.g., indexes, weightings, and associated information) from the factor function engine 912. The second rules engine 940 is configured for generating the theoretical results outputs (e.g., theoretical readiness index, theoretical benefit index and theoretical target deployment model). For example, through information that is known about cloud service offerings of certain cloud service providers, which can be accessed from a provider database 942, the theoretical results outputs can be generated (e.g., knowing that a certain offering from provider X meets the requirements of a given assessed application and that that offering is a IaaS offering, the target deployment model would be determined to be IaaS).

As disclosed above in reference to FIG. 41E, an application screener configured in accordance with the present invention can implement a practical adjustment with respect to theoretical outputs. The objective of the practical adjustment is to provide feedback input to the adjustment process to adjust for differences between theoretical assessment of an application deployment in a cloud and actual cloud deployment of assessed applications in accordance with their respective assessment. To this end, the application screening logic abstraction 900 can include a practical adjustment engine 950 that is coupled to the output of the rules engine 940. The practical adjustment engine 950 can be coupled to a data structure such as, for example, a consultant knowledge base 952 through which the practical adjustment engine 950 accesses information associated with actual cloud deployment of assessed applications in accordance with their respective assessment.

Implementing Cloud Service Offering Comparison Functionality

FIGS. 43A-43E a method 1000 of implementing comparison of cloud service offerings in accordance with an embodiment of the present invention. It is disclosed herein that the method can be implemented within a cloud services brokerage platform (i.e., a system) configured in accordance with an embodiment of the present invention (e.g., the cloud services brokerage platform 202 discussed above in reference to FIGS. 2A-5). Similar to the provider comparison functionality discussed above in reference to FIGS. 8A-9, the method 1000 aids a cloud service consumer in identifying available cloud service offerings that will support deployment of a chosen application. To this end, the method 1000 is integrated with application screening functionality configured in accordance with embodiments of the present invention (e.g., as disclosed in reference to FIGS. 8A-9) and with IT architecture functionality configured in accordance with embodiments of the present invention (e.g., as disclosed in reference to FIGS. 16-18).

Figure 43A:
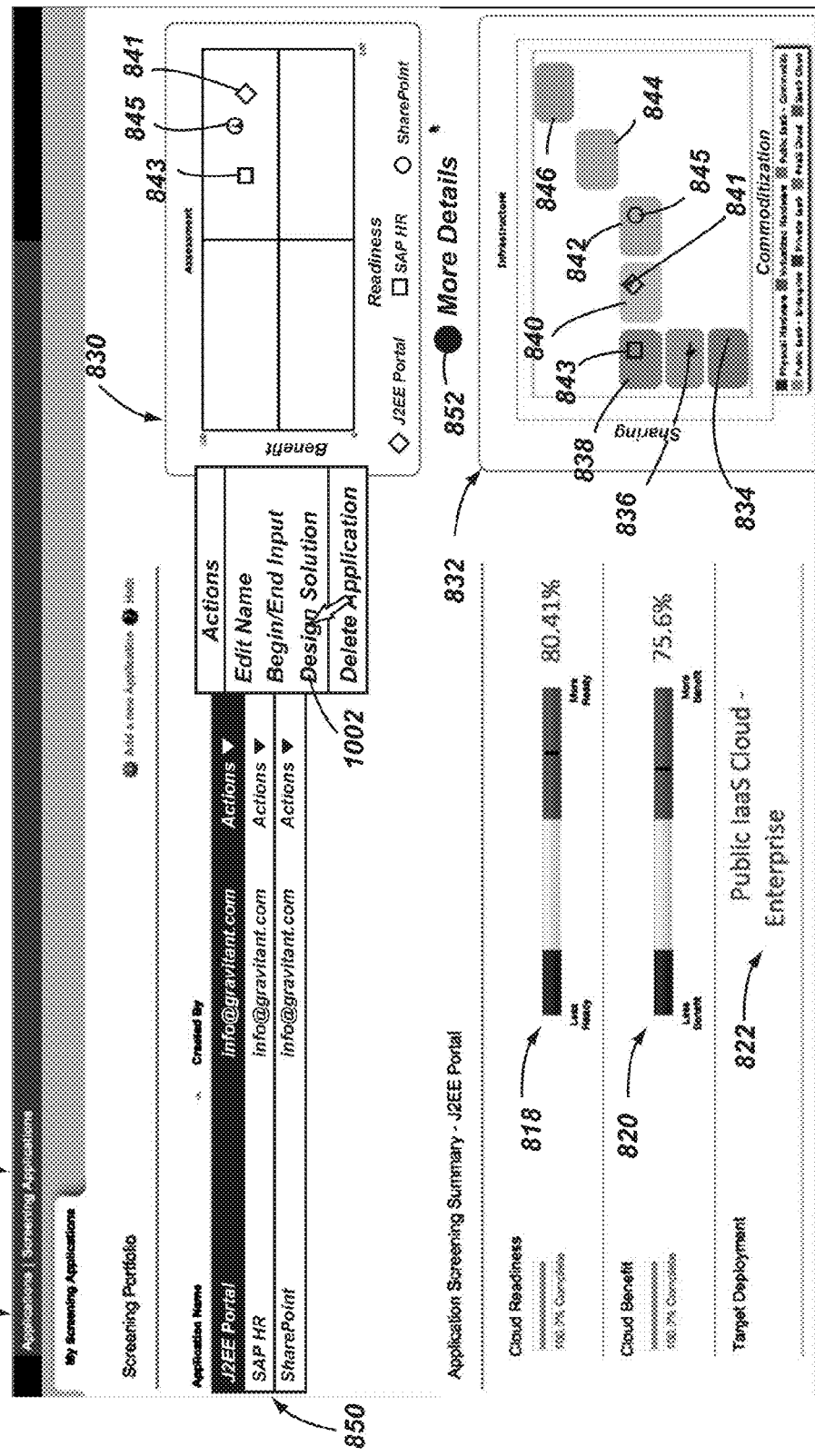

As shown in FIG. 43A, the method 1000 can begin through selection of a design solution selection 1002 (i.e., a suitable action) on the screening application page 602 of the application screener 600 discussed above in reference to FIG. 41E. The design solution selection 1002 can be one of a plurality of actions that are associated with a particular application that has been screened using the application screener 800. Accordingly, actions in this context are implemented on a per-application basis. As depicted in FIG. 43A, the action is implemented with respect to an application having the name 'J2EE Portal'.

Figure 43B:
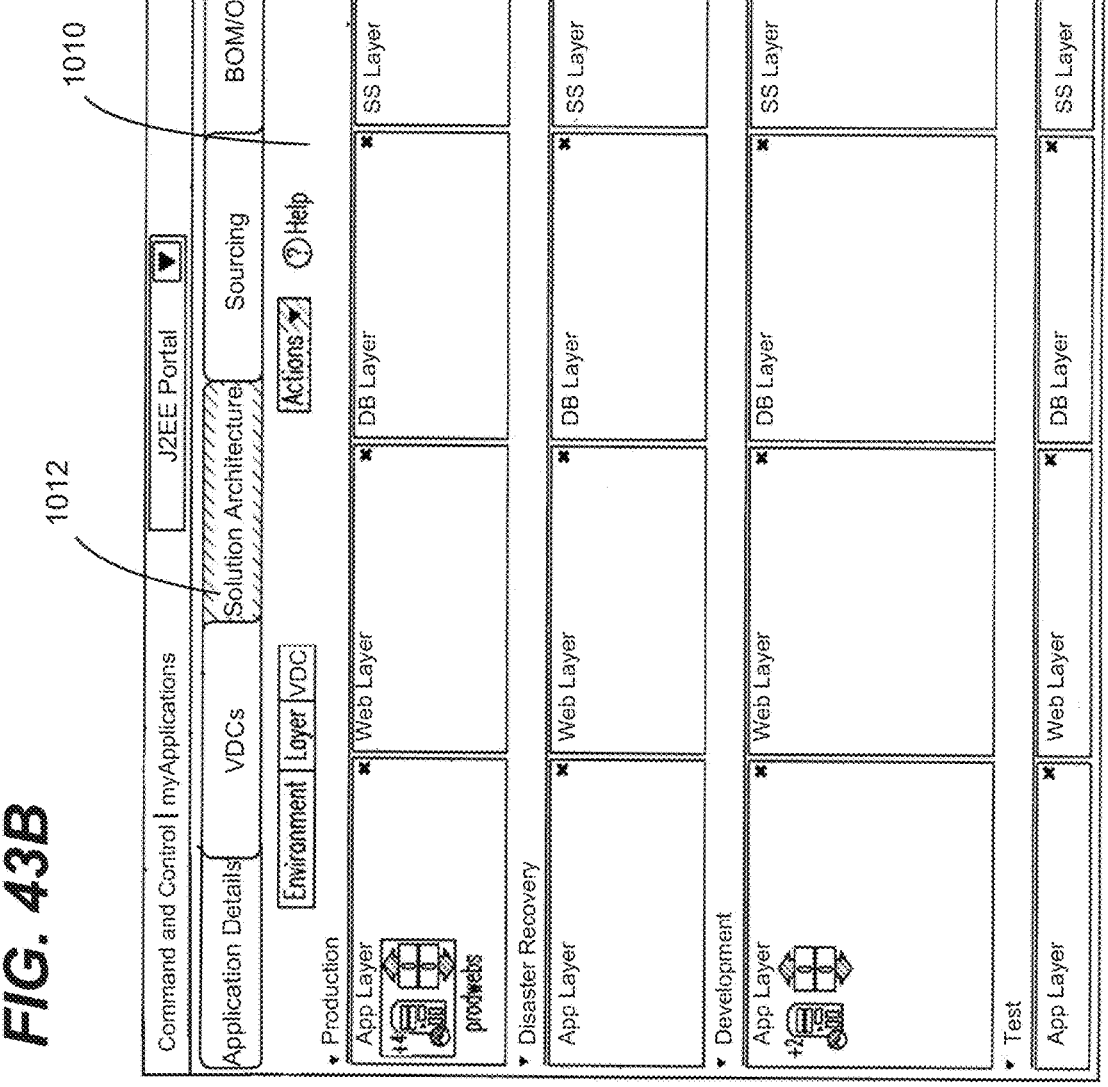

Selection of the design solution selection 1002 causes a solution architecture page 1010 (FIG. 43B) to be displayed, such as through selection of a solution architecture tab 1012. As shown in FIG. 43B, the solution architecture page can be configured in the same or a similar manner to the IT architecture page 492 discussed above in reference to FIGS. 16-18. It is also disclosed herein that the architecture page 1010 can advantageously be pre-configured using information from the application screener or other functionality disclosed herein. For example, information collected with respect to FIGS. 41A-41D of the application screener 800 can be use for configuring the default solution architecture and populating relevant fields (e.g., defining default environments (e.g., production, disaster, development, test, etc), layers (e.g., application, web, database, etc), and VDCs (e.g., app1, app2, etc) in the solution design palette). In the depicted example, the solution architecture is configured as desired, such as in the manner discussed above in reference to the IT architecture page 492 shown in FIGS. 16-18.

After configuring the solution architecture, a sourcing page 1020 (FIG. 43C) can be displayed, such as through selection of a sourcing tab 1022. Within the sourcing page 1020, a sourcing summary screen 1024 is displayed (i.e., provided). In preferred embodiments, as shown, the sourcing summary screen 1024 can include cloud service offering information on a per-VDC basis. For example, for each VDC configured via the solution architecture page 1010 in FIG. 43B (e.g., VDC #1, and VDC #2), a best match offering 1026, a selected offering 1028, a first available offering 1030, a second available offering 1032, and a third available offering 1034 are presented. As discussed below in greater detail, the available offerings 1030-1034 are selected from a plurality of available cloud service offerings based on relative rankings of a parameter (e.g., a cloud services feature comparison value) that characterizes implementation of a cloud infrastructure using cloud services of a respective one of the cloud service offerings on a basis of features provided by such cloud services (i.e., a match parameter). The my selection offering 1028 represents an available selection, which upon initial assessment is the same as the best match offering 1026. As will be clarified below, it is important to note that the best match offering is based upon best match of features between the needs of the application and a particular one of the available cloud service offerings, which may be independent of an associated price 1035 of the offering.

A custom sourcing tab 1036 on the sourcing page 1020 (FIG. 43C) enables a custom sourcing screen 1024 to be displayed. The custom sourcing screen 1024 presents offering-specific details of each one of the available offerings 1030-1034 to be presented. In addition to price 1035 of the available cloud service offering, examples of such offering-specific details includes, but are not limited to, quality of service information (QoS) 1038, rating information 1040, and match information 1042.

The offering price 1035 for each of the available cloud service offerings 1030-1034 is based on a common cloud services architecture specification that defines a cloud infrastructure that supports deployment of the application. The offering price 1035 refers to a price (e.g., monthly fee) associated with procuring the cloud services of a respective one of the cloud service offering necessary for providing the cloud infrastructure that supports implementation of the application. In preferred embodiments, the cloud infrastructure corresponds to an architecture design created via the solution architecture page 1010.

The match information 1042 for a particular one of the cloud service offerings 1030-1034 characterizes a degree of match between a set of cloud infrastructure features indicated as being desired and/or necessary for migration of the application in relation to available features of the particular one of the cloud service offerings 1030-1034. The match information 1042 can be based on many aspects of configuration details for a desired cloud infrastructure such as, for example, if a desired operating system (OS) is provided by the offering, if a desired VPN configuration can be supported by the offering, etc. Additionally, configuration options such as CPU configuration and memory configuration can be matched. In view of the disclosure made herein, a skilled person will appreciate that there are many features upon which the match information 1042 can be based and that, if a cloud service consumer selects any of these, then it drives whether a cloud service offering matches with the application requirements and how much of a match is designated (e.g., as indication by a resulting cloud services feature comparison value).

The QoS information 1038 for a particular one of the cloud service offerings 1030-1034 characterizes service availability of a particular one of the cloud service offerings 1030-1034, such as indicated by one or more other cloud service consumers (i.e., cloud service brokerage platform users) that have used the particular one of the cloud service offerings 1030-1034 for providing the cloud infrastructure for their application. The QoS information 1038 for a particular one of the cloud service offerings 1030-1034 characterizes service considerations (e.g., reliability, availability, actual performance (e.g., real-time tested performance), etc) of a particular one of the cloud service offerings 1030-1034, such as indicated by one or more other cloud service consumer that have used the particular one of the cloud service offerings 1030-1034 for providing the cloud infrastructure for their application.

The rating information 1040 for a particular one of the cloud service offerings 1030-1034 characterizes an overall qualitative satisfaction with use of a particular one of the cloud service offerings 1030-1034, such as indicated by one or more other cloud service consumers that have used the particular one of the cloud service offerings 1030-1034 for providing the cloud infrastructure for their application.

Figure 43C:
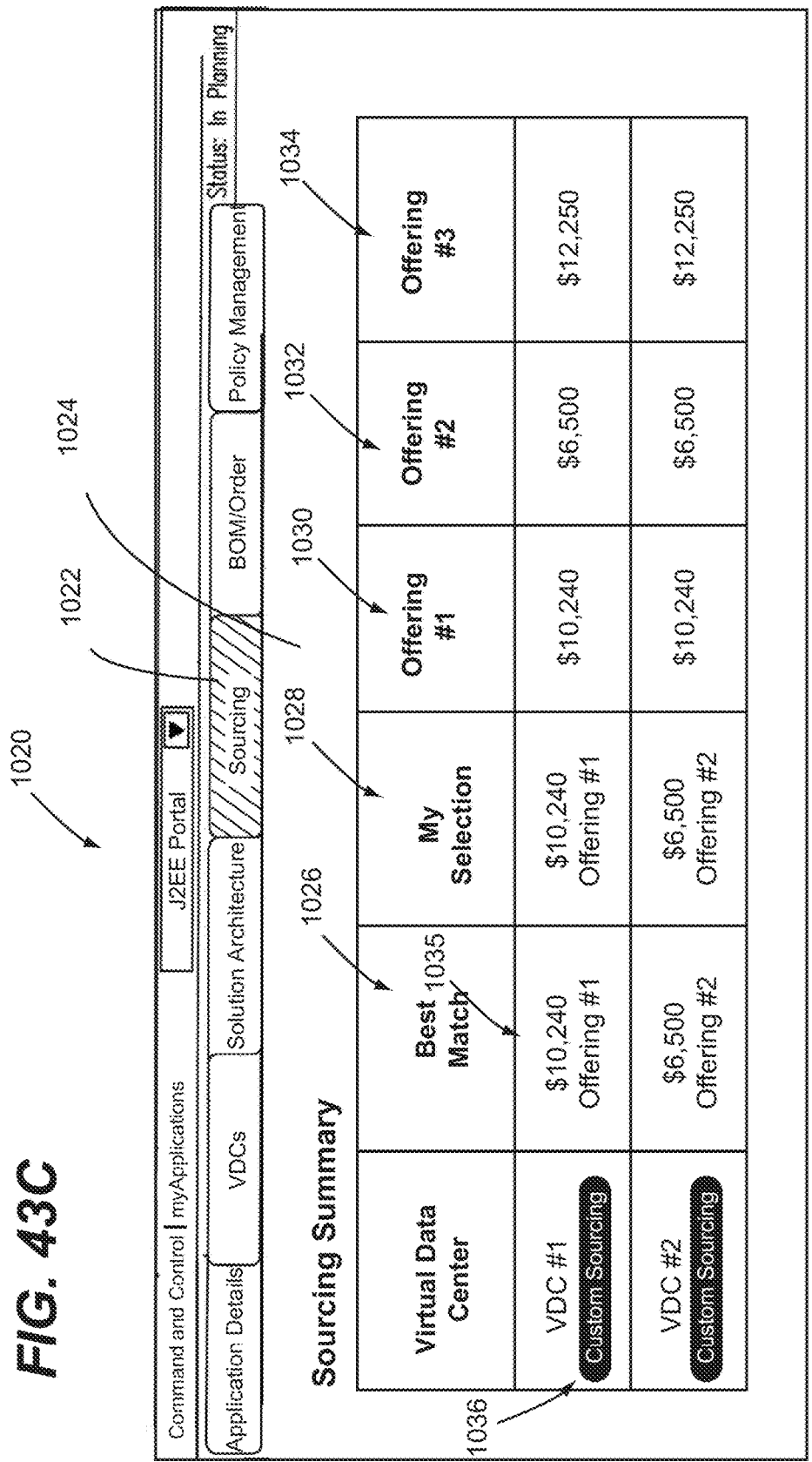

The custom sourcing screen 1024 includes a plurality of filter parameters 1044. Each one of the filter parameters 1024 corresponds to a respective one of a plurality of cloud infrastructure features. The cloud infrastructure features are defined by information gathered during and/or derived from the application screening process (i.e., portions of the cloud service resource information). The selected ones of the filter parameters 1024 are user-specified features indicated (e.g., during application screening) as being desired for supporting migration of the application. For example, one of the outputs of application screening can be a target deployment model and the target deployment model can be one of the feature parameters 1024. All or a portion of the selected ones of the filter parameters 1024 are used in determining the match information 1042 (e.g., a cloud services feature comparison value) for the cloud service offering that is currently selected. Each one of the filter parameters can be selectively selected and deselected, thereby causing the match information 1042 for the available cloud service offerings to be adjusted (i.e., re-determined) accordingly. An offering selector 1046 enables a chosen one of the available cloud service offerings to be selected such as, for example, to becoming the selected offering 1028 for the corresponding VDC (e.g., my selection 1028), as shown in FIG. 43C.

Figure 43E:
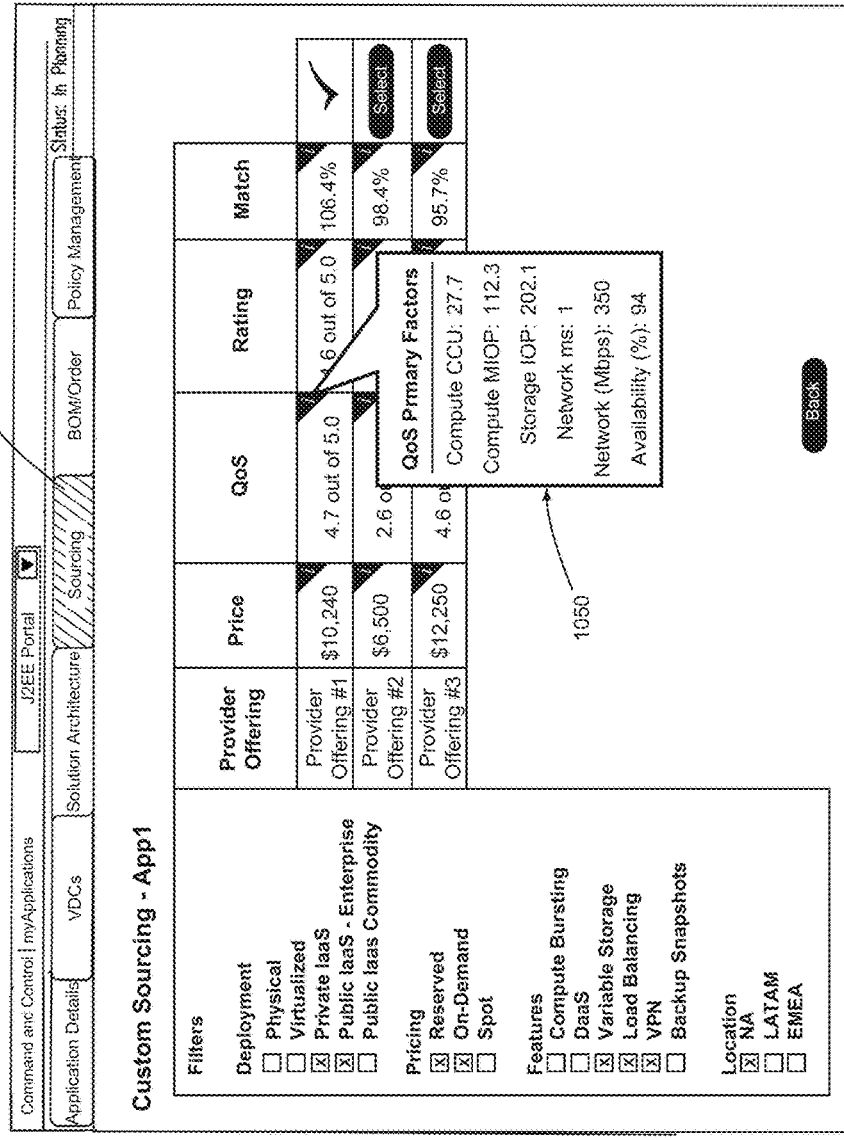

Referring to FIGS. 43D and 43E, in some embodiments, each one of the offering-specific details 1035-1042 for a particular one of the cloud service offerings 1030-1034 can have supplemental information presented in association therewith. For example, as shown, a supplemental information selector 1048 can be provided for each one of the offering-specific details 1035-1042 of each one of the cloud service offerings 1030-1034. It is disclosed herein that the supplemental information selector 1048 of the offering-specific details 1035-1042 of a particular one of the cloud service offerings 1030-1034 can be a discrete selector or the offering-specific detail field/entry itself. As shown in FIG. 43E, selection (e.g., clicking on with cursor, hovering over with cursor, etc) of the supplemental information selector 1048 of a particular one of the service offerings 1030-1034 causes supplemental information 1050 about that particular one of the service offerings 1030-1034 to be displayed. For example, a set of key variables and/or most relevant information used in determining the offering-specific detail associated with a selected supplemental information selector can be displayed, a set of highest ranking variables and/or most relevant information used in determining the offering-specific detail associated with a selected supplemental information selector can be displayed, and the like. However, embodiments of the present invention are not limited to any particular supplemental information. Furthermore, in some cases, the supplemental information 1050 will be qualitative (e.g., in narrative form) whereas the corresponding portion of the will be quantitative.

Figure 44:
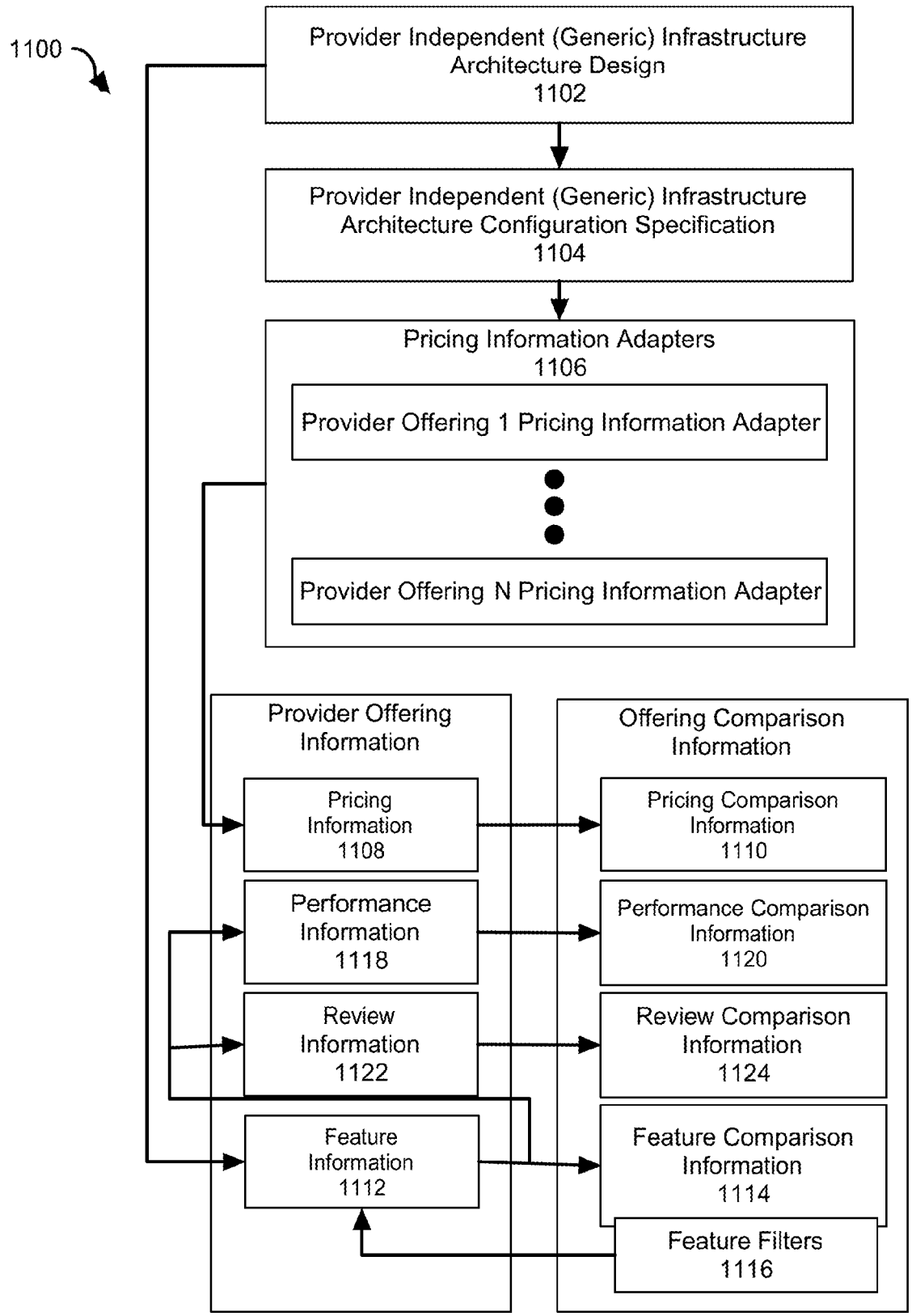
FIG. 44 is diagrammatic view showing an abstraction of logic configured in accordance with an embodiment of the present invention for implementing comparison of cloud service offerings.

FIG. 44 shows an abstraction 1100 of logic configured in accordance with an embodiment of the present invention for implementing comparison of cloud service offerings. A provider independent (i.e., generic) infrastructure architecture design 1102 is provided for defining a cloud infrastructure that supports deployment of an application thereto. For example, the provider independent (i.e., generic) infrastructure architecture design 1102 can be that prepared in accordance with the IT architecture design disclosures made herein in reference to FIGS. 16-18 and FIG. 43B.

A provider independent (i.e., generic) infrastructure architecture configuration specification 1104 is created using information defined within the provider independent (i.e., generic) infrastructure architecture design 1102. The custom package editing screen 443 discussed above in reference to FIG. 8B is an example of the provider independent (i.e., generic) infrastructure architecture configuration specification 1104. As shown, the custom package editing screen 443 enables a cloud provide offering package to be defined that represents an architecture configuration with certain capacity and service requirements. This configuration is required to provide an 'apples-to-apples' comparison of pricing between cloud service offerings because service providers can and generally do have very distinct ways of pricing their cloud service offering(s) based on application infrastructure configuration. The provider independent (i.e., generic) infrastructure architecture configuration specification 1104 represents an application that will be deployed to an IaaS environment as a complete solution that includes compute/storage capacity, network capacity, VPN requirements, and expected utilization of resources. With respect to server configuration, for example as shown in FIG. 8B, the type of servers with CPU, Memory, Storage, OS and count of servers are identified. There can be many of these types of servers. The attributes of the server can impact pricing for cloud service offerings in different ways. With respect to network configuration, for example as shown in FIG. 8B, a network configuration can be identified either as bandwidth or data transferred. Generally, an application either has one or the other of these two network configuration requirements, which can be internally converted as needed depending on the pricing model of a particular the cloud services offering. With respect to virtual private network (VPN) configuration, for example as shown in FIG. 8B, VPN settings determine if certain VPN configuration options are required with the cloud services offering and whether those configuration options would be supported or if a separate VM is required to manage the VPN so to account for that required VPN configuration. Although not specifically shown in FIG. 8B, the custom package editing screen 443 (and thus the provider independent (i.e., generic) infrastructure architecture configuration specification 1104) can include expected utilization across the overall capacity of the configuration. The expected utilization of cloud services is useful because it can be a key driver to pricing for certain cloud service offerings. Certain cloud service offerings that are allocated capacity based or reserved capacity based are generally sensitive to utilization. For example, in reserved capacity, if servers are only utilized some of the time, this can have a considerable affect on the capacity that needs to be priced for associated cloud service offerings.

The provider independent (i.e., generic) infrastructure architecture configuration specification 1104 is passed to a set of pricing adapters 1106. For example, the pricing adapters 1106 can be configured as a pricing adapter class that is a generic data object. Each one of the pricing adapters 1106 is configured for a respective cloud service offering and/or cloud service provider thereof. The pricing adapters 1106 price all or a portion of the provider independent (i.e., generic) infrastructure architecture configuration specification 1104 (e.g., compute information, storage information, network information, VPN information, and utilization information). To this end, the pricing adapters 1106 provide a mapping of the information of the provider independent (i.e., generic) infrastructure architecture configuration specification 1104 to provider specific pricing information 1108 (e.g., provider specific line items within a cloud service provider catalog). Broadly speaking, this mapping is based on the elements of pricing that are important to a respective cloud service offering. For example, a first cloud service provider can map CPU/memory to the closest instance size that minimally meets the requirement and generated pricing accordingly. In contrast, with respect to the second cloud service provider, individual server configurations only look at the OS for OS licensing costs while the total offering is priced based on the total reserved capacity calculated at the bottom. In each of these cases, the pricing class has rules for mapping the input to a specific line item in the cloud service provider catalog, which can be driven by configuration keys in the catalog. The configuration keys are strings or identifiers that map configuration to a specific line item. For example, an Amazon line item can have the region, instance size, and OS configuration that maps to a line item price based on hourly basis. The pricing adapter would then look up the line item based on this configuration and take the input and assigns a quantity to the line item. If the line item is hourly based, then the full monthly utilization is estimated at a designed number of hours per month times the quantity of servers of that configuration. The result of such mapping is the output pricing comparison information 1110 (e.g., an offering price) for the corresponding cloud service offering An important aspect of the cloud service offering pricing is that, after the line items have been determined by the pricing adaptor 1106 and quantities are established based on the provider independent (i.e., generic) infrastructure architecture configuration specification 1104, pricing rules can be applied that can match against that customer and provider offering. These can be dynamic pricing rules established in the marketplace or channel and affect the final pricing with either discounts or upcharges based on the rules set, which can be percentage increase/decrease or specific dollar amount increase/decrease.

The provider independent (i.e., generic) infrastructure architecture design 1102 defines a set of cloud infrastructure features. Using at least a portion of the set of cloud infrastructure features from the provider independent (i.e., generic) infrastructure architecture design 1102 and using cloud service feature information 1112 for each one of the plurality of cloud service offerings, feature comparison information 1114 is determined. For example, the set of cloud infrastructure features can be compared with available features of a particular one of the cloud service offerings to determine a feature match factor for the particular one of the cloud service offerings (e.g., match information 1042 discussed in reference to FIG. 43D). The feature comparison information 1114 indicates available cloud service offerings from a collection of available cloud service offerings. For example, as shown in FIG. 3, the cloud service offerings corresponding to the three highest feature match factors are used as the available cloud service offerings. As disclosed above in FIGS. 32D and 43E, the feature match factor can be greater than 100%, which indicates that a corresponding cloud service offering provides not only all requested features, but also additional features that are related to the requested features.

The set of cloud infrastructure features can be altered through use of feature filters 1116. The feature filters allows features of the set to be selected and deselected, thereby affecting the resulting feature match factor, as disclosed above in reference to FIG. 43D.

As disclosed above, the feature comparison information 1114 indicates the available cloud service offerings from a collection of available cloud service offerings. Performance information 1118 is assessed based on the available cloud service offerings for determining (e.g., selecting) performance comparison information 1120. The QoS information 1038 discussed above in reference to FIGS. 43D and 43E are examples of such performance comparison information.

Similarly, review information 1122 is assessed based on the available cloud service offerings for determining (e.g., selecting) review comparison information 1124. The rating information 1040 discussed above in reference to FIGS. 43D and 43E are examples of such review comparison information. It is disclosed herein that the performance information 1118 and the review information 1122 are preferably information provided directly or indirectly by end-users of a platform (e.g., system) configured in accordance with the present invention for implementing comparison of cloud service offerings. For example, users of the system that have previously chosen to migrated an application to a cloud infrastructure using services of one or more of the available cloud service providers (e.g., as suggested through use of the service provider comparison functionality of the system) can provide (directly or via a third party) rating information and QoS information based on their respective previous and/or on-going experiences with one or more of the available cloud service providers.

DETAILED DESCRIPTION SUMMARY

In view of the foregoing disclosures, a skilled person will appreciate that embodiments of the present invention offer several beneficial considerations. One such consideration is enabling PaaS for enabling true IaaS for end customers in addition to IaaS for enterprise IT. Another such consideration is the ability to shift a private cloud from to a fulfillment model of service to end customers (business units and application teams) to a self-service model offering design, order, fulfillment and control. Another such consideration is enabling IT as a private cloud provider to publish private cloud into a cloud service model for self-service consumption and equal footing with public cloud services thereby allowing enterprise IT to compete in a healthy way with public clouds and provide best value to their customers (e.g., business units, application teams and the like). Another such consideration is normalization of services and functionalities across disparate public cloud service models (e.g., reserved capacity, pay-as-you-go, reserved instances, memory based pricing, VM based pricing, etc.) and private cloud models for enabling 'apples-to-apples' comparison and best-fit determination. Another such consideration is an ability to graphically design, view and maintain a truly hybrid and dynamic changing cloud solution. Another such consideration is an ability for cloud solution architects, IT administrators, procurement managers, application developers, IT managers, and other constituents to collaborate and manage cloud based solutions across IaaS, PaaS, SaaS, Managed Services and other categories of cloud services through a scenarios concept (e.g., solution or application design).

Although the invention has been described with reference to several exemplary embodiments, it is understood that the words that have been used are words of description and illustration, rather than words of limitation. Changes may be made within the purview of claims supported by the disclosures made herein, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the claims supported by the disclosures made herein.

What is claimed is:

1. A computer-implemented method of implementing comparison of cloud service offerings, comprising:

creating a cloud services architecture specification including provider independent architecture design information defining logical components of a virtual machine that supports deployment of an application, wherein creating the cloud services architecture specification includes causing an instance of a user interface to be instantiated and receiving the independent architecture design information from a cloud service consumer via the user interface;

instantiating a plurality of application programming interfaces (APIs) adapted for communicating with a respective one of a plurality of cloud service providers, wherein each of the cloud service providers has one of a plurality of cloud service offerings associated therewith and wherein said communicating includes receiving, from the respective one of the cloud service providers, cloud service pricing information defined by a pricing framework that is unique to the associated one of the cloud service offerings;

causing said cloud service pricing information to be stored as line items of a cloud service catalog;

determining a cloud services offering price for each one of the plurality of cloud service offerings to characterize implementation of the virtual machine using cloud services thereof on a basis of pricing of such cloud services, wherein each one of the cloud service offerings is an offering of a respective one of a plurality of cloud service providers, wherein determining the cloud services offering price for each one of the cloud service offerings includes providing the provider independent architecture design information of the cloud services architecture specification to a set of pricing adapters whereby each one of the pricing adapters maps the provider independent architecture design information to the cloud service pricing information for a respective one of the cloud service offerings thereby generating the cloud services offering price for each one of the plurality of cloud service offerings as a function of the respective one of the different pricing information adapters and the cloud services architecture specification, wherein the pricing information adapters cause said mapping to be performed directly between the provider independent architecture design information and respective ones of the line items of the cloud service catalog; and in response to determining information that provides a comparison of the cloud services offering price for each one of the cloud service offerings with respect to each other one of the cloud services offerings, causing said price comparison information to be displayed in a manner enabling one of said cloud service offerings to be selected from among the plurality of cloud service offerings as a chosen cloud service offering for being provisioned to support deployment of the application, wherein being provisioned is implemented via a respective one of said APIs.

2. The computer-implemented method of claim 1 wherein:

the pricing framework of a first one of the cloud service offerings specifies a plurality of different size system resource offerings such that the pricing information adapter for the first one of the cloud service offerings correlates the provider independent architecture design information to a closest size system resource offering; and the pricing framework of a second one of the cloud service offerings specifies a reserved system resource capacity determined based upon the cloud service resource information such that the pricing information adapter for the second one of the cloud service offerings correlates the provider independent architecture design information to a particular amount of reserved system resource capacity.

3. The computer-implemented method of claim 2 wherein the pricing information adapter associated with the particular one of the cloud service offerings defines rules by which each one of a plurality of specification elements of the cloud services architecture specification is mapped to one or more respective lines items within the cloud services catalog.

4. The computer-implemented method of claim 1 wherein the pricing information adapter associated with the particular one of the cloud service offerings defines rules by which each one of a plurality of specification elements of the cloud services architecture specification is mapped to one or more respective lines items within the cloud services catalog.

5. A computer-implemented method, comprising:
providing cloud service resource information including provider independent architecture design information defining logical components of a virtual machine for supporting deployment of an application, wherein the cloud service resource information is generic with respect to a plurality of cloud service offerings that are each that of a different one of a plurality of cloud service providers and wherein providing cloud service resource information includes causing an instance of a user interface to be instantiated and receiving the independent architecture design information from a cloud service consumer via the user interface;
instantiating a plurality of application programming interfaces (APIs) adapted for communicating with a respective one of the plurality of cloud service providers, wherein each of the cloud service providers has one of the plurality of cloud service offerings associated therewith and wherein said communicating includes receiving, from the respective one of the cloud service providers, cloud service pricing information defined by a pricing framework that is unique to the associated one of the cloud service offerings;
causing said cloud service pricing information to be stored as line items of a cloud service catalog;
determining, using at least a portion of the cloud service resource information and using cloud service pricing information for each one of a plurality of cloud service offerings, a cloud services offering price for each one of the plurality of cloud service offerings thereby characterizing implementation of the cloud infrastructure using cloud services thereof on a basis of pricing of such cloud services, wherein determining the cloud services offering price for each one of the plurality of cloud service offerings includes providing the provider independent architecture design information of the cloud services architecture specification to a set of pricing adapters whereby each one of the pricing adapters maps the provider independent architecture design information to the cloud service pricing information for a respective one of the cloud service offerings thereby generating the cloud services offering price for each one of the plurality of cloud service offerings as a function of the respective one of the different pricing information adapters and the cloud service resource information, wherein the pricing information adapters cause said mapping to be performed directly between the provider independent architecture design information and respective ones of the line items of the cloud service catalog;
determining, using at least a portion of the cloud service resource information and using cloud service feature information for each one of the plurality of cloud service offerings, a cloud services feature comparison value for each one of the plurality of cloud service offerings characterizing implementation of the cloud infrastructure using cloud services thereof on a basis of features provided by such cloud services; and
in response to determining information that provides a comparison of the cloud services offering price for each one of the cloud service offerings with respect to each other one of the cloud services offerings, causing said price comparison information to be displayed in a manner enabling one of said cloud service offerings to be selected from among the plurality of cloud service offerings as a chosen cloud service offering for being provisioned to support deployment of the application, wherein being provisioned is implemented via a respective one of said APIs.

6. The computer-implemented method of claim 5 wherein:
the pricing framework of a first one of the cloud service offerings specifies a plurality of different size system resource offerings such that the pricing information adapter for the first one of the cloud service offerings correlates the cloud service resource information to a closest size system resource offering; and
the pricing framework of a second one of the cloud service offerings specifies a reserved system resource capacity determined based upon the cloud service resource information such that the pricing information adapter for the second one of the cloud service offerings correlates the cloud service resource information to a particular amount of reserved system resource capacity.

7. The computer-implemented method of claim 5 wherein:
the cloud service resource information defines a set of cloud infrastructure features;
determining the cloud services feature comparison value for each one of the cloud service offerings includes comparing the set of cloud infrastructure features with available features of a particular one of the cloud service offerings to determine a feature match factor that characterizes a degree of match therebetween; and
assessing the feature match factor of two or more of the cloud service offerings to determine a ranking therebetween based on the feature match factor.

8. The computer-implemented method of claim 7, further comprising:
displaying, for each one of the two or more of the cloud service offerings, the cloud services offering price and the feature match factor in combination with a cloud services offering identifier;
identifying a currently selected one of the two or more of the cloud service offerings;
displaying a plurality of filter parameters each corresponding to a respective one of a plurality of cloud infrastructure features defined within the cloud service resource information, wherein filter parameters used in determining the cloud services feature comparison value for the two or more of the cloud service offerings;
enabling each one of the filter parameters to be selectively selected and deselected; and re-determining the cloud services feature comparison value for each one of the two or more cloud service offerings dependent upon currently selected ones of the filter parameters.

9. A non-transitory computer-readable storage medium having tangibly embodied thereon and accessible therefrom instructions interpretable by at least one data processing device, the instructions are configured for causing the at least one data processing device to perform a method comprising:

creating a cloud services architecture specification including provider independent architecture design information defining logical components of a virtual machine that supports deployment of an application, wherein creating the cloud services architecture specification includes causing an instance of a user interface to be instantiated and receiving the independent architecture design information from a cloud service consumer via the user interface;

instantiating a plurality of application programming interfaces (APIs) adapted for communicating with a respective one of a plurality of cloud service providers, wherein each of the cloud service providers has one of a plurality of cloud service offerings associated therewith and wherein said communicating includes receiving, from the respective one of the cloud service providers, cloud service pricing information defined by a pricing framework that is unique to the associated one of the cloud service offerings;

causing said cloud service pricing information to be stored as line items of a cloud service catalog determining a cloud services offering price for each one of the plurality of cloud service offerings to characterize implementation of the virtual machine using cloud services thereof on a basis of pricing of such cloud services, wherein each one of the cloud service offerings is an offering of a respective one of a plurality of cloud service providers, wherein determining the cloud services offering price for each one of the cloud service offerings includes providing the provider independent architecture design information of the cloud services architecture specification to a set of pricing adapters whereby each one of the pricing adapters maps the provider independent architecture design information to the cloud service pricing information for a respective one of the cloud service offerings thereby generating the cloud services offering price for each one of the plurality of cloud service offerings as a function of the respective one of the different pricing information adapters and the cloud services architecture specification, wherein the pricing information adapters cause said mapping to be performed directly between the provider independent architecture design information and respective ones of the line items of the cloud service catalog; and in response to determining information that provides a comparison of the cloud services offering price for each one of the cloud service offerings with respect to each other one of the cloud services offerings, causing said price comparison information to be displayed in a manner enabling one of said cloud service offerings to be selected from among the plurality of cloud service offerings as a chosen cloud service offering for being provisioned to support deployment of the application, wherein being provisioned is implemented via a respective one of said APIs.

10. The non-transitory computer-readable storage medium of claim 9 wherein the pricing information adapter associated with the particular one of the cloud service offerings defines rules by which each one of a plurality of specification elements of the cloud services architecture specification is mapped to one or more respective lines items within the cloud services catalog.

11. The non-transitory computer-readable storage medium of claim 9 wherein:

the pricing framework of a first one of the cloud service offerings specifies a plurality of different size system resource offerings such that the pricing information adapter for the first one of the cloud service offerings correlates the provider independent architecture design information to a closest size system resource offering; and the pricing framework of a second one of the cloud service offerings specifies a reserved system resource capacity determined based upon the cloud service resource information such that the pricing information adapter for the second one of the cloud service offerings correlates the provider independent architecture design information to a particular amount of reserved system resource capacity.

* * * * *